United States Patent [19]
Nishino et al.

[11] Patent Number: 5,583,678
[45] Date of Patent: Dec. 10, 1996

[54] COLOR LIQUID CRYSTAL DISPLAY APPARATUS

[75] Inventors: Toshiharu Nishino, Hamura; Yasushi Nishida, Hachioji; Masayuki Takahashi, Asaka, all of Japan

[73] Assignee: Casio Computer Co., Ltd., Tokyo, Japan

[21] Appl. No.: 209,833

[22] Filed: Mar. 11, 1994

[30] Foreign Application Priority Data

| Mar. 12, 1993 | [JP] | Japan | 5-052509 |
| Apr. 12, 1993 | [JP] | Japan | 5-084758 |
| Apr. 19, 1993 | [JP] | Japan | 5-091158 |
| Apr. 20, 1993 | [JP] | Japan | 5-092666 |
| Apr. 21, 1993 | [JP] | Japan | 5-094312 |

[51] Int. Cl.$^6$ ............................ G02F 1/1335; G09G 3/36
[52] U.S. Cl. ............................ 349/118; 345/95; 349/99
[58] Field of Search ............................ 359/64, 87, 89, 359/63, 73, 59, 53; 345/88, 92, 95

[56] References Cited

U.S. PATENT DOCUMENTS

| 4,032,218 | 6/1977 | Scheffer | 359/73 |
| 4,232,948 | 11/1980 | Shanks | 359/73 |
| 4,239,349 | 12/1980 | Scheffer | 359/73 |
| 5,089,906 | 2/1992 | Ohnishi | 359/73 |
| 5,124,824 | 6/1992 | Kozaki | 359/73 |
| 5,148,248 | 9/1992 | Possin | 359/59 |
| 5,151,688 | 9/1992 | Tanaka | 359/59 |
| 5,151,689 | 9/1992 | Kabuto | 359/59 |
| 5,184,239 | 2/1993 | Iimura | 359/63 |
| 5,191,454 | 3/1993 | Iijima et al. | 359/64 |
| 5,241,408 | 8/1993 | Ishikawa et al. | 359/73 |
| 5,245,456 | 9/1993 | Yoshimi et al. | 359/73 |
| 5,329,387 | 7/1994 | Yanagisawa | 359/53 |
| 5,380,459 | 1/1995 | Kanemoto | 252/299.01 |
| 5,406,396 | 4/1995 | Akatsuka | 359/73 |

FOREIGN PATENT DOCUMENTS

| 1396828 | 6/1975 | United Kingdom | 359/73 |

Primary Examiner—William L. Sikes
Assistant Examiner—Tiep H. Nguyen
Attorney, Agent, or Firm—Frishauf, Holtz, Goodman, Langer & Chick

[57] ABSTRACT

A pair of polarizing plates are disposed on two sides of a TN-type liquid crystal cell constituted by a liquid crystal twist-aligned at a twist angle of 80° to 120°. A retardation plate is disposed between one of the polarizing plates and the liquid crystal cell in such a manner that the optical axis of the retardation plate crosses the transmission axis of the adjacent polarizing plate at 45°. The pair of polarizing plates are arranged such that their transmission axes are parallel to each other. The liquid crystal cell is arranged such that the optical axis of the retardation plate crosses the aligning direction of the liquid crystal molecules on the substrate side adjacent to the retardation plate at 45°. A liquid crystal driving circuit is connected to the liquid crystal. This circuit serves to change the voltage applied to the liquid crystal to change the polarized state of light transmitted through the liquid crystal so as to change the color of emerging light.

28 Claims, 31 Drawing Sheets

COLOR LIQUID CRYSTAL DISPLAY APPARATUS

BACKGROUND OF THE INVENTION

1. Field of the Invention

The present invention relates to a color liquid crystal display apparatus for performing a color display operation using the birefringence characteristics of a twisted-nematic liquid crystal.

2. Description of the Related Art

As a conventional display apparatus for a television set, a personal computer, an electronic portable calculator, or the like, a liquid crystal display apparatus is well known. Recently, color liquid crystal display apparatuses capable of performing a chromatic display, such as a liquid crystal color television set and the color display of a computer terminal, have been widely used.

As a color liquid crystal display apparatus, a transmission type color liquid crystal display apparatus is generally used. In this apparatus, a liquid crystal cell is sandwiched between a pair of polarizing plates, and a back light (illumination source) is disposed outside one of the polarizing plates. In this case, the liquid crystal cell is formed as follows. A pair of transparent substrates are disposed to oppose each other. Transparent electrodes are respectively formed on the opposing surfaces of the transparent substrates. A liquid crystal is then sealed between the transparent substrates. Color filters for selectively transmitting light components having specific wavelengths are disposed on one of the transparent substrates.

By ON/OFF-controlling the driving voltage applied between the pair of transparent substrates, the emergence of light from the back light is controlled. Bight from the back light is selectively transmitted through each color filter in the liquid crystal display apparatus in the process of passing therethrough. As a result, the transmitted light has a specific color. With the colored light transmitted through each color filter, a color display is performed.

A color filter, however, generally has a low transmittance. For this reason, in a color liquid crystal display apparatus using the above-mentioned color filters, the loss of transmitted light is large, resulting in a dark display. Especially, in a reflection type liquid crystal display apparatus widely used as the display portion of an electronic portable calculator or a portable device such as a wristwatch, no special light source is arranged, and light is transmitted through each color filter twice before and after reflection and undergoes optical loss. Therefore, the resultant display becomes dark. That is, it is very difficult to perform a color display operation by using color filters.

In addition, a color filter demands high precision in dimensions, e.g., thickness, and in assembly, similar to other optical elements such as a polarizing plate, resulting in an increase in cost of the liquid crystal display apparatus.

Furthermore, in a color liquid crystal display apparatus using color filters, since one pixel can display only a color corresponding to the color of a color filter arranged for this pixel, the structure of the color liquid crystal display apparatus is complicated with an increase in the number of pixels.

SUMMARY OF THE INVENTION

It is an object of the present invention to provide a color liquid crystal display apparatus which performs coloring of transmitted light without using any color filter, can sufficiently increase the brightness of a display by increasing the transmittance, and can display a plurality of colors with one pixel.

In order to achieve the above object, according to the present invention, there is provided a color liquid crystal display apparatus comprising a pair of substrates having opposing surfaces on which electrodes are respectively formed with aligning films being formed to cover the electrodes, the aligning films having undergone aligning treatment in predetermined directions, a liquid crystal layer disposed between the pair of substrates and having liquid crystal molecules aligned to be twisted at a twist angle of 80° to 120° from one substrate to the other substrate, a pair of polarizing plates disposed outside the pair of substrates to sandwich the substrates and respectively having transmission axes for linearly polarizing incident light, a retardation plate disposed between the pair of polarizing plates such that an angle defined by an optical axis of the retardation plate, along which a refractive index is the maximum in a planar direction of the retardation plate, and the transmission axis of an adjacent one of the polarizing plates becomes 45°±5°, and voltage application means, connected to the electrodes, for changing a voltage applied to the liquid crystal layer to change a polarized state of light transmitted through the liquid crystal layer so as to change a color of light transmitted through the polarizing plate on an exit side.

According to the color liquid crystal display apparatus having the above-described arrangement, when light is transmitted through the incident-side polarizing plate, the light becomes linearly polarized light. When this linearly polarized light is transmitted through the retardation plate, light components having different wavelengths (to be referred to as wavelength components hereinafter) become elliptically polarized light components in different states. Of the elliptically polarized wavelength components, wavelength components having larger light components along the transmission axis of the exit-side polarizing plate (to be referred to as transmission axis components hereinafter) are transmitted through the polarizing plate more in amount than wavelength components having smaller transmission axis components. Therefore, the emerging light which is transmitted through the exit-side polarizing plate exhibits the color of a wavelength component whose component ratio is high. In this case, since the elliptically polarized light components of the different wavelengths change their elliptically polarized states in accordance with the aligned state of the molecules of the liquid crystal, the color of emerging light can be changed by changing the aligned state of the liquid crystal molecules.

In the above-described color liquid crystal display apparatus, two retardation plates may be arranged. In this case, the two retardation plates may be disposed on one side of the liquid crystal cell formed by sealing a liquid crystal between a pair of substrates, or may be respectively disposed on the two sides of the liquid crystal cell. A reflection plate may be provided for the color liquid crystal display apparatus to use the apparatus as a reflection type liquid crystal display apparatus. In this case, two retardation plates may also be disposed on one side of the liquid crystal cell or may be respectively disposed on the two sides thereof.

In addition, in the above-described color liquid crystal display apparatus, another polarizing plate may be disposed between the retardation plate and the liquid crystal cell, and the three polarizing plates are used such that the retardation plate and the liquid crystal cell are respectively sandwiched between two pairs of polarizing plates. With this structure, the liquid crystal cell serves as a shutter means for opening/closing an optical path, thus realizing a clear black display.

As a retardation plate used for the above-described color liquid crystal display apparatus, a so-called biaxial retardation plate or a twisted retardation plate may be used. The biaxial retardation plate used in the present invention is a retardation plate which satisfies $n_X > n_Y > n_Z$ where $n_X$ is the refractive index in the optical axis direction in which the refractive index is the maximum, $n_Y$ is the refractive index in a direction perpendicular to the optical axis direction in the planar direction of the retardation plate, and $n_Z$ is the refractive index in the direction of thickness. With the use of this retardation plate, a larger viewing angle can be obtained. The twisted retardation plate is a retardation plate in which material molecules are aligned to be twisted from one surface to the other surface in the same manner as a twisted-nematic liquid crystal. With the use of this retardation plate, an achromatic display can be easily obtained.

The above-described color liquid crystal display apparatus may use segment electrodes formed to have specific shapes in accordance with characters or graphic patterns to be displayed. The waveform of a driving voltage applied to each segment electrode may be formed by selecting a driving voltage from a plurality of voltages having difference magnitudes in accordance with a color selection signal and a display signal.

Furthermore, the above-described color liquid crystal display apparatus may be designed as an active matrix type color liquid crystal display apparatus of a TFT driving scheme, in which a plurality of pixel electrodes are regularly arranged on a substrate on one side of a liquid crystal cell, and thin-film transistors, each constituted by a source electrode connected to a pixel electrode, a drain electrode connected to a signal line for supplying a display signal, and a gate electrode connected to a scanning line for supplying a scanning signal, are respectively arranged, as switching elements, for the pixel electrodes.

According to the present invention, there is provided another color liquid crystal display apparatus comprising a pair of substrates having opposing surfaces on which electrodes are respectively formed with aligning films being formed to cover the electrodes, the aligning films having undergone aligning treatment in predetermined directions, a liquid crystal layer formed between the pair of substrates and having liquid crystal molecules aligned to be twisted at a twist angle of 80° to 120° from one substrate to the other substrate, a polarizing plate disposed outside one of the pair of substrates and having a transmission axis for linearly polarizing incident light, a reflection plate disposed on an opposite side to the polarizing plate with respect to the pair of substrates, a retardation plate disposed between the polarizing plate and the reflection plate and having an optical axis along which a refractive index is the maximum in a planar direction of the retardation plate, the retardation plate being arranged such that an angle defined by the optical axis and a transmission axis of the polarizing plate is 45°±5°, and voltage application means, connected to the electrodes, for changing a voltage applied to the liquid crystal layer to change a polarized state of light transmitted through the liquid crystal layer so as to change a color of light transmitted through the polarizing plate on an exit side.

A reflection type color liquid crystal display apparatus may be obtained by using one polarizing plate. In this apparatus, the polarizing plate serves as both an incident-side polarizing plate and an exit-side polarizing plate so that the same functions and effects as those of the above-described color liquid crystal display apparatus can be obtained.

Two retardation plates may be arranged in the above-described reflection type color liquid crystal display apparatus. In this case, the two plates may be disposed on one side or two sides of the liquid crystal cell.

In addition, in the reflection type color liquid crystal display apparatus, another polarizing plate may be disposed between the retardation plate and the liquid crystal cell such that the retardation plate or the liquid crystal cell is sandwiched between the two polarizing plates. With this structure, the liquid crystal cell serves as a shutter means for opening/closing an optical path, thereby realizing a clear black display.

As a retardation plate used for the reflection type color liquid crystal display apparatus, the above-described biaxial retardation plate or twisted retardation plate may be used. With the use of this biaxial retardation plate, an increase in field of angle can be achieved. With the use of the twisted retardation plate, an achromatic display can be easily obtained.

The reflection type color liquid crystal display apparatus may use segment electrodes. In this case, the waveform of a driving voltage applied to each segment electrode may be formed by selecting a driving voltage from a plurality of voltages having difference magnitudes in accordance with a color selection signal and a display signal.

Furthermore, the above-described reflection type color liquid crystal display apparatus may be designed as an active matrix type color liquid crystal display apparatus of a TFT driving scheme, in which a plurality of pixel electrodes are regularly arranged on a substrate on one side of a liquid crystal cell, and thin-film transistors, each constituted by a source electrode connected to a pixel electrode, a drain electrode connected to a signal line for supplying a display signal, and a gate electrode connected to a scanning line for supplying a scanning signal, are respectively arranged, as switching elements, for the pixel electrodes.

According to the present invention, there is provided still another color liquid crystal display apparatus comprising a pair of substrates having opposing surfaces on which electrodes are respectively formed with aligning films being formed to cover the electrodes, the aligning films having undergone aligning treatment in predetermined directions, a liquid crystal layer formed between the pair of substrates and having liquid crystal molecules aligned to be twisted at a twist angle of 80° to 120° from one substrate to the other substrate, a polarizing plate arranged outside one of the pair of substrates and having a transmission axis for linearly polarizing incident light, the polarizing plate being arranged such that an angle defined by a direction of an aligning treatment performed with respect to the aligning film on the adjacent substrate and the transmission axis is 45°±5°, a reflection plate disposed on an opposite side to the polarizing plate with respect to the pair of substrates, and voltage application means, connected to the electrodes, for changing a voltage applied to the liquid crystal layer to change a polarized state of light transmitted through the liquid crystal layer so as to change a color of light transmitted through the polarizing plate on an exit side.

According to this reflection type color liquid crystal display apparatus, when linearly polarized light which is transmitted through the polarizing plate passes through the liquid crystal layer, light components having different wavelengths become elliptically polarized light components in different states owing to only the birefringence of the liquid crystal layer. Of the elliptically polarized light components of the respective wavelengths, wavelength components having larger transmission axis components with respect to the exit-side polarizing plate are transmitted through the polarizing plate more in amount than the remaining wavelength components. Therefore, the emerging light which is transmitted through the exit-side polarizing plate exhibits the color of a wavelength component whose component ratio is high. In this case, since the elliptically polarized light components of the different wavelengths change their elliptically polarized states in accordance with the aligned state of the molecules of the liquid crystal, the color of emerging light can be changed by changing the aligned state of the liquid crystal molecules.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to FIGS. 1 to 38.

First Embodiment

Figure 1:
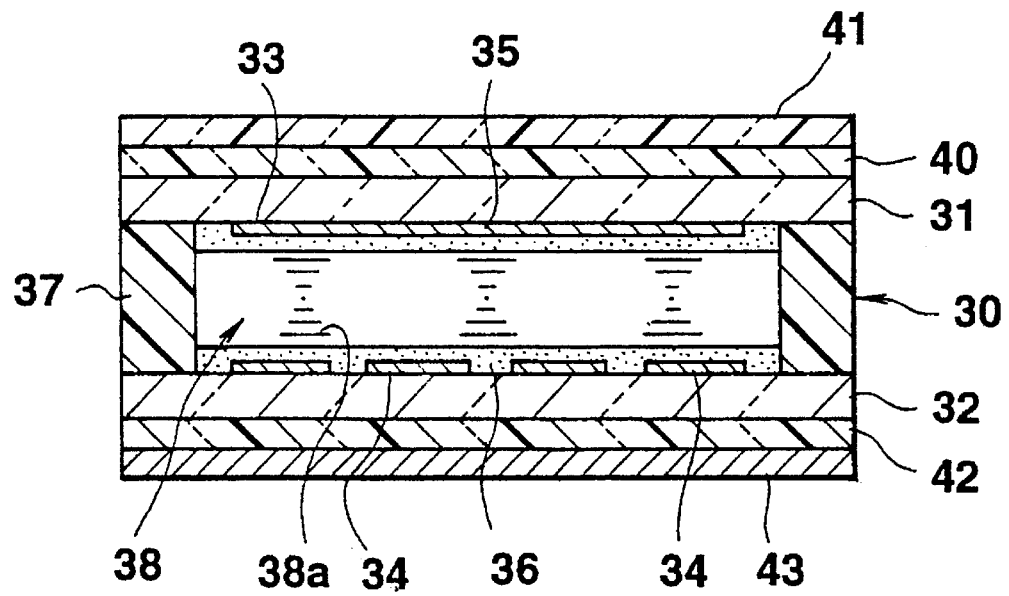
FIG. 1 is a sectional view showing a color liquid crystal display apparatus according to the first embodiment of the present invention.

As shown in FIG. 1, a color liquid crystal display apparatus according to the first embodiment of the present invention is a reflection type liquid crystal display apparatus, which is designed such that a pair of polarizing plates 41 and 42 are disposed to sandwich a liquid crystal cell 30, while one retardation plate 40 is disposed between the liquid crystal cell 30 and one polarizing plate (the upper polarizing plate shown on the upper side in this embodiment) 41, and a reflection plate 43 is disposed on the side (outer side) of the polarizing plate 42 opposite to the side which is in contact with the liquid crystal cell 30.

The liquid crystal cell 30 is of a TN type. More specifically, the liquid crystal cell 30 is formed as follows. A pair of upper and lower transparent substrates 31 and 32 respectively having transparent electrodes 33 and 34 formed thereon, and aligning films 35 and 36 formed thereon are Joined through a frame-like seal member 37. A liquid crystal 38 is then sealed in the space enclosed with the seal member 37 between the two substrates 31 and 32. Molecules 38a of this liquid crystal 38 are arranged such that they can be twisted at a twist angle of about 90° from the lower substrate 32 side to the upper substrate 31 side. The aligning films 35 and 36 have undergone aligning treatment in predetermined directions, respectively, by a rubbing method or the like. Liquid crystal molecules adjacent to the aligning films 35 and 36 are aligned along the directions of aligning treatment, respectively.

The retardation plate 40 is disposed such that its optical axis (phase advance or phase delay axis) which is the long axis direction of each material molecule and along which the refractive index is the maximum is obliquely shifted from the liquid crystal molecule aligning directions on the two substrate sides of the liquid crystal cell 30. The pair of polarizing plates 41 and 42 are disposed such that their transmission axes obliquely cross the optical axis of the retardation plate 40 at predetermined angles, respectively.

Figure 2:
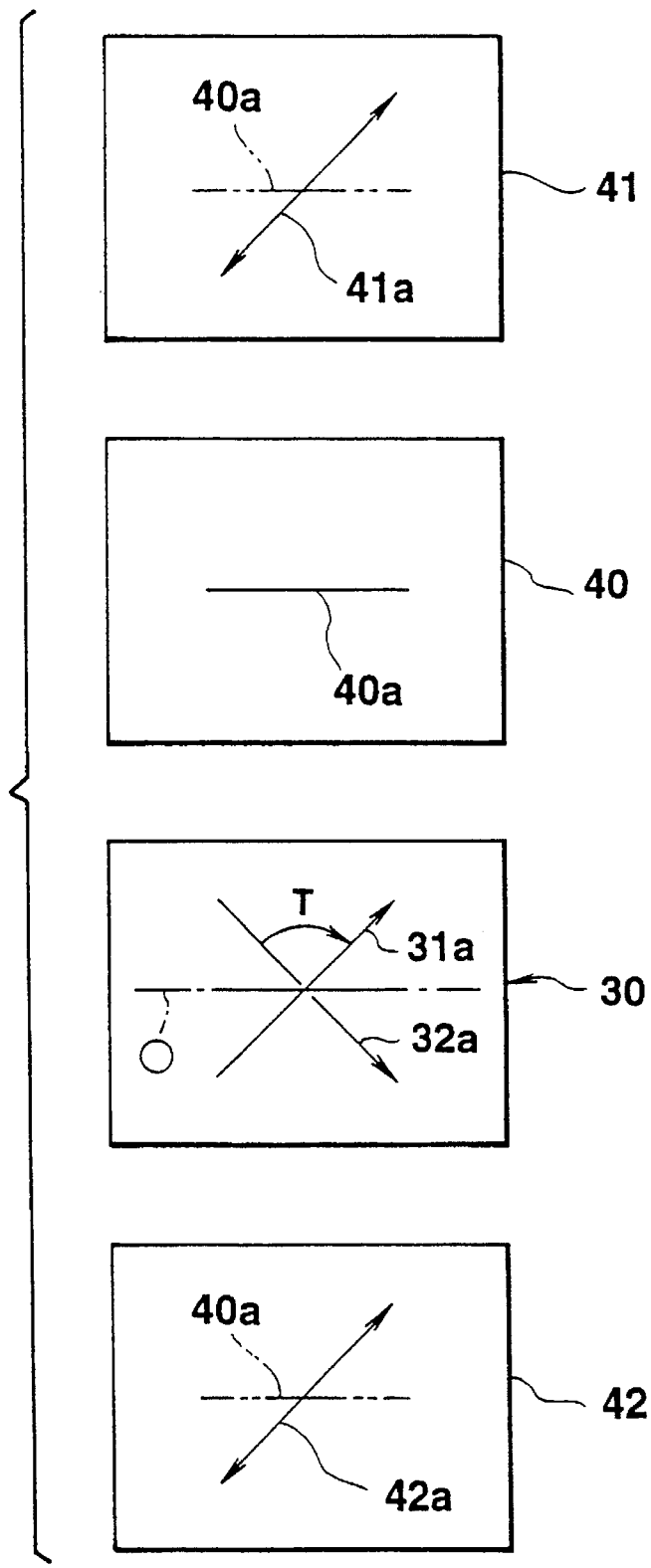
FIG. 2 is a view for explaining the positions/arrangement of the optical axes of the respective optical elements in the first embodiment.

FIG. 2 is a plan view showing the liquid crystal molecule aligning directions of the liquid crystal cell 30, the optical axis of the retardation plate 40, and the transmission axes of the pair of polarizing plates 41 and 42 in the liquid crystal display apparatus. Note that the illustration of the reflection plate 43 is omitted in this plan view and in the subsequent similar plan views. Referring to FIG. 2, reference numeral 31a denotes the liquid crystal molecule aligning direction of the liquid crystal cell 30 on the upper substrate side; and 32a, the liquid crystal molecule aligning direction of the liquid crystal cell 30 on the lower substrate side.

As shown in FIG. 2, the liquid crystal molecule aligning directions 31a and 32a of the liquid crystal cell 30 on the two substrate sides are tilted with respect to a reference line (horizontal line in FIG. 2) in opposite directions by 45°, respectively. With this arrangement, the molecules 38a of the liquid crystal 38 of the liquid crystal cell 30 are aligned such that they can be twisted by an angle of about 90° from the lower substrate side to the upper substrate side, as indicated by an arrow T in FIG. 2.

In addition, referring to FIG. 2, reference numeral 40a denotes an optical axis of the retardation plate 40; 41a, a transmission axis of the upper polarizing plate 41; and 42a, a transmission axis of the lower polarizing plate 42.

In this embodiment, the optical axis 40a is aligned with the reference line O. Therefore, the optical axis 40a of the retardation plate 40 and the liquid crystal molecule aligning direction 31a on the substrate (upper substrate 31) side adjacent to the retardation plate 40 cross each other at 45°.

Furthermore, in the embodiment, the transmission axes 41a and 42a of the polarizing plates 41 and 42 are set to be almost parallel to each other, and also obliquely cross the optical axis 40a of the retardation plate 40 at 45°.

The above-described color liquid crystal display apparatus is designed to be driven by applying a voltage between the electrodes 33 and 34 of the two substrates 31 and 32 of the liquid crystal cell 30. A display color is obtained by the polarizing effect of the retardation plate 40, whereas a background color is obtained by the polarizing effects of both the retardation plate 40 and the liquid crystal cell 30.

A coloring effect will be described first. External light (natural light or light from an illumination source) is linearly polarized by the upper polarizing plate 41 and incident on the retardation plate 40 whose optical axis 40a crosses the transmission axis 41a of the polarizing plate 41 at 45°. In the process of passing through the retardation plate 40, the light is polarized in accordance with a retardation value indicating the magnitude of the birefringent effect of the retardation plate 40 to become elliptically polarized light. In this case, wavelength components are set in different elliptically polarized states.

The elliptically polarized light emerging from the retardation plate 40 is transmitted through the liquid crystal cell 30. Since the liquid crystal 38 whose liquid crystal molecules are twist-aligned has birefringence, when the light is transmitted through the liquid crystal 38, it is influenced by the birefringent effect. As a result, the elliptically polarized state of the transmitted light changes. When this elliptically polarized light is incident on the lower polarizing plate 42, only light components, of the light components having various wavelengths in different elliptically polarized states, which propagate along the transmission axis 41a are transmitted through the lower polarizing plate 41 to emerge therefrom. In this case, since the intensity of the emerging light is proportional to the square of a value (transmission axis component) obtained by projecting the amplitude of the elliptically polarized light component of each wavelength component on the transmission axis, the color of the emerging light is substantially the same as that of a wavelength component which has a large transmission axis component and whose component ratio with respect to the emerging light is high.

The color changing effect of the liquid crystal cell 30 will be described next. In this liquid crystal display apparatus, since light which is incident through the upper polarizing plate 41 passes through the retardation plate 40 and the liquid crystal cell 30, the transmitted light is also influenced by the polarizing effect of the liquid crystal 38 of the liquid crystal cell 30 in a state wherein no ON voltage is applied between the electrodes 33 and 34 of the two substrates 31 and 32 of the liquid crystal cell 30 (the liquid crystal molecules 38a are twist-aligned).

That is, since the optical axis 40a of the retardation plate 40 and the liquid crystal molecule aligning direction 31a of the liquid crystal cell 30 on the substrate 31 (upper substrate) side adjacent to the retardation plate cross each other at 45°, the light which is elliptically polarized by the polarizing effect of the retardation plate 40 in the process of passing therethrough is further set in a different polarized state in the process of passing through the liquid crystal layer of the liquid crystal cell 30.

For this reason, while no ON voltage is applied to the liquid crystal cell 30, light transmitted through the lower polarizing plate 42 has a color different from a light color obtained by the polarizing effect of the retardation plate 40. This color becomes a background color. Note that the background color is determined by a retardation Re of the retardation plate 40 and a value Δnd (the product of a refractive index anisotropy Δn and a liquid crystal layer thickness d of the liquid crystal 38) of the liquid crystal cell 30.

With an increase in voltage applied between the electrodes 33 and 34 of the liquid crystal cell 30, the liquid crystal molecules 38a of the liquid crystal cell 30 become perpendicular to the surfaces of the substrates 31 and 32, and the birefringence is substantially nullified. As a result, the polarizing effect of the liquid crystal cell 30 is nullified.

Although the value Δnd of the liquid crystal cell 30 is the product of the refractive index anisotropy Δn and the liquid crystal layer thickness d of the liquid crystal 38, the refractive index anisotropy Δn of the liquid crystal 38 decreases as the liquid crystal molecules 38a become perpendicular to the surfaces of the substrates 31 and 32 upon application of a voltage. When the liquid crystal molecules 38a are raised/aligned vertically, the refractive index anisotropy Δn becomes "0". Therefore, the value Δnd of the liquid crystal cell 30 finally becomes "0".

When an ON voltage is applied to the liquid crystal cell 30 to set Δn=0, the polarizing effect of the liquid crystal 38 is substantially nullified. For this reason, elliptically polarized light emerging from the retardation plate 40 is directly transmitted through the liquid crystal cell 30 and incident on the lower polarizing plate 42 without being polarized, and the light transmitted through the polarizing plate 42 becomes colored light by only the polarizing effect of the retardation plate 40. This color becomes a display color.

The light transmitted through the lower polarizing plate 42 is reflected by the reflection plate 43 to emerge from the upper surface side of the display apparatus in a reverse optical path to that described above. As a result, a display pattern is displayed with the above-mentioned background color and display color.

According to the above-described liquid crystal display apparatus, therefore, a color display can be obtained without using any color filter, and a bright color display can be easily obtained.

A light intensity I of a display on the color liquid crystal display apparatus is obtained with and without a voltage applied to the liquid crystal cell 30. The light intensity (of a background color) I obtained when a voltage is applied to the liquid crystal cell 30 is given by:

where Re is the retardation of the retardation plate, Δn is the refractive index anisotropy of the liquid crystal, d is the liquid crystal layer thickness of the liquid crystal cell; and λ is the wavelength.

The light intensity I of a display color obtained when a voltage for setting Δn=0 is applied to the liquid crystal cell 30 is given by:

$$I = \frac{1}{2} \cos^4 \pi \frac{Re}{\lambda} \quad (2)$$

The display color of the liquid crystal display apparatus becomes a color corresponding to the value of the retardation Re of the retardation plate 40, and the background color becomes a color corresponding to both the retardation Re of the retardation plate 40 and the value Δnd of the liquid crystal cell 30. The light intensities I given by equations (1) and (2) change depending on the wavelength λ of transmitted light, and exhibit high intensities with respect to specific wavelength components.

Therefore, the retardation Re of the retardation plate 40 and the value Δnd of the liquid crystal cell 30 may be selectively set to values with which the light intensities I expressed by equations (1) and (2) become sufficiently large values, and colored light having high chromatic purity can be obtained.

Table 1 shows display modes of the liquid crystal display apparatus. In the display apparatus in each mode, the value Δnd of the liquid crystal cell 30 is set to 400 nm, and the value of the retardation Re of the retardation plate 40 is changed. In addition, the optical axis 40a of the retardation plate 40 and the liquid crystal molecule aligning direction 31a on the substrate (upper substrate) 31 side adjacent to the retardation plate cross each other at an angle of 45°; the transmission axes 41a and 42a of the two polarizing plates 41 and 42 are parallel to each other; and the transmission axes 41a and 42a of the polarizing plates 41 and 42 cross the optical axis 40a of the retardation plate 40 at an angle of 45°.

TABLE 1

| Mode | Re of Retardation Plate (nm) | Display Color | Background Color |
|---|---|---|---|
| R1 | 1220 | Red | Blue |
| G1 | 1100 | Green | Bluish purple |
| B1-1 | 900 | Blue | Yellow |
| B1-2 | 450 | Blue | Yellow |

Δnd (of liquid crystal cell) = 400 nm

In each mode, as the voltage applied to the liquid crystal cell 30 is increased, the color of transmitted light variously changes from a background color, and finally (when the applied voltage becomes the voltage for setting Δn=0) becomes the display color shown in Table 1.

As shown in Table 1, in the display apparatus in each of modes R1, G1, B1-1, and B1-2, the display color and the background color are complementary to each other or have a color difference close to a relationship of complementary colors, thereby obtaining a display of high color contrast.

In the above embodiment, the pair of polarizing plates 41 and 42 are disposed such that the transmission axes 41a and $$I = \frac{1}{2} \left\{ \frac{1}{2} + \left( \cos 2\pi \frac{Re}{\lambda} \right) \left( \frac{1}{1+u^2} \sin^2 \frac{\pi}{2} \sqrt{1+u^2} - \frac{1}{2} \right) - \left( \sin 2\pi \frac{Re}{\lambda} \right) \frac{u}{1+u^2} \sin^2 \frac{\pi}{2} \sqrt{1+u^2} \right\}^2 \quad (1)$$

$$u = \frac{2\Delta nd}{\lambda}$$

Figure 3:
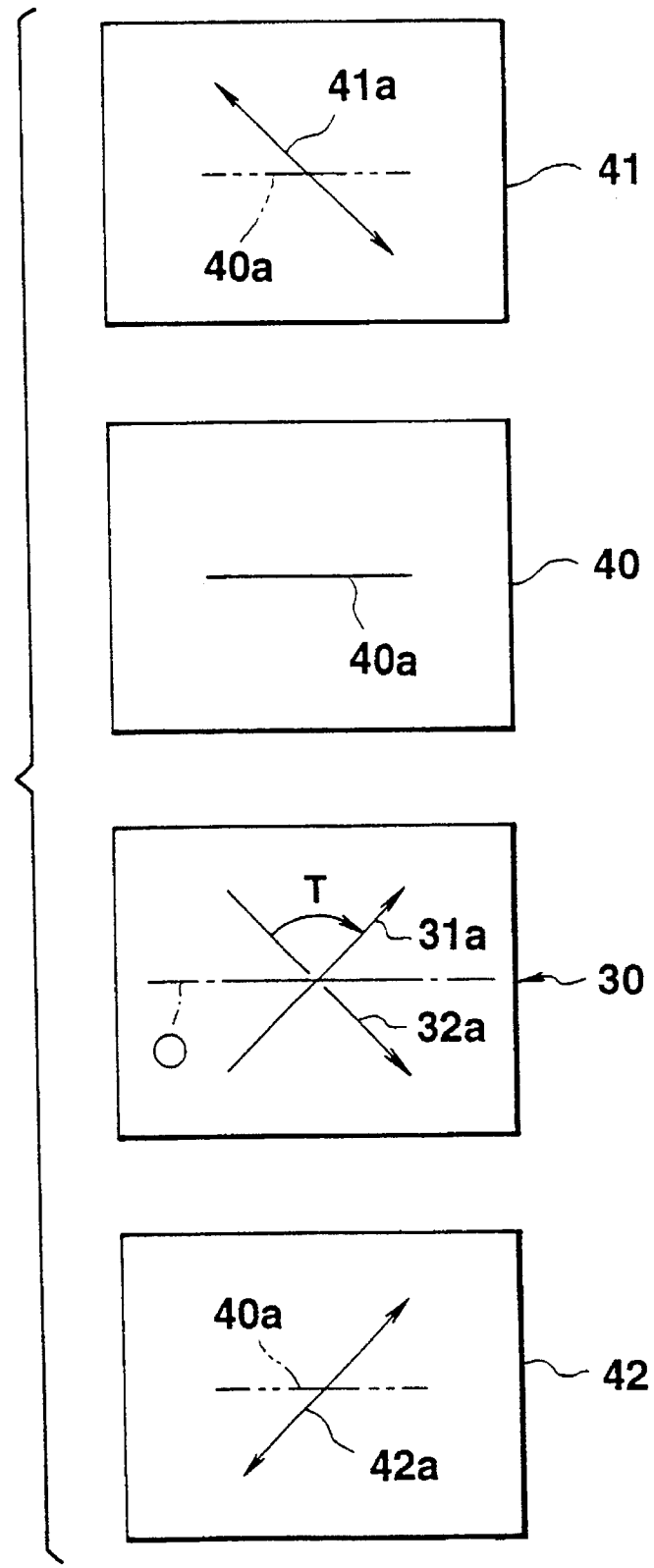
FIG. 3 is a view for explaining the positions/arrangement of the optical axes of the respective optical elements in a modification of the first embodiment.

42a are set to be almost parallel to each other. However, as shown in FIG. 3, the polarizing plates 41 and 42 may be disposed such that the transmission axes 41a and 42a are almost perpendicular to each other. With this arrangement, the same display as that in the above embodiment can be obtained.

In this case, since the transmission axes 41a and 42a of the polarizing plates 41 and 42 are perpendicular to each other, the light intensity (of the background color) I obtained when no voltage is applied to the liquid crystal cell 30 is given by:

$$I = \frac{1}{2} \left\{ \frac{1}{2} + \left( \cos 2\pi \frac{Re}{\lambda} \right) \left( \frac{1}{2} - \frac{1}{1+u^2} \sin^2 \frac{\pi}{2} \sqrt{1+u^2} \right) + \left( \sin 2\pi \frac{Re}{\lambda} \right) \frac{u}{1+u^2} \sin^2 \frac{\pi}{2} \sqrt{1+u^2} \right\}^2 \quad (3)$$

$$u = \frac{2\Delta nd}{\lambda}$$

where Re is the retardation of the retardation plate, Δn is the refractive index anisotropy of the liquid crystal, d is the liquid crystal layer thickness of the liquid crystal cell, and λ is the wavelength. The light intensity I of the display color obtained when a voltage for setting Δn=0 is applied to the liquid crystal cell 30 is given by:

$$I = \frac{1}{2} \sin^4 \pi \frac{Re}{\lambda} \quad (4)$$

In this embodiment, the display color of the liquid crystal display apparatus also becomes a color corresponding to the value of the retardation Re of the retardation plate 40, and the background color becomes a color corresponding to both the retardation Re of the retardation plate 40 and the value Δnd of the liquid crystal cell 30. The light intensities I given by equations (3) and (4) change depending on the wavelength λ of transmitted light, and exhibit high intensities with respect to specific wavelength components.

Therefore, the retardation Re of the retardation plate 40 and the value Δnd of the liquid crystal cell 30 may be selectively set to values with which the light intensities I expressed by equations (3) and (4) become sufficiently large values, and colored light having high chromatic purity can be obtained.

Table 2 shows display modes of the liquid crystal display apparatus of this embodiment. In the display apparatus in each mode, the value Δnd of the liquid crystal cell 30 is set to 400 nm, and the value of the retardation Re of the retardation plate 40 is changed. In addition, the optical axis 40a of the retardation plate 40 and the liquid crystal molecule aligning direction 31a on the substrate (upper substrate) 31 side adjacent to the retardation plate cross each other at an angle of 45°; the transmission axes 41a and 42a of the two polarizing plates 41 and 42 are perpendicular to each other; and the transmission axes 41a and 42a of the polarizing plates 41 and 42 cross the optical axis 40a of the retardation plate 40 by an angle of 45°.

TABLE 2

| Mode | Re of Retardation Plate (nm) | Display Color | Background Color |
|---|---|---|---|
| R2 | 1530 | Red | Green |
| G2 | 1380 | Green | Reddishpurple |
| B2-1 | 1120 | Blue | Yellow green |
| B2-2 | 670 | Blue | Brown |

Δnd (of liquid crystal cell) = 400 nm

As shown in Table 2, in the display apparatus in each of modes R2, G2, B2-1, and B2-2, the display color and the background color are complementary to each other or have a color difference close to a relationship of complementary colors, thereby obtaining a display of high color contrast.

In each embodiment described above, both the angular differences between the optical axis 40a of the retardation plate 40 and the liquid crystal molecule aligning direction 31a on the substrate (upper substrate) 31 side adjacent to the retardation plate and between the transmission axes 41a and 42a of the polarizing plates 41 and 42 and the optical axis 40a of the retardation plate 40 are set to 45°. However, these angular differences are not limited to 45° and may be arbitrarily set. However, in order to obtain a satisfactory coloring effect with high purity by using the retardation plate 40, at least the angular difference between the transmission axes 41a and 42a of the polarizing plates 41 and 42 and the optical axis 40a of the retardation plate 40 is preferably set to 45°±5°.

In addition, the retardation plate 40 has two optical axes, i.e., a phase advance axis and a phase delay axis, which are perpendicular to each other. Either the phase advance axis or the phase delay axis may be used as the optical axis 40a which crosses the transmission axis 41a of the adjacent polarizing plate 41 at 45°.

Furthermore, in the above embodiment, the retardation plate 40 is disposed between the liquid crystal cell 30 and the upper polarizing plate 41. However, the retardation plate 40 may be disposed between the liquid crystal cell 30 and the lower polarizing plate 42. The liquid crystal display apparatus of the present invention is not limited to a reflection type, and may be designed as a transmission type liquid crystal display apparatus using no reflection plate or a liquid crystal display apparatus using a semi-transmission/reflection plate and serving both as a reflection type and a transmission type.

Second Embodiment

The second embodiment exemplifies the case wherein retardation plates are respectively disposed on the two sides of a liquid crystal cell. The same reference numerals in the second and subsequent embodiments denote the same parts as in the first embodiment, and a description thereof will be omitted.

Figure 4:
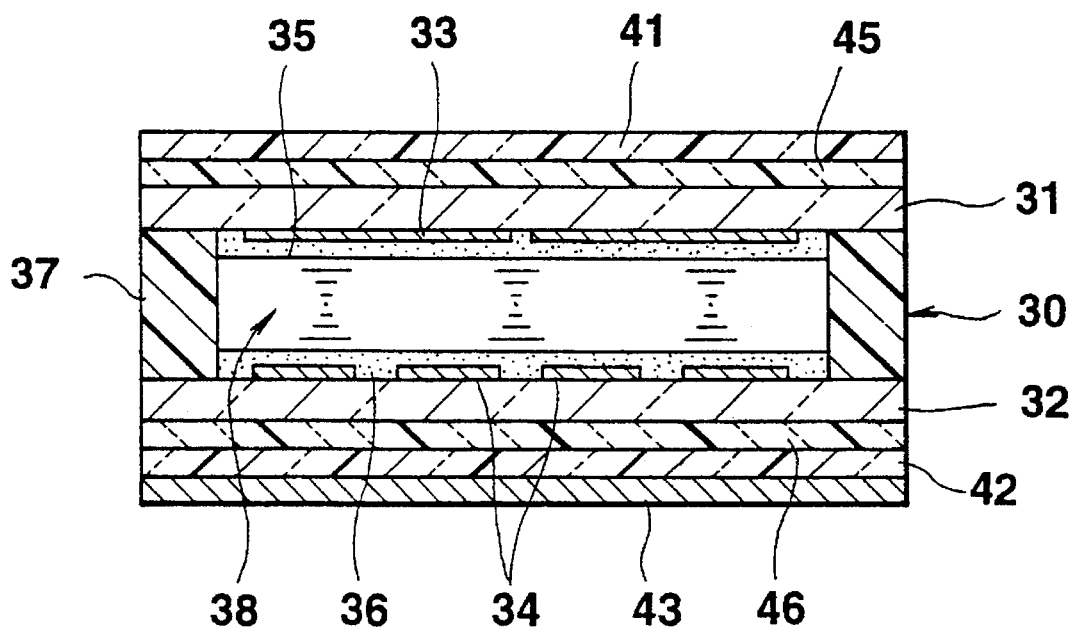
FIG. 4 is a sectional view showing a color liquid crystal display apparatus according to the second embodiment of the present invention.

A color liquid crystal display apparatus of this embodiment is designed as follows. As shown in FIG. 4, a pair of upper and lower polarizing plates 41 and 42 are disposed to sandwich a liquid crystal cell 30. A first retardation plate 45 is disposed between the liquid crystal cell 30 and the upper polarizing plate 41. A second retardation plate 46 is disposed between the liquid crystal cell 30 and the lower polarizing plate 42. In addition, a reflection plate 43 is disposed on the rear surface (lower surface) of the polarizing plate 42.

In this case, the liquid crystal cell 30 is of a segment display type which is driven in a time-divisional manner. A transparent electrode 33 formed on an upper substrate 31 is divided into a plurality of common electrodes, whereas a transparent electrode 34 formed on a lower substrate 32 is divided into a plurality of segment electrodes, each having a shape corresponding to a display pattern.

Of the two retardation plates 45 and 46, the incident-side retardation plate, i.e., the first retardation plate 45 disposed between the liquid crystal cell 30 and the polarizing plate 41, is arranged such that its optical axis is obliquely shifted from the transmission axis of the upper polarizing plate 41 by a predetermined angle. The retardation plate on the opposite side, i.e., the second retardation plate 46 disposed between the liquid crystal cell 30 and the lower polarizing plate 42, is arranged such that its optical axis is set in an arbitrary direction.

Figure 5:
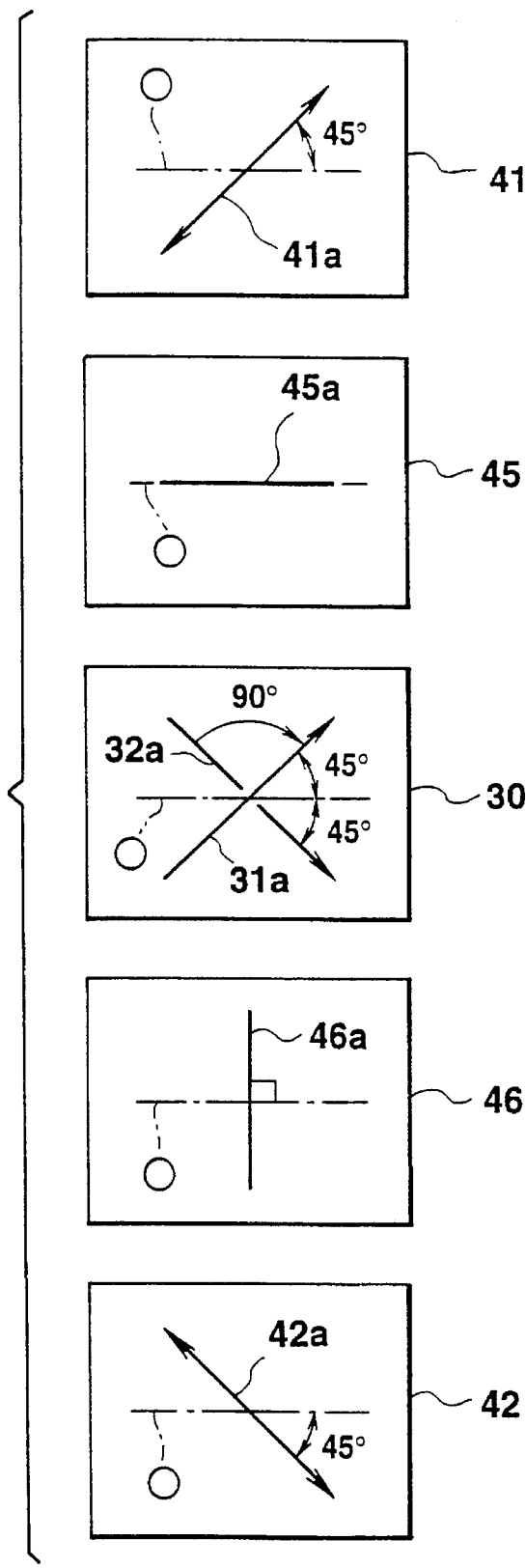
FIG. 5 is a view showing the positions/arrangement of the optical axes of the respective optical elements in the second embodiment.

Referring to FIG. 5, reference numeral 41a denotes a transmission axis of the polarizing plate 41; and 45a, an optical axis of the first retardation plate 45. In this embodiment, the upper polarizing plate 41 is disposed such that the transmission axis 41a is shifted/rotated counterclockwise from a reference line (horizontal line in FIG. 5) O by 45°, whereas the first retardation plate 45 is disposed such that the optical axis 45a is parallel to the reference line O. In addition, the angular difference between the optical axis 45a of the first retardation plate 45 and the transmission axis 41a of the upper polarizing plate 41 is set to be 45°.

Referring to FIG. 5, reference numeral 46a denotes the optical axis of the second retardation plate 46. In this embodiment, the second retardation plate 46 is disposed such that the optical axis 46a is perpendicular to the reference line O, and the optical axis 45a of the first retardation plate 45 is set to be perpendicular to the optical axis 46a of the second retardation plate 46.

In the above-described color liquid crystal display apparatus, light (natural light or light from an illumination source) which is incident from the front surface side is reflected by the reflection plate 43 on the rear surface side, thereby performing a display. Incident light from the front surface side passes through the upper polarizing plate 41, the first retardation plate 45, the liquid crystal cell 30, the second retardation plate 46, and the lower polarizing plate 42 and is reflected by the reflection plate 43. The reflected light passes through the lower polarizing plate 42, the second retardation plate 46, the liquid crystal cell 30, the first retardation plate 45, and the upper polarizing plate 41 again and emerges.

In this color liquid crystal display apparatus, incident light is linearly polarized by the upper polarizing plate 41 and is elliptically polarized by the polarizing effect of the first retardation plate 45 in the process of passing therethrough. The elliptically polarized light is then set in a different polarized state owing to the polarizing effect of the liquid crystal cell 30 in the process of passing therethrough. Furthermore, the light is set in a different polarized state owing to the polarizing effect of the second retardation plate 46 in the process of passing therethrough.

For this reason, light which is incident on the lower polarizing plate 42 through the first retardation plate 45, the liquid crystal cell 30, and the second retardation plate 46 is constituted by elliptically polarized light components which are respectively set in different polarized states in accordance with their wavelengths owing to the polarizing effects of the two retardation plates 45 and 46 and the liquid crystal cell 30. Of these elliptically polarized light components, only transmission axis light components are transmitted through the lower polarizing plate 42 to become colored light.

The colored light transmitted through the lower polarizing plate 42 is reflected by the reflection plate 43 to emerge from the upper surface side of the display apparatus in a reverse optical path to that described above. As a result, a display pattern is displayed with this colored light.

In this case, the colored light reflected by the reflection plate 43 is constituted by only the transmission axis light components, of the elliptically polarized light components obtained by the polarizing effects of the retardation plates 45 and 46 and the liquid crystal cell 30, which are transmitted through the lower polarizing plate 42. This reflected colored light is transmitted through the second retardation plate 46, the liquid crystal cell 30, and the first retardation plate 45 again. In this process, the light is influenced by the polarizing effects again, and the amount of transmission axis components, of wavelength components having a low component ratio, which can be transmitted through the upper polarizing plate 41 becomes smaller. As a result, the colored light which is transmitted through the upper polarizing plate 41 and emerges therefrom becomes light having higher color purity than the colored light reflected by the reflection plate 43.

As described above, the color liquid crystal display apparatus is designed to produce transmitted colored light without using any color filter, and can sufficiently increase the brightness of a display by increasing the transmittance.

In the conventional color liquid crystal display apparatus, since the display color of each of the intersections between the electrodes of the liquid crystal cell is determined by the color of a color filter disposed at each intersection, only one display color can be displayed at each intersection. In contrast to this, in the color liquid crystal display apparatus of the above embodiment, colored light components are obtained by the polarizing effects of the two retardation plates 45 and 46 and by the polarizing effects of the retardation plates 45 and 46 and the liquid crystal cell 30, and the color of light obtained by these polarizing effects changes in accordance with a voltage applied to the liquid crystal cell 30.

The display color of this color liquid crystal display apparatus is determined by the values of retardations Re1 and Re2 of the retardation plates 45 and 46, a value $\Delta n.d$ and liquid crystal molecule twist angle of the liquid crystal cell 30, the angular difference between the transmission axis 41a of the upper polarizing plate 41 and the optical axis 45a of the first retardation plate 45, the direction of the optical axis 46a of the second retardation plate 46, the angular difference between the liquid crystal molecule aligning direction of the liquid crystal cell 30 and the optical axis 46a of the second retardation plate 46, and the directions of the transmission axes 41a and 42a of the upper and lower polarizing plates 41 and 42.

As shown in FIG. 5, assume that the angular difference between the transmission axis 41a of the upper polarizing plate 41 and the optical axis 45a of the first retardation plate 45 is 45°; the direction of the optical axis 46a of the second retardation plate 46 is perpendicular to the optical axis 45a of the first retardation plate 45; the liquid crystal molecule aligning direction 31a of the liquid crystal cell 30 on the upper substrate 31 side is parallel to the transmission axis 41a of the upper polarizing plate 41; and the optical axes 41a and 42a of the upper and lower polarizing plates 41 and 42 are perpendicular to each other. In this case, for example, the retardations Re1 and Re2 of the first and second retardation plates 45 and 46 are set to be 450 nm, and the value $\Delta n.d$ and liquid crystal molecule twist angle of the liquid crystal cell 30 are set to be 1.24 μm and 90°, respectively. When the liquid crystal molecules of the liquid crystal cell 30 are in an initial twist-aligned state, the display color is "light blue". when the liquid crystal molecules are raised/aligned vertically, the display color becomes "black". In addition, as the liquid crystal molecules are raised/aligned from the initial twist-aligned state, the display color becomes "purple" and "yellow" with a high light intensity and high color purity.

The reason why the display color becomes "black" when the liquid crystal molecules of the liquid crystal cell 30 are raised/aligned vertically is that the retardation Re1 of the first retardation plate 45 is equal to the retardation Re2 of the second retardation plate 46, while the optical axis 45a of the first retardation plate 45 is perpendicular to the optical axis 46a of the second retardation plate 46, and the transmission axes 41a and 42a of the upper and lower polarizing plates 41 and 42 are perpendicular to each other. Without the polarizing effect of the liquid crystal cell 30, elliptically polarized light emerging from the first retardation plate 45 is restored to the original linearly polarized light (the linearly polarized light incident on the apparatus through the upper polarizing plate 41) by the second retardation plate 46, and all the linearly polarized light is absorbed by the lower polarizing plate 42. As a result, the display color becomes "black".

Table 3 shows the relationship between the voltage applied to the liquid crystal cell 30 of the color liquid crystal display apparatus and the display color. In Table 3, the value of each applied voltage is an RMS voltage value applied between the electrodes 33 and 34 of the liquid crystal cell 30.

TABLE 3

|    | Applied Voltage | Display Color |
|----|----------------|---------------|
| V1 | 0.6 V or less  | Light blue    |
| V2 | 0.84 to 0.92 V | Purple        |
| V3 | 1.04 to 1.12 V | Yellow        |
| V4 | 11.4 V or more | Black         |

As shown in Table 3, the display color of the above-described color liquid crystal display apparatus changes in accordance with the voltage applied to the liquid crystal cell 30. According to this color liquid crystal display apparatus, therefore, the display color of the same portion, i.e., a portion corresponding to the same segment electrode 34, can be changed to a plurality of colors by controlling the voltage applied between the electrodes 33 and 34 of the liquid crystal cell 30.

Figure 6:
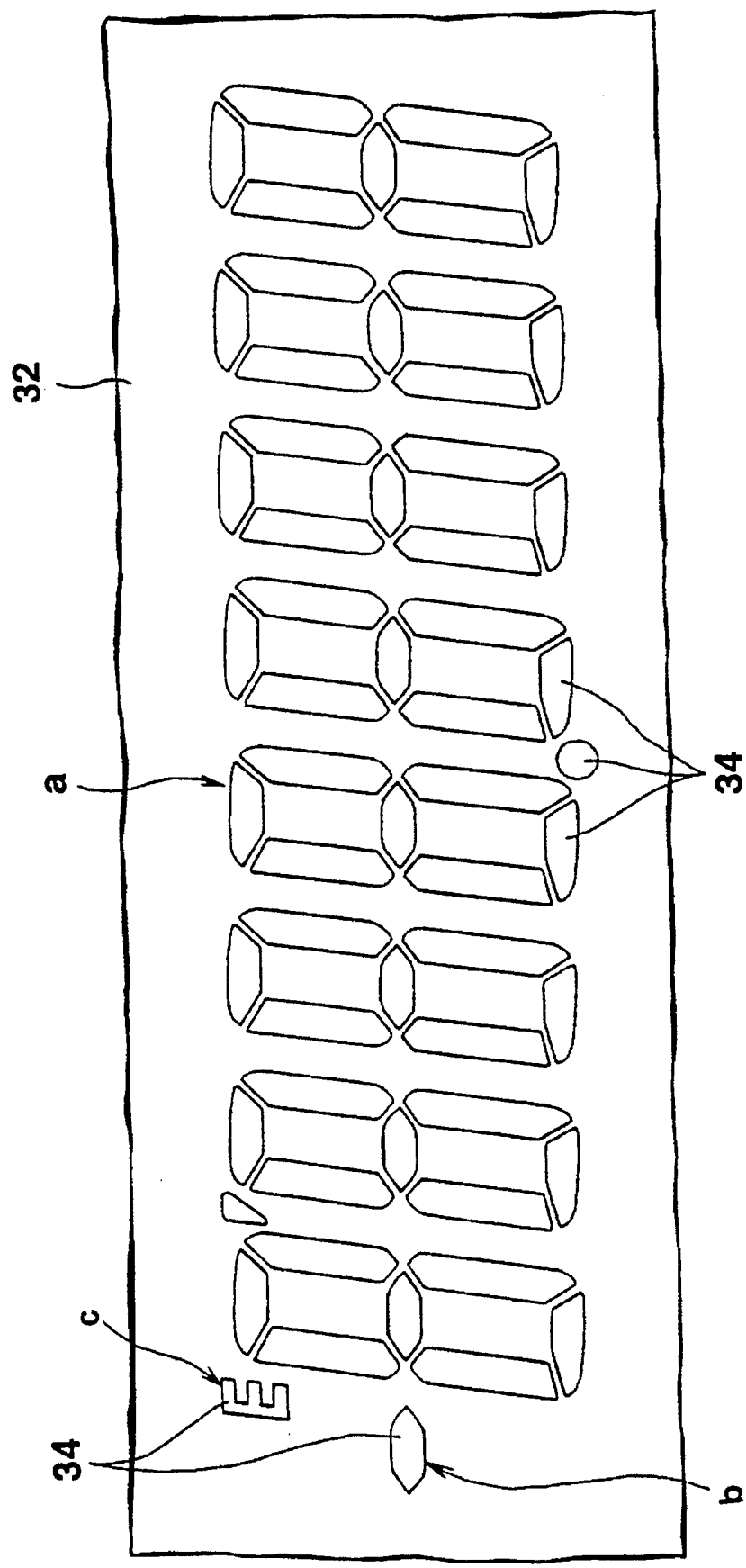
FIG. 6 is a view showing an electrode pattern in a color liquid crystal display apparatus used for an electronic portable calculator as an example of the second embodiment.
Figure 7:
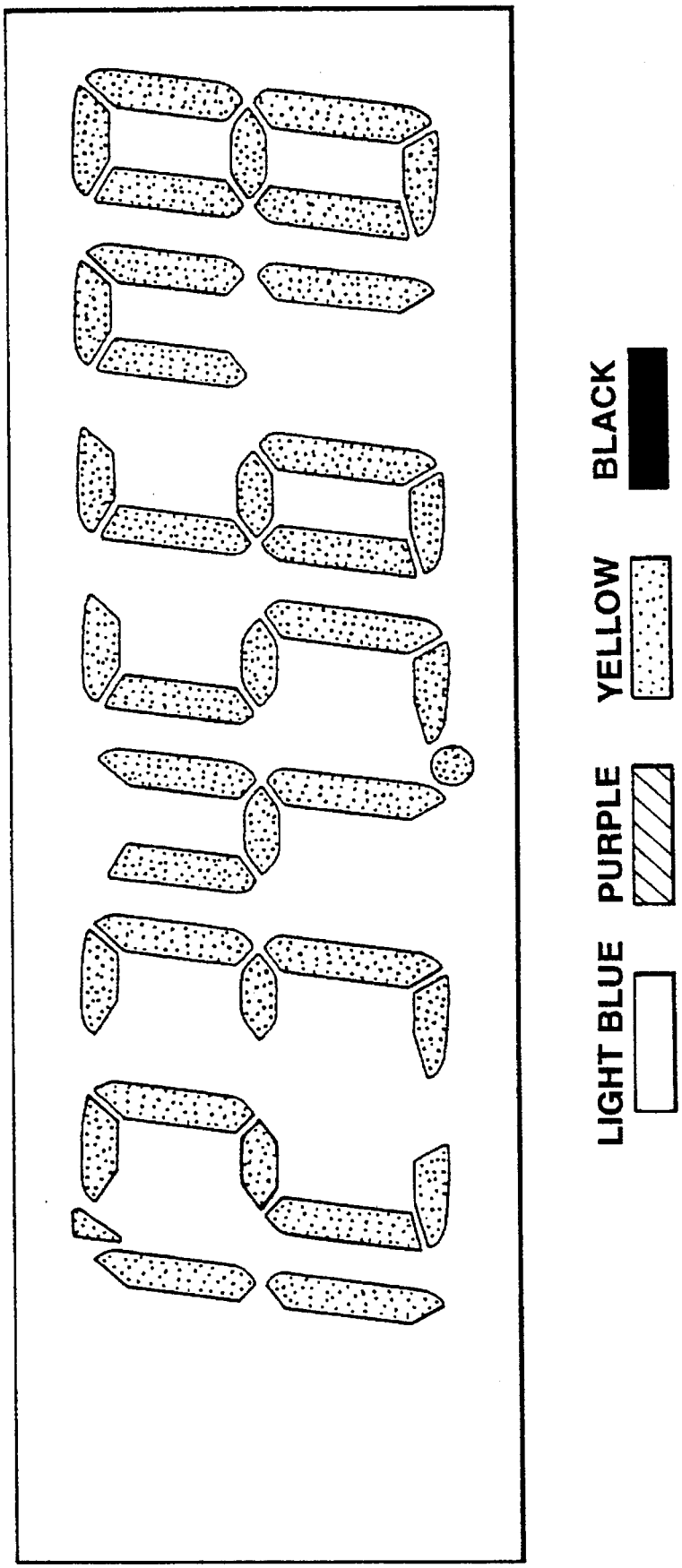
FIG. 7 is a view for explaining a display state based on the electrode pattern.
Figure 8:
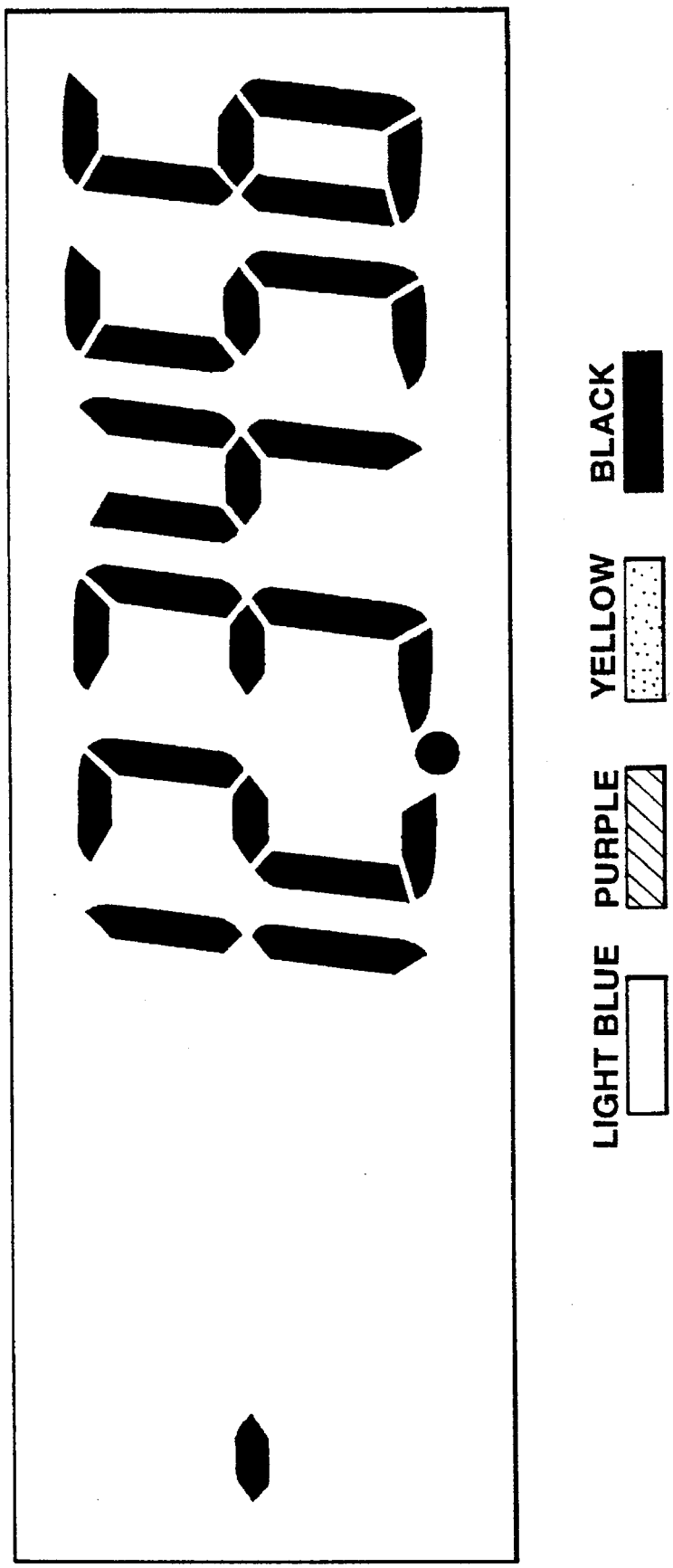
FIG. 8 is a view for explaining another display state based on the electrode pattern.
Figure 9:
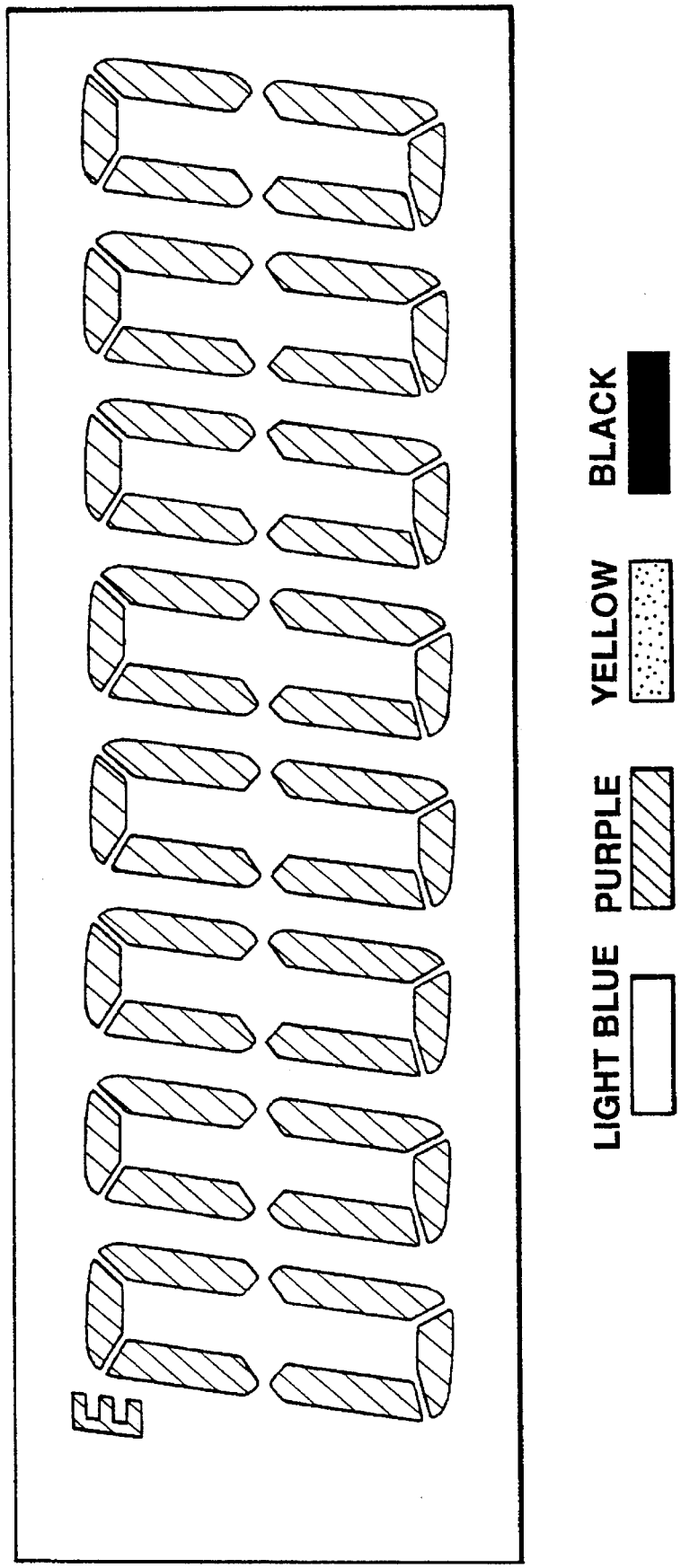
FIG. 9 is a view for explaining still another display state based on the electrode pattern.
Figure 10:
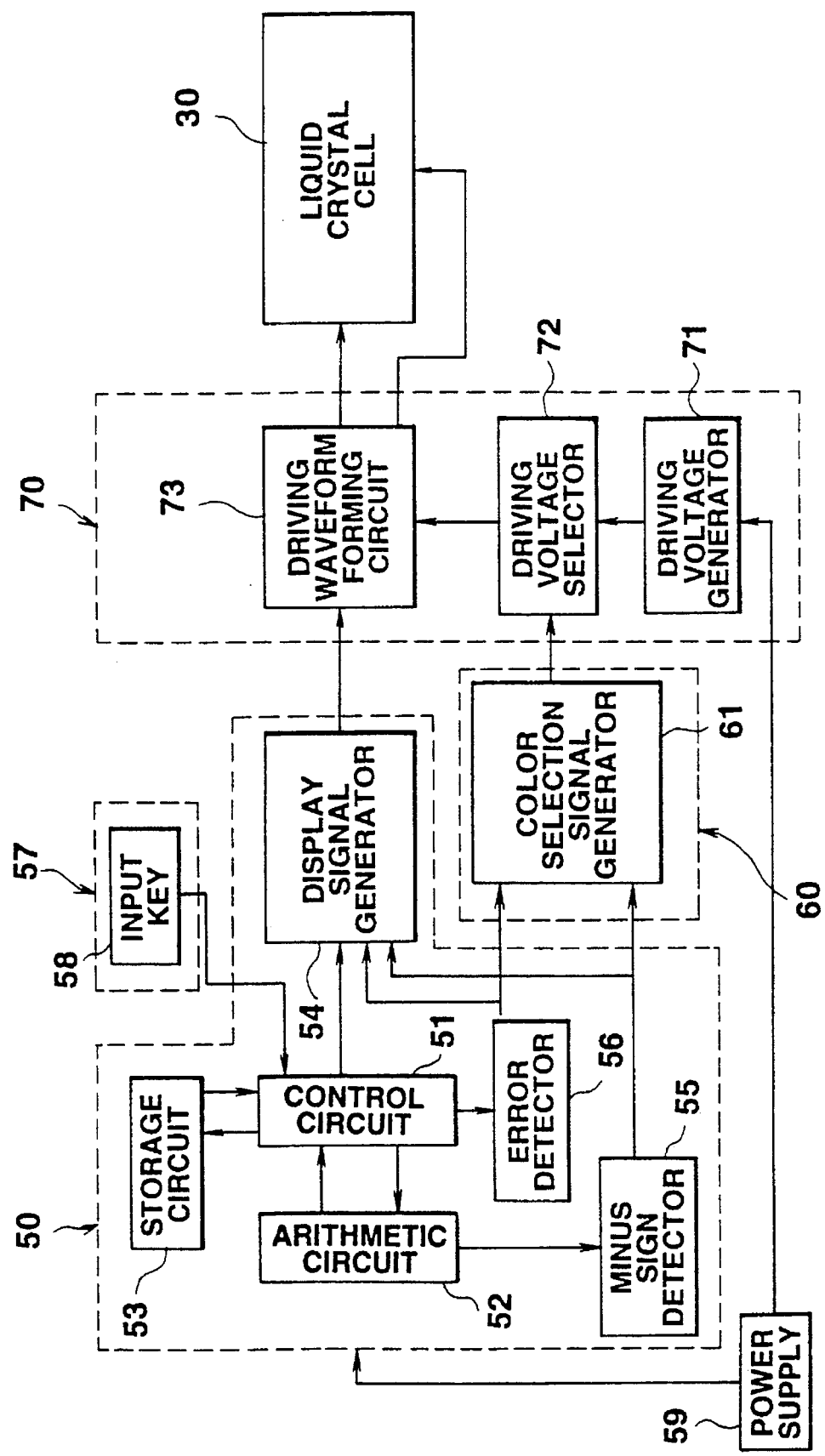
FIG. 10 is a block diagram showing a driving circuit for the color liquid crystal display apparatus for the electronic portable calculator.

A detailed display example of the above-described color liquid crystal display apparatus will be described below. FIGS. 6 to 10 show a case wherein the color liquid crystal display apparatus is applied to a calculator (an electronic portable calculator). FIG. 6 shows the shapes of segment electrodes 34 formed on one substrate 32 of the liquid crystal cell 30. FIGS. 7 to 9 show the display states of the electronic portable calculator in operation. FIG. 10 is a block diagram showing the circuit arrangement of the calculator.

The segment electrodes 34 formed on one substrate 32 of the liquid crystal cell 30 will be described first. As the segment electrodes 34, as shown in FIG. 6, number display electrodes a corresponding to eight digits, a "−" (minus) display electrode b, and an "E" (error) display electrode c are formed.

This calculator is designed to display numerical values up to eight digits, display "−" if the displayed numerical value is a negative value, and display "E" if an error occurs. These values and symbols are displayed in different colors, as shown in FIGS. 7 to 9.

In this display example, the voltage applied to the liquid crystal cell 30 and the display color have the relationship indicated by Table 3. The display color of the region where no segment electrodes 34 are formed (the region where no voltage is applied) is always "light blue". In addition, of the portions corresponding to the segment electrodes 34, the display color of a portion where a driving voltage V1 having a voltage value (RMS) of 1.0 V or less is applied between the common electrode 33 and the segment electrode 34 is also "light blue".

This calculator operates in the following manner. When display data is a positive ("+") numerical value and no error is involved, the numerical value ( "1,234.5678" in FIG. 7 ) is displayed in "yellow" in the "light blue" background, as shown in FIG. 7. If display data is a negative ("−") numerical value, "−" and the numerical value ("12.3456" in FIG. 8) are displayed in "black" in the "light blue" background, as shown in FIG. 8. If an error occurs, "E" and "0"s corresponding to eight digits are displayed in "purple" in the "light blue" background.

That is, the above-described calculator is designed to perform display operations with different colors, respectively, in cases wherein display data is a positive numerical value, display data is a negative numerical value, and an error occurs. According to this calculator, whether display data is positive or negative, or an error has occurred can be clearly recognized without overlooking it as compared with a calculator having only one display color.

The circuit arrangement designed to cause the calculator to perform the above-described display operation will be described next.

As shown in FIG. 10, the circuit of this calculator is constituted by a calculator circuit section 50, a color control section 60, a display driver 70, and a power supply 59. The calculator circuit section 50 performs an arithmetic operation in accordance with numerical values and an arithmetic instruction input upon operation of an input key 58 of a key input section 57, and outputs a display data signal for causing the liquid crystal cell 30 to display the operation result, together with a state signal indicating a state, e.g., "minus" or "error". The color control section 60 receives the state signal from the calculator circuit section 50 and outputs a color selection signal for selecting a display color. The display driver 70 serves to drive the liquid crystal cell 30 upon receiving the display data signal from the calculator circuit section 50 and the color selection signal from the color control section 60. The power supply 59 supplies power to these components.

The calculator circuit section 50 has an arrangement similar to that of the circuit portion of a general electronic portable calculator. More specifically, the calculator circuit section 50 comprises a control circuit 51, an arithmetic circuit 52, a storage circuit 53, and a display signal generator 54. The control circuit 51 receives input numerical values and an arithmetic instruction from the key input section 57 and controls an arithmetic operation, storage, a display data output operation, and the like. The arithmetic circuit 52 performs arithmetic processing of numerical values and the like in response to an instruction from the control circuit 51. The storage circuit 53 stores the operation result and the like. The display signal generator 54 generates a display data signal for displaying data such as input numerical values from the key input section 57 and the operation result and the like obtained by the arithmetic circuit 52.

The calculator circuit section 50 further includes a minus sign detector 55 and an error detector 56. The minus sign detector 55 serves to detect the minus sign (negative carry) of the operation result. The error detector 56 serves to detect errors in input numerical values, an arithmetic instruction, the operation result, and the like. State detection signals from the minus sign detector 55 and the error detector 56 are output to the display signal generator 54 and the color control section 60.

The color control section 60 is constituted by a color selection signal generator 61 for selecting a display color set for each state in advance. The color control section 60 generates a color selection signal for selecting a display color in accordance with the state detection signals from the minus sign detector 55 and the error detector 56.

The display driver 70 receives a display data signal output from the display signal generator 54 of the calculator circuit section 50 and a color selection signal from the color selection signal generator 61, and applies a segment voltage corresponding to a predetermined display color determined by the display data signal and the color selection signal to each segment electrode 34 of the liquid crystal cell 30, while applying a common voltage, used for time-divisionally driving the liquid crystal cell 30 at a predetermined duty, to each common electrode 33.

The display driver 70 comprises a driving voltage generator 71, a driving voltage selector 72, and a driving waveform forming circuit 73. The driving voltage generator 71 generates a plurality of driving voltages respectively corresponding to the display colors (purple, yellow, and black) other than the background color (light blue), i.e., V2, V3, and V4 in Table 3. The driving voltage selector 72 selects a driving voltage corresponding to a selected display color, from the driving voltages V2 to V4 generated by the driving voltage generator 71, in accordance with the color selection signal from a color selection signal generator 61. The driving waveform forming circuit 73 forms the waveform of a segment voltage applied to each segment electrode 34 and the waveform of a common voltage applied to each common electrode 33 on the basis of a display signal from the display signal generator 54 and a selected driving voltage applied from the driving voltage selector 72.

In the calculator circuit section 50, numerical values and an arithmetic instruction input from the key input section 57 are supplied to the control circuit 51. The control circuit 51 causes the arithmetic circuit 52 to perform arithmetic processing of the input numerical values in accordance with the arithmetic instruction; causes the storage circuit 53 to store the operation result; and supplies the operation result data to the display signal generator 54.

The arithmetic circuit 52 outputs a negative carry to the minus sign detector 55 if the operation result is a negative value. The minus sign detector 55 outputs a minus sign detection signal for display "−" to the display signal generator 54 and the color selection signal generator 61 of the color control section 60.

Upon occurrence of an error such as an overflow of an input numerical value or an overflow of an arithmetic instruction or an operation result, the control circuit 51 outputs an error signal to the error detector 56. The error detector 56 outputs an error detection signal for error display to the display signal generator 54 and the color selection signal generator 61 of the color control section 60.

The display signal generator 54 forms a display data signal corresponding to a certain display pattern in accordance with display data supplied from the control circuit 51 and the presence/absence of a minus sign detection signal from the minus sign detector 55 and of an error detection signal from the error detector 56, and outputs the display data signal to the driving waveform forming circuit 73 of the display driver 70.

The color selection signal generator 61 of the color control section 60 generates a color selection signal corresponding to a normal display color (yellow) when neither minus sign detection signal nor an error detection signal are input. Upon reception of a minus sign detection signal, the color selection signal generator 61 generates a color selection signal corresponding to a display color (black) for a negative numerical value. Upon reception of an error detection signal, the color selection signal generator 61 generates a color selection signal corresponding to a display color (purple) for an error. The color selection signal generator 61 then outputs the color selection signal to the driving voltage selector 72 of the display driver 70.

The driving voltage generator 71 of the display driver 70 generates a voltage required to form a driving waveform for the liquid crystal cell 30 and the plurality of different voltages V2, V3, and V4 corresponding to the respective display colors from a voltage applied from the power supply 59, and applies these voltages to the driving voltage selector 72.

The driving voltage selector 72 selects a voltage corresponding to a selected display color from the plurality of voltages applied, from the driving voltage generator 71, in accordance with a color selection signal from the color selection signal generator 61, and applies the selected voltage to the driving waveform forming circuit 73.

The driving waveform forming circuit 73 generates a plurality of common voltages for time-divisionally driving the liquid crystal cell 30 at a predetermined duty (e.g., a ⅓ duty), and a plurality of segment voltages for causing the liquid crystal cell 30 to perform a display operation in accordance with a display data signal from the display signal generator 54. The driving waveform forming circuit 73 then applies these common voltages and segment voltages to the respective common and segment electrodes 33 and 34 of the liquid crystal cell 30.

The common voltages applied to the respective common electrodes 33 are voltages having waveforms indicating selection periods which are shifted from each other.

The segment voltage applied to each segment electrode 34 is a voltage having a waveform designed to apply an ON or OFF voltage to the segment electrode 34 in synchronism with a selection period of the common electrode 33 to which the segment electrode 34 opposes. The ON voltage is designed such that the RMS voltage between the common electrode 33 and the segment electrode 34 becomes one of the selection voltages V2, V3, and V4 applied from the driving voltage selector 72, i.e., one of the voltages for the respective display colors as purple, yellow, and black, in accordance with the display data signal. The OFF voltage is designed such that the RMS voltage between the common electrode 33 and the segment electrode 34 becomes the voltage V1 in Table 3, i.e., the voltage for setting the background color (light blue) as a display color. This OFF voltage is set in the driving waveform forming circuit 73 in advance.

When the above-described common and segment voltages are applied to the liquid crystal cell 30, the common voltages having waveforms indicating selection periods which are sequentially shifted from each other are applied to the respective common electrodes 33, and the segment voltages corresponding to a display data signal are applied to the respective segment electrodes 34. As a result, the liquid crystal cell 30 is time-divisionally driven to display the display patterns shown in FIGS. 7 to 9 in accordance with the display data signal.

In the above-described example, when display data is a positive ("+") numerical value and no error is involved, all the display patterns are displayed in "yellow"; when display data is a negative ("−") numerical value, all the display patterns are displayed in "black"; and when an error is involved, all the display patterns are displayed in "purple". However, these states and display colors can be arbitrarily related to each other. Furthermore, if the display driver 70 is designed to control the values of segment voltages, applied to the respective segment electrodes 34, in units of segment voltages, a combination of a plurality of colors can be displayed. For example, when display data is a negative ("−") numerical value, "−" and the numerical value are respectively displayed in "black" and "yellow" in the "light blue" background.

Third Embodiment

Figure 11:
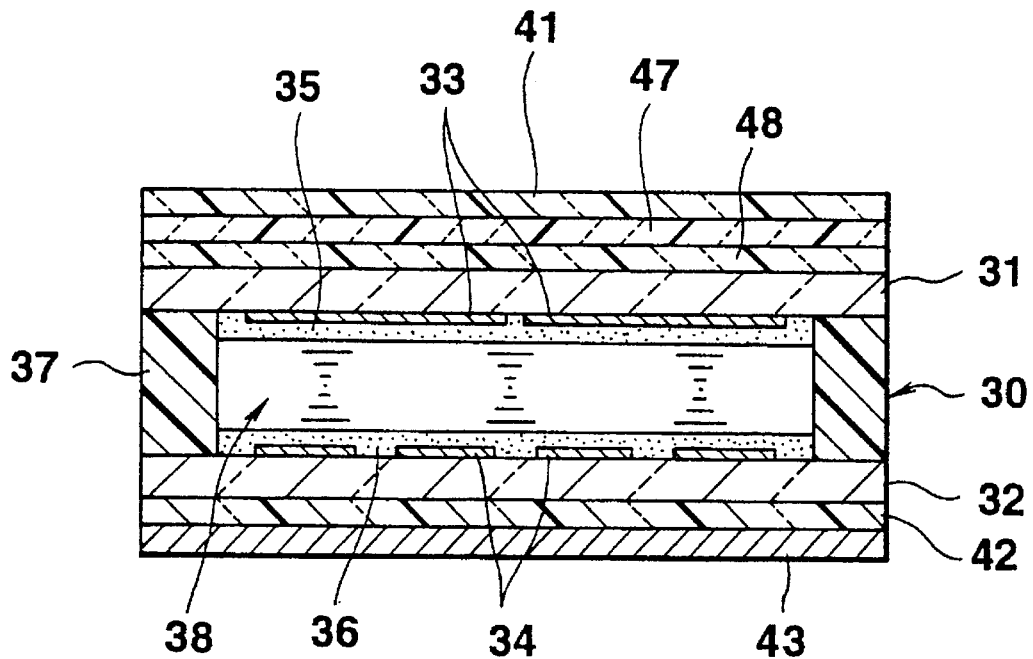
FIG. 11 is a sectional view showing a color liquid crystal display apparatus according to the third embodiment of the present invention.

A color liquid crystal display apparatus of this embodiment is designed as follows. As shown in FIG. 11, a pair of upper and lower polarizing plates 41 and 42 are disposed to sandwich a liquid crystal cell 30. Two retardation plates 47 and 48 are stacked between the liquid crystal cell 30 and one of the polarizing plates, e.g., the upper polarizing plate 41. In addition, a reflection plate 43 is disposed on the rear surface (lower surface) of the lower polarizing plate 42.

Of the two retardation plates 47 and 48, the first retardation plate 47 disposed on the upper polarizing plate 41 side is arranged such that the optical axis obliquely crosses the transmission axis of the upper polarizing plate 41 by a predetermined angle. The second retardation plate 48 disposed on the liquid crystal cell 30 side is arranged such that the optical axis obliquely crosses the optical axis of the first retardation plate 47 at a predetermined angle.

Figure 12:
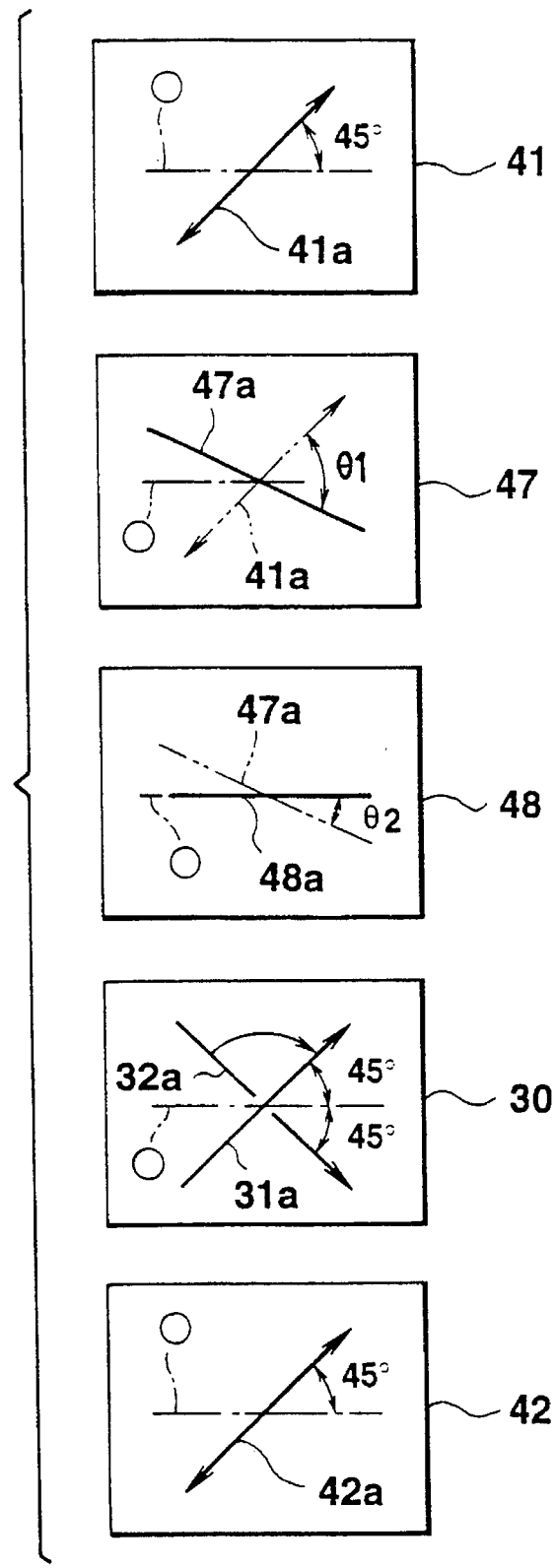
FIG. 12 is a view for explaining the positions/arrangement of the optical axes of the respective optical elements in the third embodiment.
Figure 14:
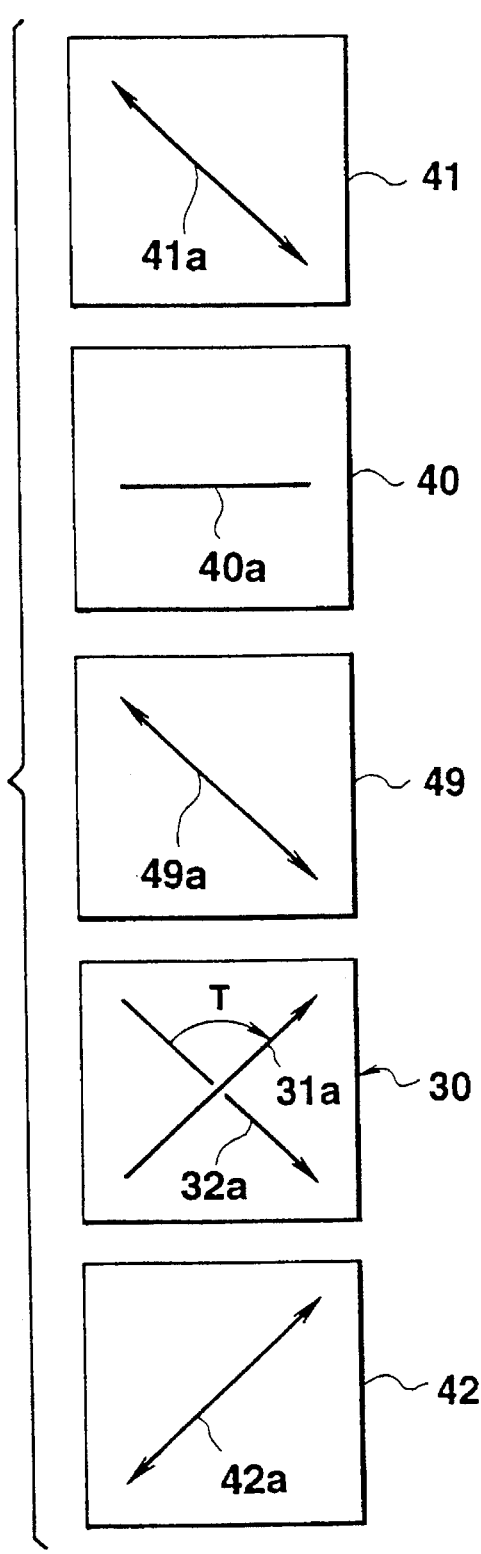
FIG. 14A is a view for explaining the positions/arrangement of the optical axes of the respective optical elements in the fourth embodiment.
FIG. 14B is a view for explaining the positions/arrangement of the optical axes of the respective optical elements in a modification of the fourth embodiment.
Figure 14:
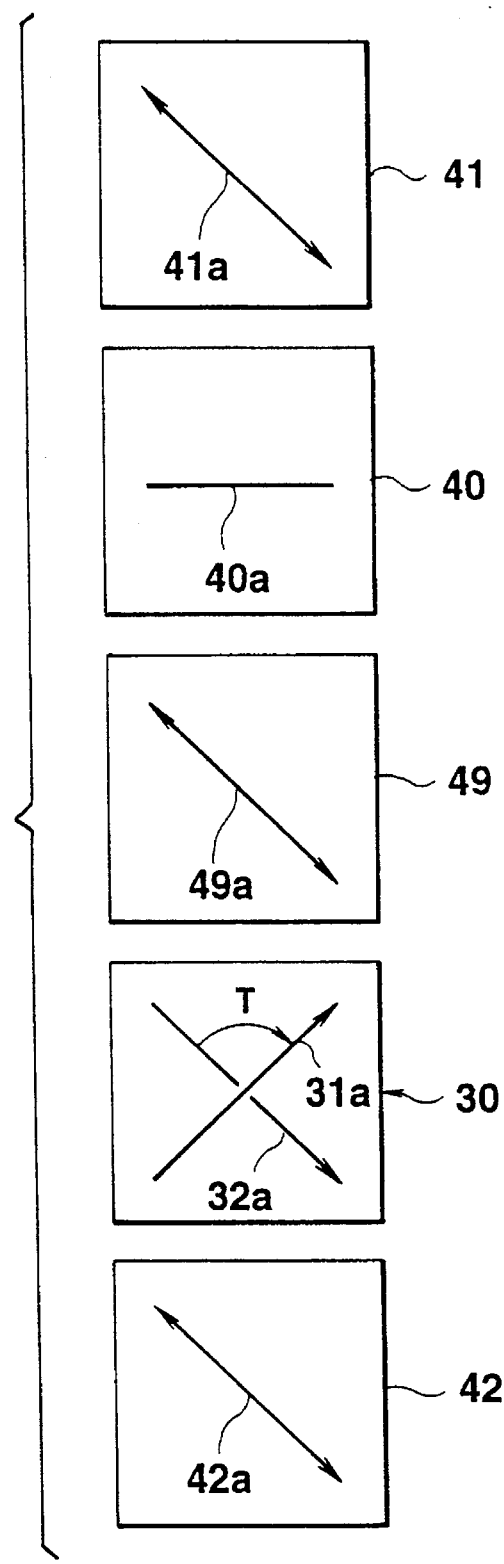

Referring to FIG. 12, reference numeral 41a denotes a transmission axis of the upper polarizing plate 41; 47a, an optical axis of the first retardation plate 47; and 48a, an optical axis of the second retardation plate 48. The optical axis 47a of the first retardation plate 47 obliquely crosses the transmission axis 41a of the upper polarizing plate 41 at an angle θ1. The optical axis 48a of the second retardation plate 48 obliquely crosses the optical axis 47a of the first retardation plate 47 at an angle θ2.

The color liquid crystal display apparatus of the third embodiment has almost the same color display and color changing effects as those of the second embodiment. However, the third embodiment is different from the second embodiment in the relationship between the applied voltage and the display color because the two retardation plates 47 and 48 are differently arranged.

Assume that the optical axis 47a of the first retardation plate 47 is shifted clockwise from the transmission axis 41a of the upper polarizing plate 41 by 70° (the angle θ1) (the optical axis 47a of the first retardation plate 47 is shifted clockwise from a reference line O by 25°); the optical axis 48a of the second retardation plate 48 is shifted counterclockwise from the optical axis 47a of the first retardation plate 47 by 25° (the angle θ2) (the optical axis 48a of the second retardation plate 48 is parallel to the reference line O); and the angular difference between a liquid crystal molecule aligning direction 31a of the liquid crystal cell 30 on the upper substrate 31 side (adjacent to the retardation plate) 31 side and the optical axis 48a of the second retardation plate 48 is 45°. Assume also that the transmission axis 41a of the upper polarizing plate 41 is parallel to the liquid crystal molecule aligning direction 31a of the liquid crystal cell 30 on the upper substrate 31 side, and the transmission axis 41a of the upper polarizing plate 41 is parallel to a transmission axis 42a of the lower polarizing plate 42. In this case, if, for example, retardations Re1 and Re2 of the first and second retardation plates 47 and 48 are 450 nm, and a value Δn.d of the liquid crystal cell 30 and the liquid crystal molecule twist angle are respectively set to be 1.30 μm and 90°, the display color becomes "orange" when the liquid crystal molecules of the liquid crystal cell 30 are set in an initial twist-aligned state; the display color becomes "blue" when the liquid crystal molecules are raised/aligned almost vertically; and the display color becomes "yellowish green" having a high light intensity and high color purity as the liquid crystal molecules are raised/aligned from the initial twist-aligned state.

Table 4 shows the relationship between the voltage applied to the liquid crystal cell 30 of the above-described color liquid crystal display apparatus and the display color. Note that in Table 4, the value of each applied voltage is an RMS voltage value applied between electrodes 33 and 34 of the liquid crystal cell 30.

TABLE 4

| Applied Voltage | | Display Color |
| --- | --- | --- |
| V1 | 1.44 V or less | Orange |
| V2 | 2.28 to 2.52 V | Yellowish green |
| V3 | 3.04 V or more | Blue |

As shown in Table 4, the above-described color liquid crystal display apparatus is designed to change its display color in accordance with the voltage applied to the liquid crystal cell 30. Therefore, according to this color liquid crystal display apparatus, the display color of the same portion, i.e., a portion corresponding to the same segment electrode 34, can be changed to a plurality of colors by controlling the voltage applied between the electrodes 33 and 34 of the liquid crystal cell 30.

Fourth Embodiment

Figure 13:
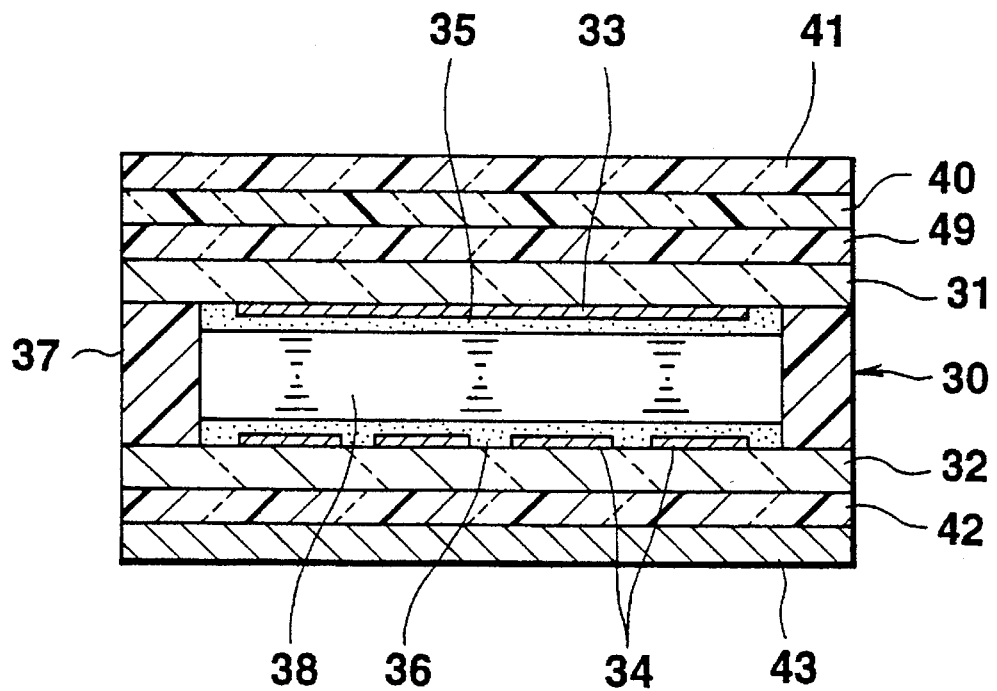
FIG. 13 is a sectional view showing a color liquid crystal display apparatus according to the fourth embodiment of the present invention.

In a color liquid crystal display apparatus of the fourth embodiment, three polarizing plates are used such that a retardation plate and a liquid crystal cell are respectively sandwiched by a pair of polarizing plates. More specifically, as shown in FIG. 13, in the color liquid crystal display apparatus of the first embodiment, a third polarizing plate (to be referred to as an intermediate polarizing plate hereinafter) 49 is arranged between the retardation plate 40 and the liquid crystal cell 30.

Referring to FIG. 14A, reference numeral 42a denotes a transmission axis of a lower polarizing plate 42; 49a, a transmission axis of an intermediate polarizing plate 49; and 41a, a transmission axis of an upper polarizing plate 41. In this embodiment, the lower polarizing plate 42 and the intermediate polarizing plate 49 are arranged such that their transmission axes 42a and 49a are set to be perpendicular to each other, and the upper polarizing plate 41 is arranged such that the transmission axis 41a is made to be parallel to the transmission axis 49a of the intermediate polarizing plate 49.

Note that the transmission axes 42a and 49a of the lower polarizing plate 42 and the intermediate polarizing plate 49 may be perpendicular or parallel to liquid crystal molecule aligning directions 32a and 31a of the liquid crystal cell 30 on the lower substrate 32 side and the upper substrate 31 side, as shown in FIG. 14A.

In addition, referring to FIG. 14A, reference numeral 40a denotes an optical axis of the retardation plate 40. In this embodiment, the retardation plate 40 is arranged such that its optical axis 40*a* obliquely crosses the transmission axis 41*a* of the upper polarizing plate 41 at 45°.

In this color liquid crystal display apparatus, the liquid crystal cell 30 serves only as a shutter means for controlling transmission of light. More specifically, light which is linearly polarized when it is transmitted through the upper polarizing plate 41 becomes elliptically polarized light owing to the polarizing effect of the retardation plate 40. Of the elliptically polarized light, light components which are transmitted through the intermediate polarizing plate 49 along the transmission axis 49*a* become linearly polarized colored light. When this linearly polarized light as colored light is transmitted through the liquid crystal cell 30 in an initial twist-aligned state with no voltage being applied, the polarization plane of the light is rotated through 90° owing to the effect of rotary polarization of the liquid crystal cell 30. As a result, the light is transmitted through the lower polarizing plate 42 whose transmission axis 42*a* is perpendicular to the transmission axis 49*a* of the intermediate polarizing plate 49. The transmitted colored light is reflected by a reflection plate 43 to emerge from the front surface side of the liquid crystal display apparatus.

In contrast to this, when a voltage is applied to the liquid crystal cell 30 and the liquid crystal molecules are raised/aligned, colored light transmitted through the liquid crystal cell 30 is not influenced by the effect of rotary polarization and hence are absorbed by the lower polarizing plate 42. By ON/OFF-controlling the voltage applied to the liquid crystal cell 30 in this manner, a color display can be performed with colored light and a black dark display.

As described above, the above-described color liquid crystal display apparatus is designed to perform a color display of transmitted light without using any color filter. Since the amount of colored light is almost the same as that of light in a wavelength region corresponding to the above-mentioned colored light of light incident on the display apparatus, the brightness of display can be sufficiently increased by increasing the transmittance.

The color of light in this color liquid crystal display apparatus is determined by a retardation Re of the retardation plate 40, the angular difference between the transmission axis 41*a* of the upper polarizing plate 41 and the optical axis 40*a* of the retardation plate 40, and the direction of the transmission axis 49*a* of the 10 intermediate polarizing plate 49. Assume that the retardation Re of the retardation plate 40 is 450 nm, the angular difference between the transmission axis 41*a* of the upper polarizing plate 41 and the optical axis 40*a* of the retardation plate 40 is 45°, and the direction of the transmission axis 49*a* of the intermediate polarizing plate 49 is perpendicular to the transmission axis 42*a* of the lower polarizing plate 42. In this case, the color of the light is "blue". This blue is bright because it is not obtained through a color filter, unlike the conventional color liquid crystal display apparatus.

The above-described color liquid crystal display apparatus is of a positive display type, in which the transmission axes 42*a* and 49*a* of the lower polarizing plate 42 and the intermediate polarizing plate 49 sandwiching the liquid crystal cell 30 are made to be perpendicular to each other. In this apparatus, since a display pattern is displayed in "black" in a bright blue background, the contrast of a display is good.

The liquid crystal display apparatus of the fourth embodiment is of a positive display type. However, the above-described color liquid crystal display apparatus may be of a negative display type, in which the transmission axes 42*a* and 49*a* of the lower polarizing plate 42 and the intermediate polarizing plate 49 sandwiching the liquid crystal cell 30 are made to be almost parallel to each other.

FIG. 14B shows a modification of the fourth embodiment. This modification is the same as the fourth embodiment except that only the position of the lower polarizing plate 42 is changed such that the transmission axis 42*a* of the lower polarizing plate 42 becomes parallel to the transmission axis 49*a* of the intermediate polarizing plate 49.

The color liquid crystal display apparatus of this modification is of a negative display type. If, for example, the retardation of the retardation plate 40 is 450 nm, a "blue" display pattern is displayed in a "black" background with good contrast.

When the transmission axes 41*a* and 49*a* of the upper polarizing plate 41 and the intermediate polarizing plate 49 sandwiching the retardation plate 40 are made to be perpendicular to each other, the color of light is "orange" in the 450-nm retardation of the retardation plate 40. In this case, therefore, when the transmission axes 49*a* and 42*a* of the intermediate polarizing plate 49 and the lower polarizing plate 42 are made to be perpendicular to each other, a positive display is obtained, in which a "black" display pattern is displayed in an "orange" background; and when the transmission axes 49*a* and 42*a* are made to be parallel to each other, a negative display is obtained, in which an "orange" display pattern is displayed in a "black" background.

As described above, according to the color liquid crystal display apparatus of this embodiment, even if the apparatus is of a reflection type, a bright two-color display with "black" and a chromatic color can be obtained. In addition, since the retardation plate and the liquid crystal cell are respectively sandwiched between the pairs of polarizing plates, changes in contrast due to visual angles in the retardation plate and the liquid crystal cell (visual angle dependency) are not added. Therefore, the overall visual angle dependency of the liquid crystal display apparatus is can be made small, and a larger viewing angle can be obtained.

Fifth Embodiment

Figure 15:
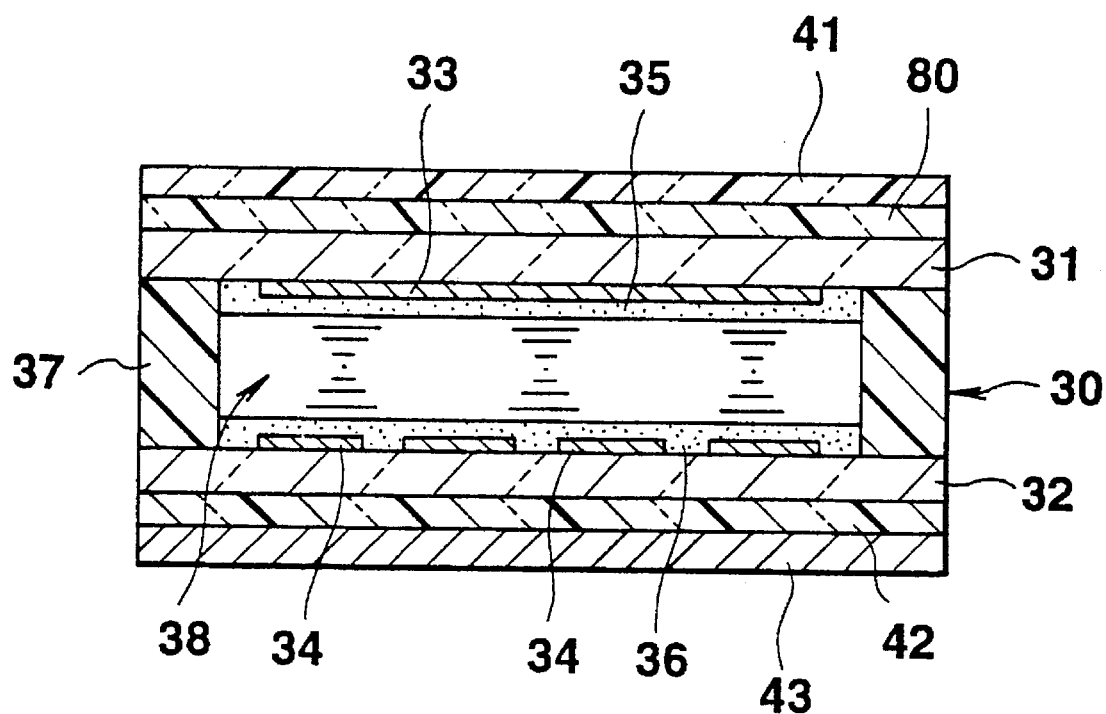
FIG. 15 is a sectional view showing a color liquid crystal display apparatus according to the fifth embodiment of the present invention.
Figure 16:
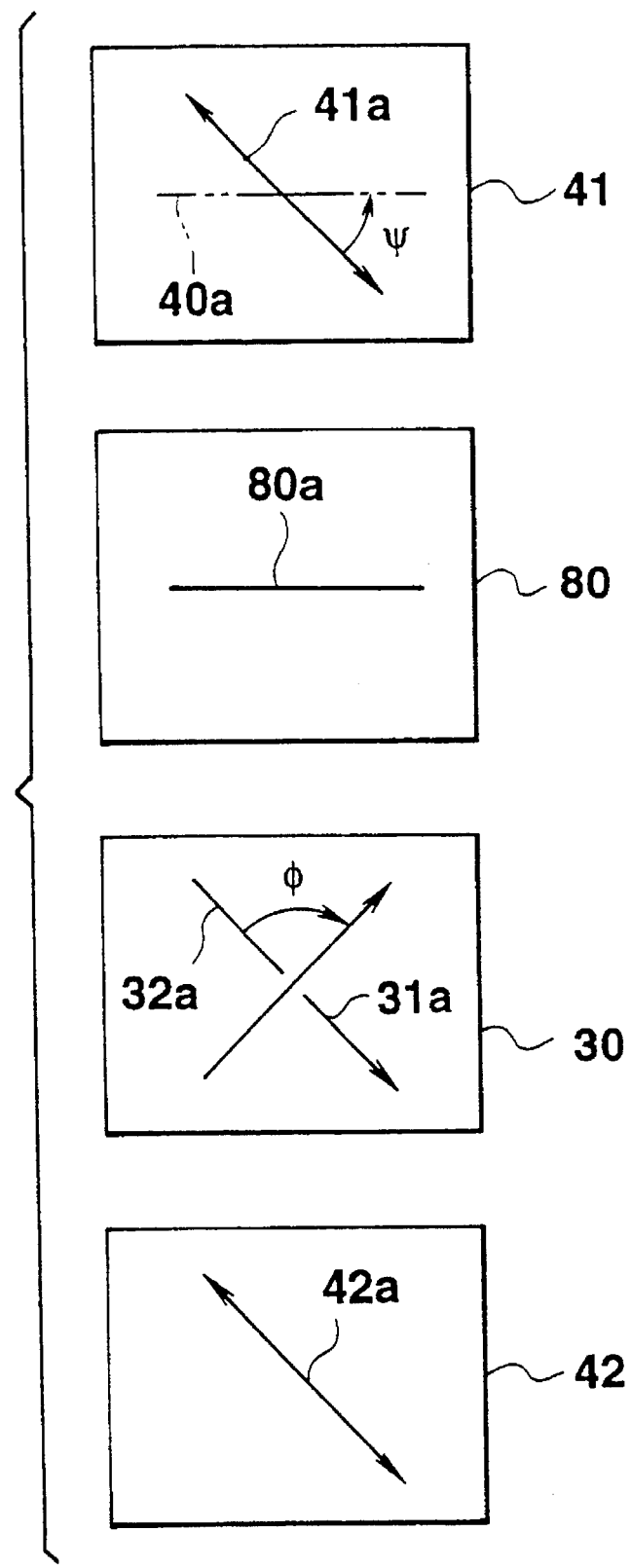
FIG. 16 is a view for explaining the positions/arrangement of the optical axes of the respective optical elements in the fifth embodiment.
Figure 17:
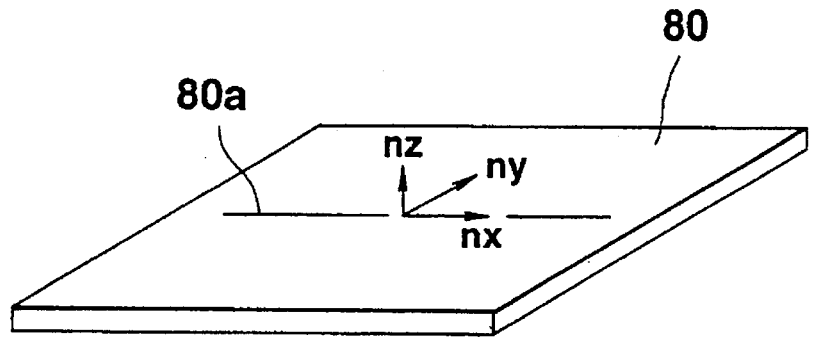
FIG. 17 is a perspective view for explaining the optical axis of a retardation plate used in the fifth embodiment.

As shown in FIGS. 15 and 16, the arrangement of a color liquid crystal display apparatus of the fifth embodiment is the same as that of the color liquid crystal display apparatus of the first embodiment except for the type of a so-called biaxial retardation plate 80. More specifically, as shown in FIG. 17, provided that the direction of an optical axis 80*a* of the retardation plate 80 is defined as an x-axis direction, the retardation plate 80 is a retardation plate which satisfies condition $n_X > n_Z > n_Y$ where $n_X$ is the refractive index in the X-axis direction, $n_Y$ is the refractive index in the Y-axis direction perpendicular to the X-axis direction within a plane parallel to the surface of the retardation plate 80, and $n_Z$ is the refractive index in the Z-axis direction which is the direction of thickness.

Similar to the color liquid crystal display apparatus of the first embodiment, the color liquid crystal display apparatus of the fifth embodiment can obtain colored light based on the polarizing effect of the retardation plate 80 and colored light based on the polarizing effects of the retardation plate 80 and a liquid crystal cell 30. In addition, since the polarizing effect of the liquid crystal cell 30 changes in accordance with the voltage applied to the liquid crystal cell 30, the color of light can be arbitrarily changed.

For example, the following display colors can be obtained by this color liquid crystal display apparatus. Assume that refractive indexes $n_x$, $n_y$, and $n_z$ of the retardation plate 80 in the x-axis, y-axis, and z-axis directions and a plate thickness (the thickness of a portion having a refractive index anisotropy) d are:

$n_x$=1.4
$n_y$=1.2
$n_z$=1.3
d=2.15 μm a liquid crystal molecule twist angle φ and a birefringent index Δn and liquid crystal layer thickness d' of a liquid crystal 38 are:

φ=−90° (in the clockwise direction in FIG. 16)
Δn=0.092
d'=6 μm an angular difference ψ between a transmission axis 41a of an upper polarizing plate 41 and the optical axis 80a of the retardation plate 80 is 45° (45° in the counterclockwise direction in FIG. 16), the transmission axis 41a of the upper polarizing plate 41 is perpendicular to the liquid crystal molecule aligning direction of the liquid crystal cell 30 on the upper substrate 31 side, and a transmission axis 42a of a lower polarizing plate 42 is parallel to the transmission axis 41a of the upper polarizing plate 41. In this case, the voltage applied to the liquid crystal cell 30 and the display color have the following relationship. Note that the value of each applied voltage is an RMS, and each display color is recognized when the display of the liquid crystal display apparatus is viewed in front of it.

| (Applied voltage) | (Display Color) |
| --- | --- |
| 1.7 V or less | Orange |
| 2.9 to 3.5 V | Black |
| 4.5 V or more | Blue |

That is, as the voltage applied to the liquid crystal cell 30 is increased, the display color of the above-described color liquid crystal display apparatus changes from "orange" as an initial display color, obtained in a state wherein the applied voltage is 1.7 V or less, i.e., the liquid crystal molecules are twist-aligned, to "blue" as a final display color, obtained in a state wherein a voltage of 4.5 V or more as the maximum voltage is applied to the liquid crystal cell 30, i.e., the liquid crystal molecules are raised/aligned vertically. In this process of color change, the display color becomes "black" having a high light intensity and high color purity.

By controlling the voltage applied to the liquid crystal cell 30 in this manner, a display can be performed with a plurality of colors.

In addition, the above color liquid crystal display apparatus uses the retardation plate 80 which satisfies $n_x$>$n_z$>$n_y$ where $n_x$ is the refractive index in the x-axis direction as the optical axis 80a, $n_y$ is the refractive index of the y-axis direction, and $n_z$ is the refractive index in the z-axis direction. Since this retardation plate has a small change ratio of a phase difference to the incident angle of light as compared with a general retardation plate, the above color liquid crystal display apparatus has a small visual angle dependency of a display color and hence has a sufficiently large angle of field.

That is, phase differences $R_{xy}$ with respect the incident angle of light on the retardation plate in the x-axis and y-axis directions are obtained as follows. When light is incident from a direction along a normal line of the retardation plate (a line vertical to a plane including the x- and y-axes, i.e., the incident angle of light with respect to a normal line of the retardation plate is 0°), a phase difference $R_{xy}(0)$ is given by:

$$R_{xy}(0)=(n_x-n_y)d \quad (5)$$

where d is the thickness of the retardation plate.

When light is obliquely incident from a direction inclined with respect to a normal line of the retardation plate by an angle θ, a phase difference $$R_{xy}(\theta) = \left( n_x - \frac{n_y n_z}{\sqrt{n_y^2 \sin^2\theta + n_z^2 \cos^2\theta}} \right) \frac{d}{\cos\theta} \quad (6)$$

A general retardation plate is designed to satisfy $n_x$>$n_y$=$n_z$ where $n_x$, $n_y$, and $n_z$ are the refractive indexes in the x-axis, y-axis, and z-axis directions, as shown in FIG. 17. For this reason, in the general retardation plate, a ratio $R_{xy}(\theta)/R_{xy}(0)$ of the phase difference $R_{xy}(0)$, obtained when the incident angle of light is 0°, to the phase difference $R_{xy}(\theta)$, obtained when the incident angle of light is θ°, greatly changes depending on the incident angle of light.

In contrast to this, the retardation plate in the above embodiment is designed to satisfy $n_x$>$n_z$>$n_y$ where $n_x$, $n_y$, and $n_z$ are the refractive indexes in the x-axis, y-axis, and z-axis directions. For this reason, the ratio $R_{xy}(\theta)/R_{xy}(0)$ is low, and hence a change in phase difference with a change in incident angle of light is small.

Figure 18:
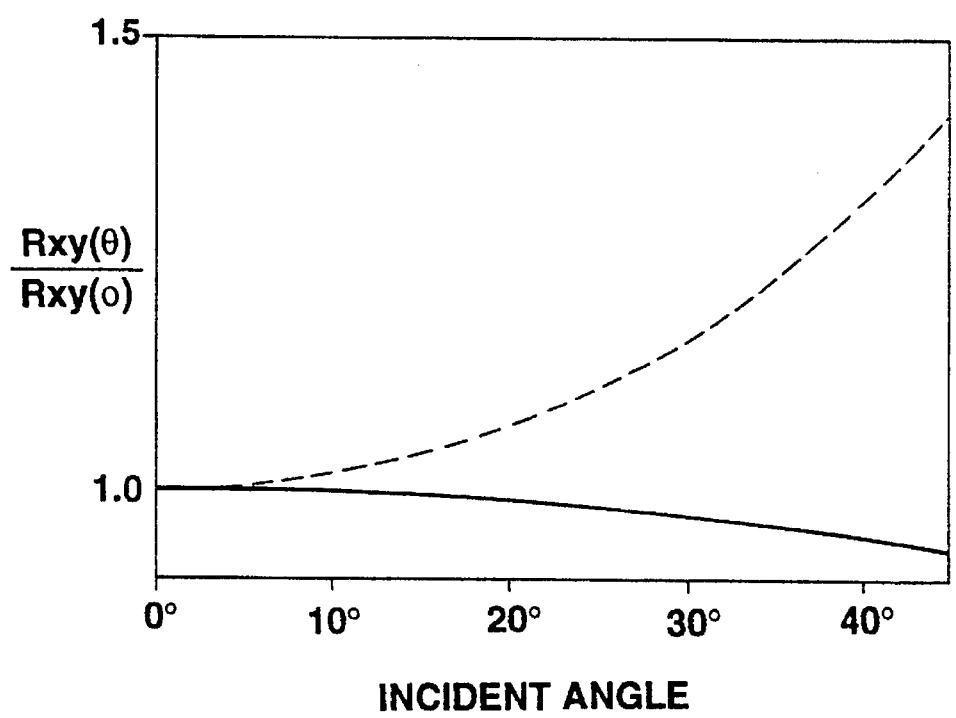
FIG. 18 is a graph showing the relationship between the retardation ratio for a retardation at an incident angle of 0° and the incident angle in the retardation plate used in the fifth embodiment and that in a general retardation plate.

FIG. 18 shows a change in $R_{xy}(\theta)/R_{xy}(0)$ as a function of an incident angle in the retardation plate in the above embodiment in comparison with the above-mentioned general retardation plate. As indicated by the broken curve in FIG. 18, the ratio $R_{xy}(\theta)/R_{xy}(0)$ of the general retardation plate greatly changes with a change in incident angle. For this reason, as the incident angle increases, the phase difference greatly changes. In contrast to this, as indicated by the solid curve in FIG. 18, the change in $R_{xy}(\theta)/R_{xy}(0)$ of the retardation plate in the above embodiment is small. Therefore, a change in phase difference with a change in incident angle is small.

Note that the values $R_{xy}(\theta)/R_{xy}(0)$ of the general retardation plate shown in FIG. 18 are obtained when the retardation plate is designed to have $n_x$=1.4 and $n_y$=$n_z$=1.2, and $R_{xy}(\theta)/R_{xy}(0)$ of the retardation plate in the embodiment is obtained when the retardation plate is designed to have $n_x$=1.4 and $n_y$=1.2, and $n_z$=1.3.

As described above, in the general retardation plate, a change in phase difference with a change in incident angle is large. For this reason, if the general retardation plate is used for the above color liquid crystal display apparatus, the display color changes depending on the visual angle. In contrast to this, in the retardation plate in the above embodiment, a change in phase difference with a change in incident angle is small. If, therefore, this retardation plate is used, a change in display color with a change in visual angle, i.e., the visual angle dependency of a display color, is small.

Figure 19:
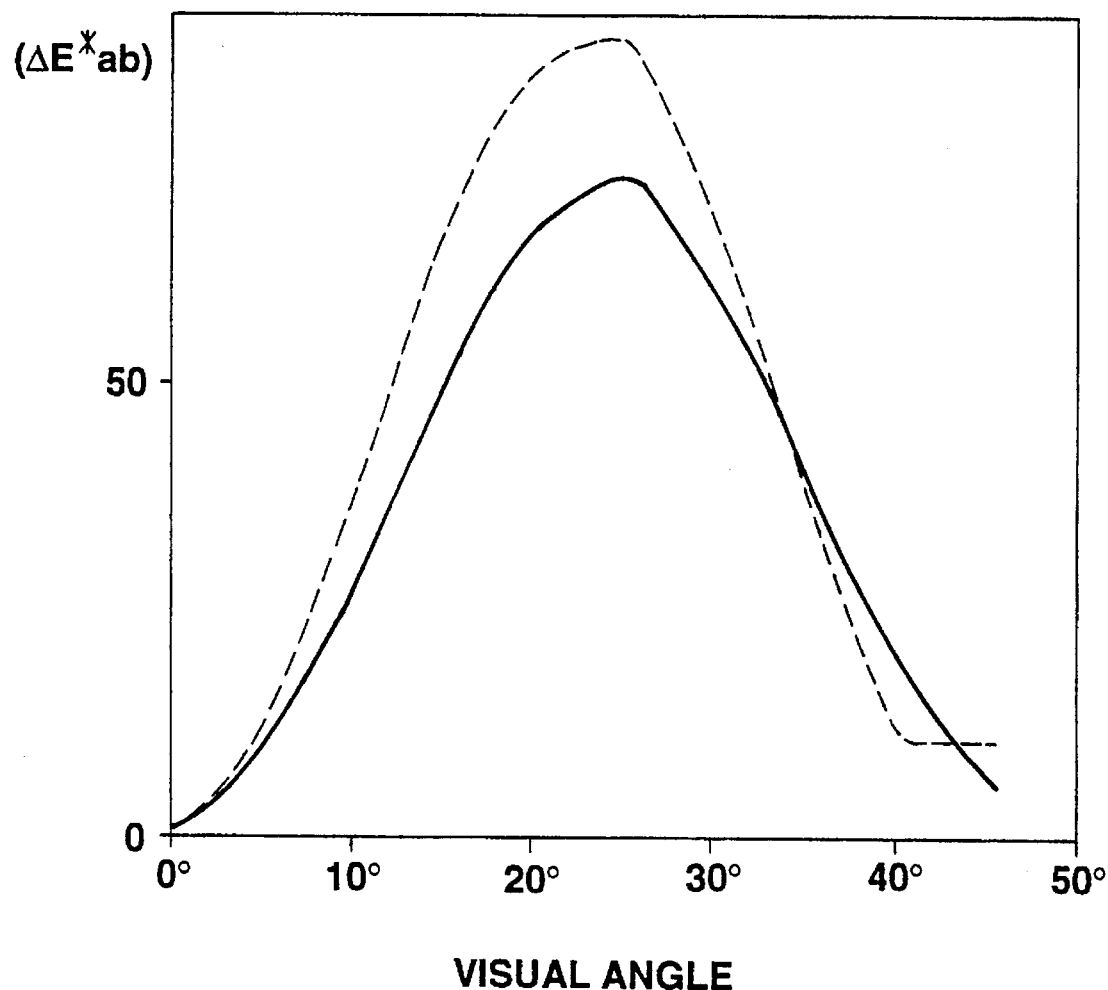
FIG. 19 is a graph showing a change in color difference as a function of a visual angle in the color liquid crystal display apparatus of the fifth embodiment and that in a comparative apparatus using a general retardation plate.

FIG. 19 shows the relationship between the visual angle and the color difference (ΔE*ab) of the display color in the color liquid crystal display apparatus of the above embodiment using the retardation plate 80 which satisfies $n_x$>$n_z$>$n_y$ where $n_x$, $n_y$, and $n_z$ are the refractive indexes in the x-axis, y-axis, and z-axis directions, and those in a comparative apparatus using the general retardation plate, which satisfies $n_x$>$n_y$=$n_z$, in place of the retardation plate 80. Referring to FIG. 19, the sold curve indicates a change in color difference as a function of a visual angle in the apparatus of the embodiment; and the broken curve, a change in color difference as a function of a visual angle in the comparative apparatus.

In both the apparatus of the embodiment and the comparative apparatus, the liquid crystal molecule twist angle of the liquid crystal cell is set to be −90°; the birefringent index Δn of the liquid crystal, 0.092; the liquid crystal layer thickness is 6 μm; the angular difference between the transmission axis of the upper polarizing plate and the optical axis of the retardation plate is 45°; the transmission axis of the upper polarizing plate is set to be perpendicular to the liquid crystal molecule aligning direction of the liquid crystal cell on the upper substrate side, and the transmission axis of the lower polarizing plate is set to be parallel to the transmission axis of the upper polarizing plate. In addition, the retardation plate used for the apparatus of the embodiment has $n_x=1.4$, $n_y=1.2$, and $n_z=1.3$, whereas the retardation plate used for the comparative apparatus has $n_x=1.4$ and $n_y=n_z=1.2$. Note that either retardation plate has a thickness of 2.15 μm.

Furthermore, the color difference (ΔE*ab) of the display color represents a value with reference to a chromaticity obtained when the visual angle is 0°, i.e., when the display apparatus is viewed in front of it. That is, the color difference is the difference between this reference chromaticity and the chromaticity of a display color at each visual angle.

As shown in FIG. 19, in the comparative apparatus using the general retardation plate which satisfies $n_x>n_y=n_z$ where $n_x$, $n_y$, and $n_z$ are the refractive indexes in the x-axis, y-axis, and z-axis directions, a change in chromaticity with a change in visual angle is large. That is, the visual angle dependency of a display color is large. In contrast to this, in the apparatus of the embodiment using the retardation plate which satisfies $n_x>n_z>n_y$, a change in chromaticity with a change in visual angle is smaller than that in the comparative apparatus.

In the above embodiment, the retardation plate 80 is disposed between the upper polarizing plate 41 and the liquid crystal cell 30. However, the retardation plate 80 may be disposed between the lower polarizing plate 42 and the liquid crystal cell 30.

Sixth Embodiment

Figure 20:
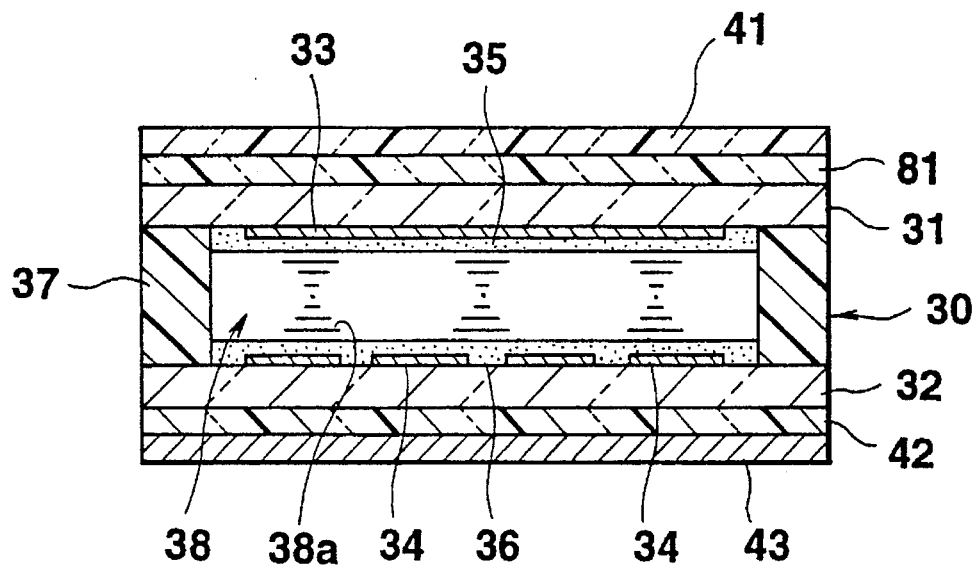
FIG. 20 is a sectional view showing a color liquid crystal display apparatus according to the sixth embodiment of the present invention.
Figure 21:
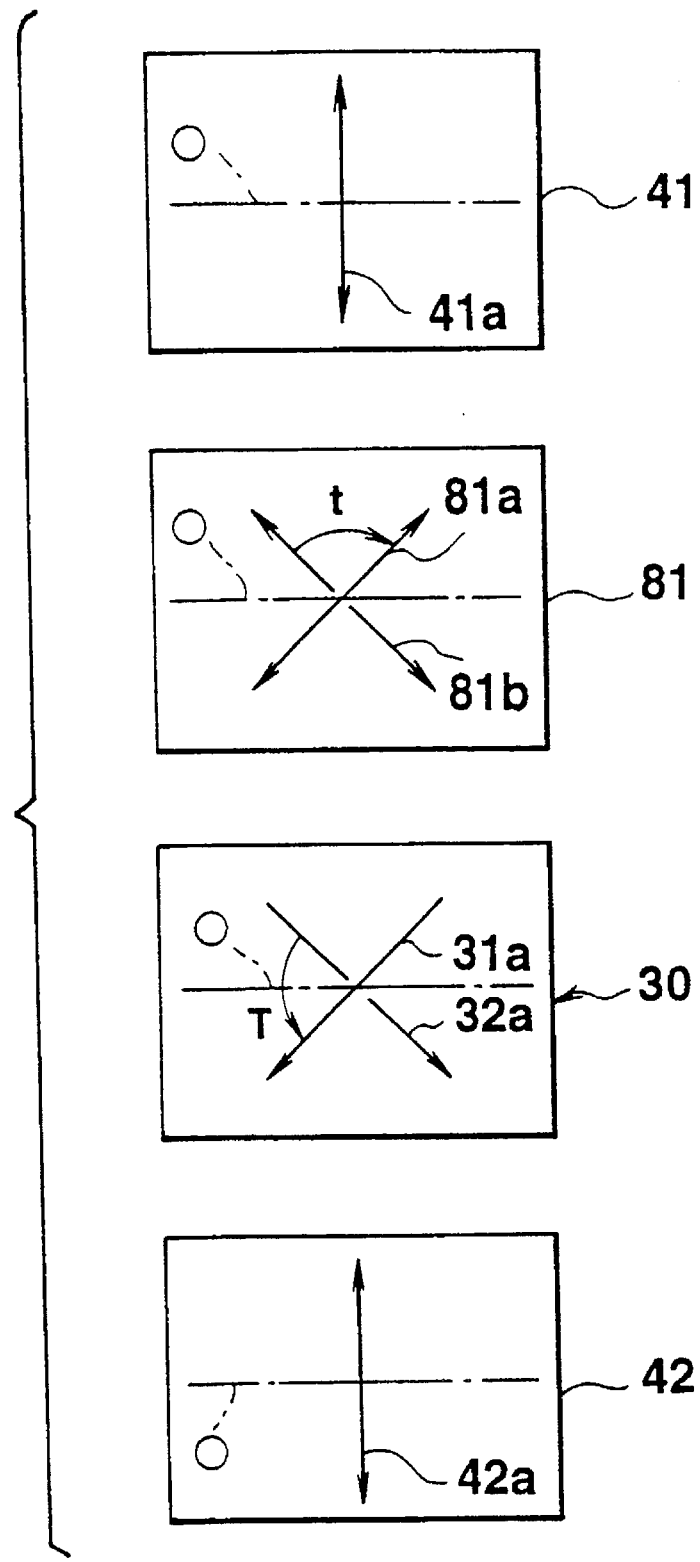
FIG. 21 is a view for explaining the positions/arrangement of the optical axes of the respective optical elements in the sixth embodiment.

As shown in FIGS. 20 and 21, the arrangement of a color liquid crystal display apparatus of the sixth embodiment is the same as that of the color liquid crystal display apparatus of the first embodiment except for the type of a retardation plate 81. The retardation plate 81 used in this embodiment is a twisted retardation plate in which the material molecules are twist-aligned in the same manner as a twisted-nematic liquid crystal.

The twisted retardation plate 81 is constituted by a film in which polymeric liquid crystal molecules are twist-aligned from one surface to the other surface. The polymeric liquid crystal molecules are twist-aligned between the two surfaces of the retardation plate 81 at a twist angle of about 90°.

The retardations of a liquid crystal cell 30 and the twisted retardation plate 81 are set to be almost equal to each other, and the twist direction of liquid crystal molecules 38a of the liquid crystal cell 30 is set to be opposite to the molecule twist direction of the twisted retardation plate 81.

In addition, a pair of polarizing plates 41 and 42 arranged such that their transmission axes are obliquely cross the molecule aligning direction of the twisted retardation plate 81 on the surface side adjacent to the polarizing plate (upper surface side) and the liquid crystal molecule aligning direction of the liquid crystal cell 30 on the substrate 32 side adjacent to the polarizing plate (lower substrate side) by predetermined angles. In addition, the transmission axes of the two polarizing plates 41 and 42 are set to be almost parallel to each other.

FIG. 21 is a plan view showing the liquid crystal molecule aligning direction of the liquid crystal cell 30, the molecule aligning direction of the twisted retardation plate 81, and the transmission axes of the pair of polarizing plates 41 and 42 in the above liquid crystal display apparatus. Referring to FIG. 21, reference numeral 31a denotes a liquid crystal molecule aligning direction of the liquid crystal cell 30 on an upper substrate 31 side; 32a, a liquid crystal molecule aligning direction of the liquid crystal cell 30 on a lower substrate 32 side; 81a, a molecule aligning direction of the twisted retardation plate 81 on its upper surface side; and 81b, a molecule aligning direction of the twisted retardation plate 81 on its lower surface side.

As shown in FIG. 21, the liquid crystal molecule aligning directions 31a and 32a of the liquid crystal cell 30 on the two substrate (31 and 32) sides are respectively inclined with respect to a reference line (horizontal line in FIG. 21) in opposite directions by about 45°. The molecules 38a of a liquid crystal 38 of the liquid crystal cell 30 are twist-aligned counterclockwise in FIG. 21, from the lower substrate 32 side to the upper substrate 31 side, by a twist angle of about 90°, as indicated by an arrow T representing the twist direction.

The molecule aligning direction 81a of the twisted retardation plate 81 on the upper surface side is parallel to the liquid crystal molecule aligning direction 31a of the liquid crystal cell 30 on the upper substrate 31 side, and the molecule aligning direction 81b on the lower surface side is parallel to the liquid crystal molecule aligning direction 32a of the liquid crystal cell 30 on the lower substrate 32 side. The molecules of the twisted retardation plate 81 are twist-aligned, in a direction opposite to the liquid crystal molecule aligning direction T of the liquid crystal cell 30 (the clockwise direction in FIG. 21), from the lower surface to the upper surface of the twisted retardation plate 81, by about 90°, as indicated by an arrow t representing the twist direction.

The retardation (the product of a refractive index Δn and a liquid crystal layer thickness d of the liquid crystal) of the liquid crystal cell 30 in a 90° twist-aligned state is almost equal to the retardation (the product of a refractive index Δn and a thickness d of the retardation plate) of the twisted retardation plate 81.

In this embodiment, transmission axes 41a and 42a of the two polarizing plates 41 and 42 are set to be almost perpendicular to the reference line O. Consequently, the transmission axis 41a of the upper polarizing plate 41 crosses the molecule aligning direction 81a of the twisted retardation plate 81, to which the upper polarizing plate 41 opposes, on the surface side adjacent to the polarizing plate (upper surface side) at 45° in the counterclockwise direction in FIG. 21. In addition, the transmission axis 42a of the lower polarizing plate 42 crosses the liquid crystal molecule aligning direction 32a of the liquid crystal cell 30, to which the lower polarizing plate 42 opposes, on the substrate side adjacent to the polarizing plate (lower substrate side) by 45° in the clockwise direction in FIG. 21.

Similar to the first to fifth embodiments, the color liquid crystal display apparatus of this embodiment can obtain colored light based on the polarizing effect of the twisted retardation plate 81, and colored light based on the polarizing effects of the twisted retardation plate 81 and the liquid crystal cell 30. In addition, since the polarizing effect of the liquid crystal cell 30 changes in accordance with the voltage applied to the liquid crystal cell 30, the color of light can be arbitrarily changed. According to the color liquid crystal display apparatus of the embodiment, while no voltage is applied to the liquid crystal cell 30, a "white" display state can be obtained, in which colorless light emerges.

This "white" display operation will be described below. The retardation of the liquid crystal cell 30 is almost equal to that of the twisted retardation plate 81, and the liquid crystal molecule twist direction T of the liquid crystal cell 30 is opposite to the molecule twist direction of the twisted retardation plate 81. For this reason, while no voltage is applied between the electrodes 33 and 34 of the liquid crystal cell 30, i.e., the liquid crystal molecules 38a of the liquid crystal cell 30 are in a twist-aligned state, the polarizing effects of the twisted retardation plate 81 and the liquid crystal cell 30 work in opposite directions. As a result, light which is polarized from linearly polarized light to elliptically polarized light by the twisted retardation plate 81 is restored to the linearly polarized light (the light linearly polarized by the upper polarizing plate 41) in the process of passing through the liquid crystal layer of the liquid crystal cell 30.

In the above-described liquid crystal display apparatus, since the transmission axes 41a and 42a of the pair of polarizing plates 41 and 42 are almost parallel to each other, the light which has been restored to the original linearly polarized light by the liquid crystal cell 30 is transmitted through the lower polarizing plate 42 without being polarized. That is, the light emerging from the lower polarizing plate 42 at this time is colorless light obtained by causing the liquid crystal cell 30 to cancel the color display effect of the twisted retardation plate 81.

According to the above-described color liquid crystal display apparatus, since colored light can be obtained without using any color filter, a multiple color display which is free from a loss of transmitted light due to a color filter and includes a bright white display can be easily realized.

In the above color liquid crystal display apparatus, a light intensity I of transmitted light with no voltage being applied to the liquid crystal cell 30 is expressed by equation (7):

$$I = \frac{1}{2}\left[C_1^2 C_2^2 + \frac{2(1+u_1 u_2)}{\sqrt{1+u_1^2}\sqrt{1+u_2^2}} C_1 C_2 S_1 S_2 + S_1^2 S_2^2\right]^2 \quad (7)$$

$$C_1 = \cos\frac{\pi}{2}\sqrt{1+u_1^2}$$

$$C_2 = \cos\frac{\pi}{2}\sqrt{1+u_2^2}$$

$$S_1 = \sin\frac{\pi}{2}\sqrt{1+u_1^2}$$

$$S_2 = \sin\frac{\pi}{2}\sqrt{1+u_2^2}$$

$$u_1 = \frac{2\Delta n_1 d_1}{\lambda}$$

$$u_2 = \frac{2\Delta n_2 d_2}{\lambda}$$

where $\Delta n_1$ is the refractive index anisotropy of the twisted retardation plate, $d_1$ is the thickness of the twisted retardation plate, $\Delta n_2$ is the refractive index anisotropy of the liquid crystal of the liquid crystal cell, and $d_2$ is the liquid crystal layer thickness of the liquid crystal cell.

The light intensity I obtained by equation (7) is almost ½ the light intensity of all light components (visible light) incident on the liquid crystal display apparatus (this brightness is almost equal to that of a bright display of a general TN type liquid crystal display having no color filter).

Figure 22:
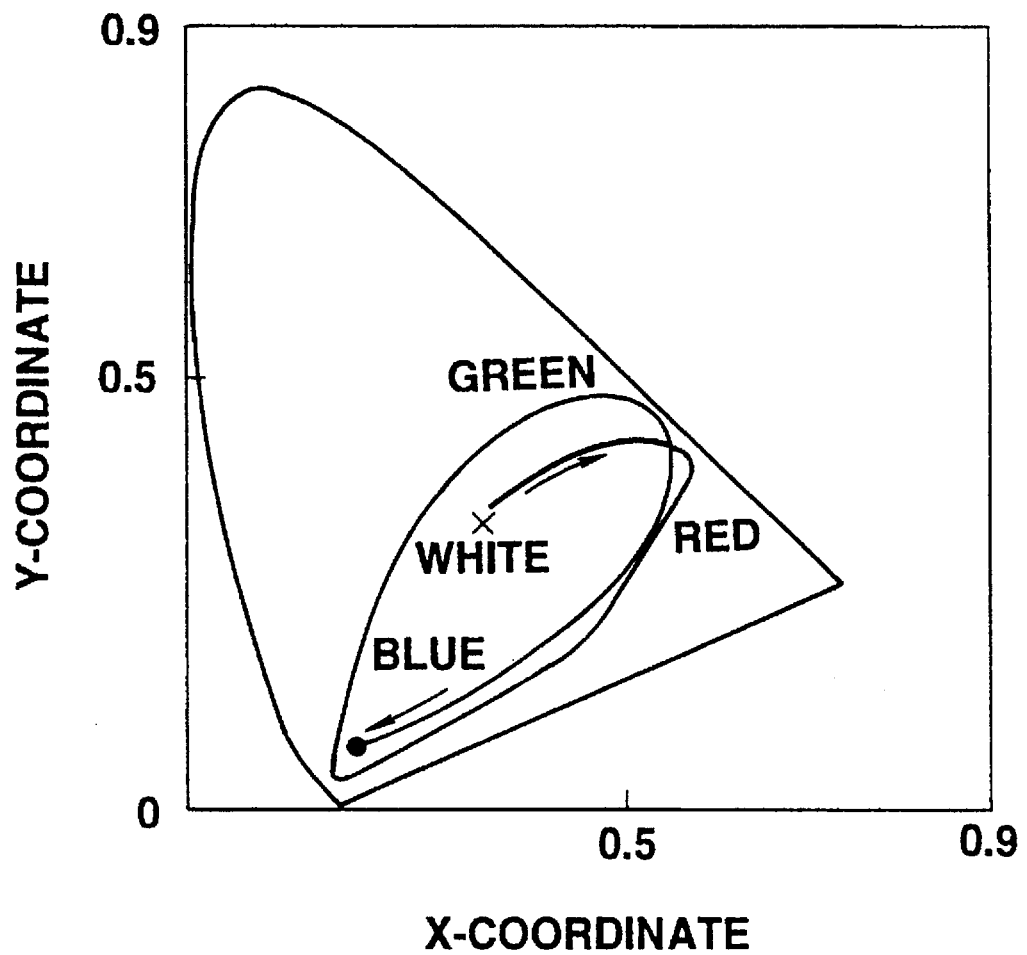
FIG. 22 is a CIE chromaticity diagram showing a change in display color in the sixth embodiment.

FIG. 22 is a CIE chromaticity diagram of the above color liquid crystal display apparatus. This diagram shows a change in chromaticity of the liquid crystal display apparatus in a case wherein a value $\Delta n.d$ ($\Delta n_1 d_1$ in equation (7)) of the twisted retardation plate 81 and a value $\Delta n.d$ ($\Delta n_2 d_2$ in equation (7)) of the liquid crystal cell 30 are set to be 1,100 nm.

As shown in this chromaticity diagram, the display color of the color liquid crystal display apparatus changes from "white", obtained in a state wherein no voltage is applied, to a final display color ("blue" in this case) as the voltage applied to the liquid crystal cell 30 is increased. In this process, the display color becomes "red", "blue" (almost identical to the final display color), and "green", in each of which the light intensity I of the display and the color purity are high. Therefore, the "red", "blue", and "green" displays can be used for a halftone display by controlling the voltage applied to the liquid crystal cell 30.

In the above embodiment, the transmission axes 41a and 42a of the pair of polarizing plates 41 and 42 are obliquely shifted from the molecule aligning direction of the twisted retardation plate 81 on the surface side adjacent to the polarizing plate and from the liquid crystal molecule aligning direction of the liquid crystal cell 30 on the substrate 32 side adjacent to the polarizing plate by about 45°, respectively. However, this angle may be arbitrarily set. Note that the angle is preferably set to be 45°±5° to obtain a satisfactory coloring effect by using the twisted retardation plate 81.

In the above embodiment, the twisted retardation plate 81 is disposed between the liquid crystal cell 30 and the upper polarizing plate 41. However, the twisted retardation plate 81 may be disposed between the liquid crystal cell 30 and the lower polarizing plate 42. The embodiment is not limited to a reflection type. Even if the embodiment is applied to a transmission or semi-transmission type liquid crystal display apparatus, the same effects as those described above can be obtained.

Seventh Embodiment

A color liquid crystal display apparatus of the seventh embodiment is a display apparatus of a so-called active matrix driving scheme. That is, in the first embodiment, the display scheme is changed to a dot display scheme, and a nonlinear active element is arranged for each pixel to drive the liquid crystal.

Figure 23:
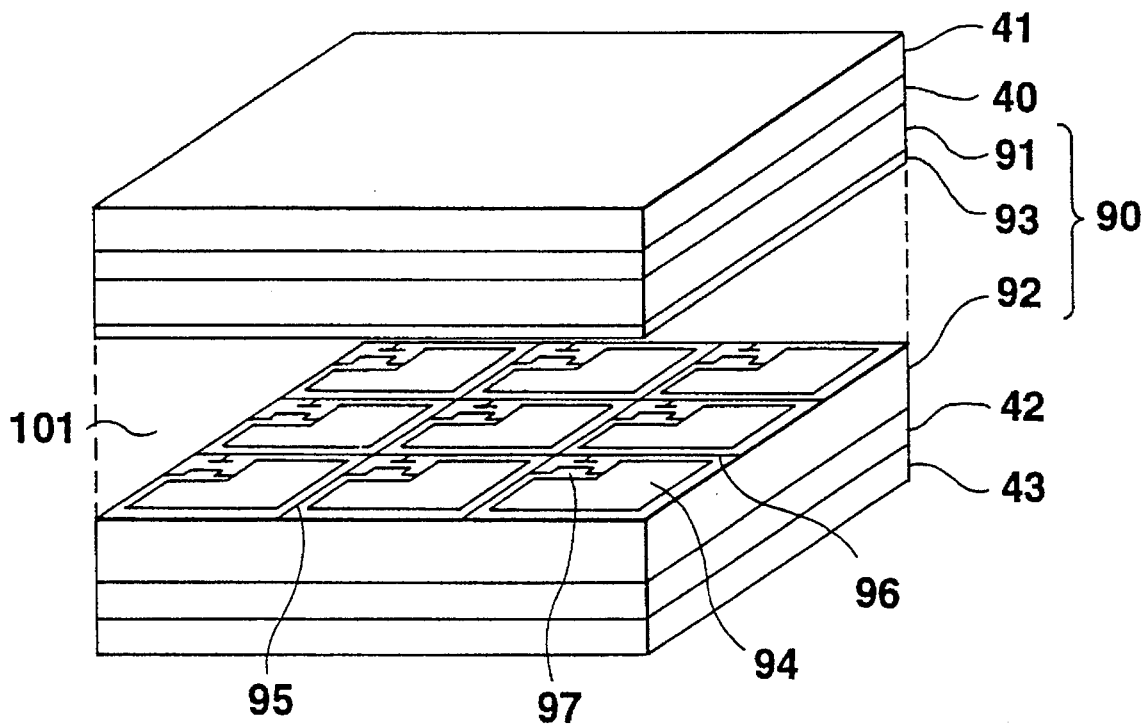
FIG. 23 is an exploded perspective view showing a color liquid crystal display apparatus according to the seventh embodiment of the present invention.
Figure 25:
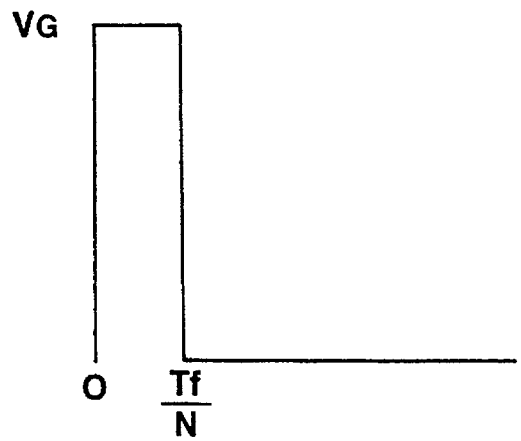
FIGS. 25A, 25B, and 25C are charts respectively showing the waveforms of scanning voltages to be applied in units of continuous scanning lines in the color liquid crystal display apparatus of the seventh embodiment.
Figure 25:
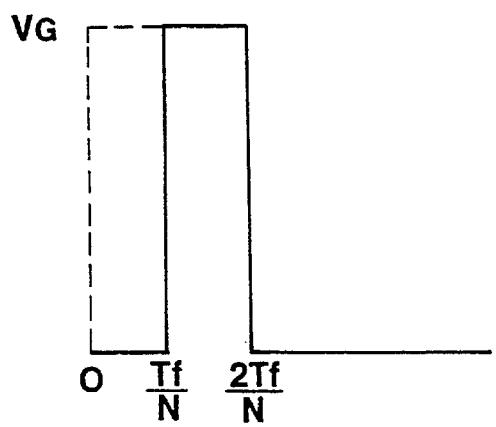
Figure 25:
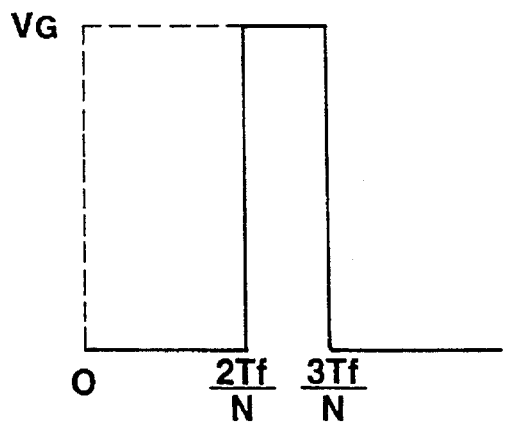

As shown in the perspective view of FIG. 23, upper and lower glass substrates 91 and 92 are disposed to oppose each other through a space (several μm) in which a liquid crystal layer is sealed. A common electrode 93 consisting of a transparent conductive material, e.g., ITO, and a plurality of pixel electrodes 94 are respectively arranged on the opposing surfaces of the glass substrates 91 and 92.

The pixel electrodes 94 are arranged on the upper surface of the lower glass substrate 92 in the form of a matrix. Signal lines 95 and scanning lines 96 are arranged between the respective pixel electrodes 94 in the vertical and horizontal directions, respectively, one by one. That is, a plurality of signal lines 95, extending parallel to each other, and a plurality of scanning lines 96, extending parallel to each other, are arranged in the form of a matrix to cross each other at a right angle. A thin-film transistor (to be referred to as a TFT hereinafter) 97 as an active element is arranged for each pixel electrode 94. The gate, drain, and source electrodes of each TFT 97 are respectively connected to a corresponding one of the scanning lines 96, a corresponding one of the signal lines 95, and a corresponding one of the pixel electrodes 94.

Figure 24:
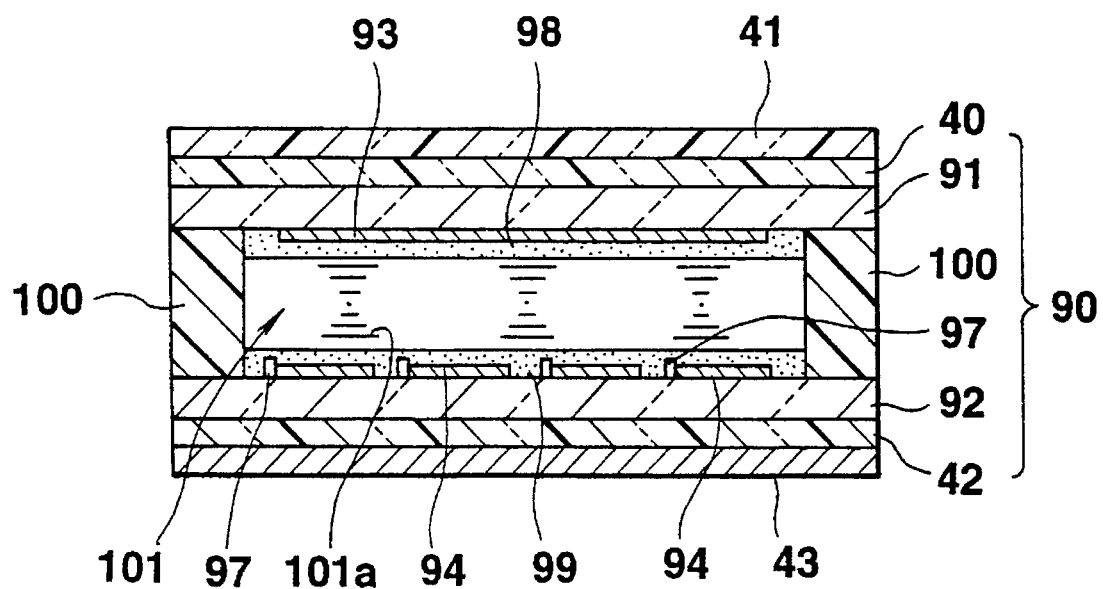
FIG. 24 is a sectional view of the color liquid crystal display apparatus according to the seventh embodiment.

As shown in the sectional view of FIG. 24, aligning films 98 and 99 are respectively formed on the surfaces of the common electrode 93 and each pixel electrode 94 respectively arranged on the opposing surfaces of the glass substrates 91 and 92 of a liquid crystal cell 90 so as to regulate the aligning direction of liquid crystal molecules.

The liquid crystal cell 90 is formed as follows. The upper and lower glass substrates 91 and 92 are disposed to oppose each other through a predetermined space, and the periphery of the space is sealed by a seal member 100. A liquid crystal 101 is injected into the space through a liquid crystal inlet (not shown).

A retardation plate 40, a pair of polarizing plates 41 and 42, and a reflection plate 43, each identical to the corresponding component in the first embodiment, are attached to the liquid crystal cell 90 at the same positions as those in the first embodiment. In addition, the positions/arrangement of the transmission axes of these polarizing plates 41 and 42, the optical axis of the retardation plate 40, and the aligning treatment directions of the aligning films 98 and 99 are the same as those in the first embodiment shown in FIG. 2.

Similar to the first embodiment, the color liquid crystal display apparatus of this embodiment can also obtain colored light based on the polarizing effect of the retardation plate 40, and colored light based on the polarizing effects of both the retardation plate 40 and the liquid crystal cell 90. In addition, since the polarizing effect of the liquid crystal cell 90 changes in accordance with the voltage applied to the liquid crystal cell 90, the color of light can be arbitrarily changed.

The color display/color changing effects based on the active matrix driving scheme in the above-described color liquid crystal display apparatus will be described below.

As shown in FIG. 23, a plurality of transparent electrodes are arranged, as pixel electrodes, on one side of the liquid crystal cell 90 in the form of a dot matrix, and each pixel electrode 94 is connected to a corresponding one of the signal lines 95 through a corresponding one of the thin-film transistors (TFTs) 97. The switching operation of each TFT 97 is controlled by a gate electrode connected to a corresponding one of the scanning lines 96.

FIGS. 25A to 27 respectively show the waveforms of driving voltage signals applied to the signal and scanning lines 95 and 96 in a tricolor display operation.

FIGS. 25A to 25C respectively show the waveforms of driving voltage signals which are sequentially applied to three adjacent scanning lines of the scanning lines 96. Line sequential scanning is performed in the order of FIGS. 25A, 25B, and 25C.

Let N be the number of scanning lines arranged on the substrate 92 to be parallel to one direction, e.g., the horizontal direction, and Tf be a frame time. In this case, as shown in FIG. 25A, a scanning voltage $V_G$ is applied to the first scanning line for a time Tf/N obtained by dividing the frame time by the number of scanning lines. As a result, the TFT 97 to which the scanning voltage is applied is turned on.

Figure 26:
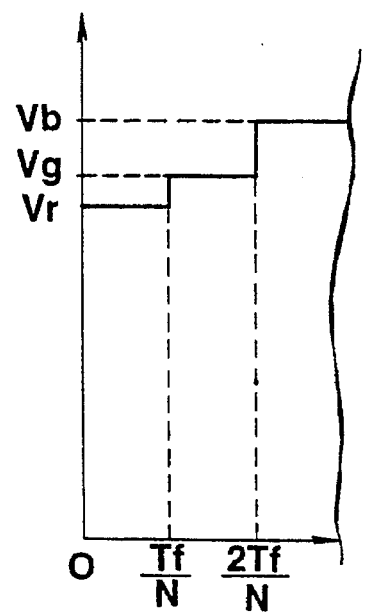
FIG. 26 is a view for explaining the waveform of a signal voltage in the seventh embodiment.

FIG. 26 shows the waveform of a driving voltage signal applied to the signal line 95.

When one of signal voltages Vr (for red), Vg (for green), and Vb (for blue) corresponding to colors to be displayed is applied in accordance with the timing shown in FIG. 25A at which the scanning voltage $V_G$ is applied to the first scanning line, the signal voltage corresponding to the desired display color is applied to each pixel electrode through each TFT 97 in an ON state. When scanning of one line is completed, the corresponding TFTs 97 are turned off, and the signal voltage applied to each TFT 97 is held. That is, one capacitor is constituted by a structure in which a liquid crystal layer is sandwiched between a pixel electrode and a counter electrode so that even if a TFT is turned off after a predetermined charge is stored upon application of a signal voltage, the voltage is held. The time during which the voltage is held corresponds to one frame time Tf.

With this arrangement, since almost the same RMS voltage as the signal voltage applied to a given signal line is applied to liquid crystal molecules 101a in each of the corresponding pixels, a color display can be performed with high controllability.

Figure 27A:
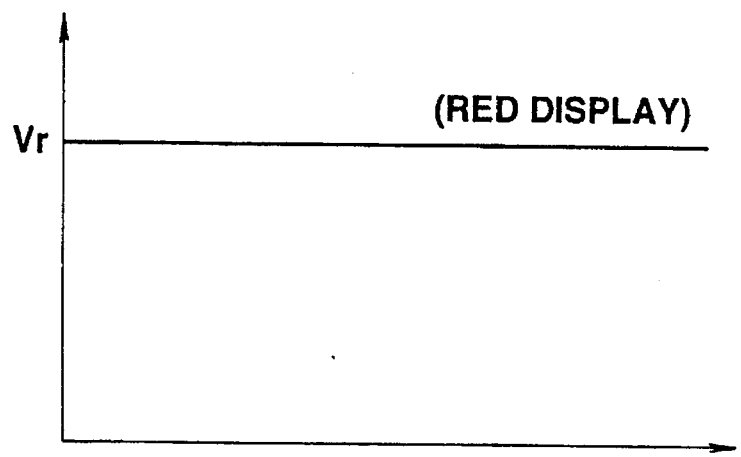
FIGS. 27A, 27B, and 27C are charts each showing a voltage applied to each pixel in the seventh embodiment.
Figure 27B:
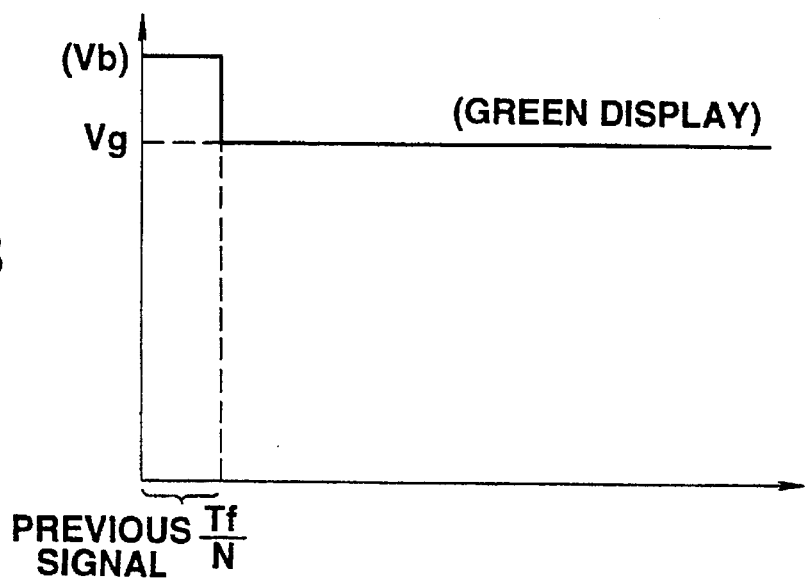
Figure 27C:
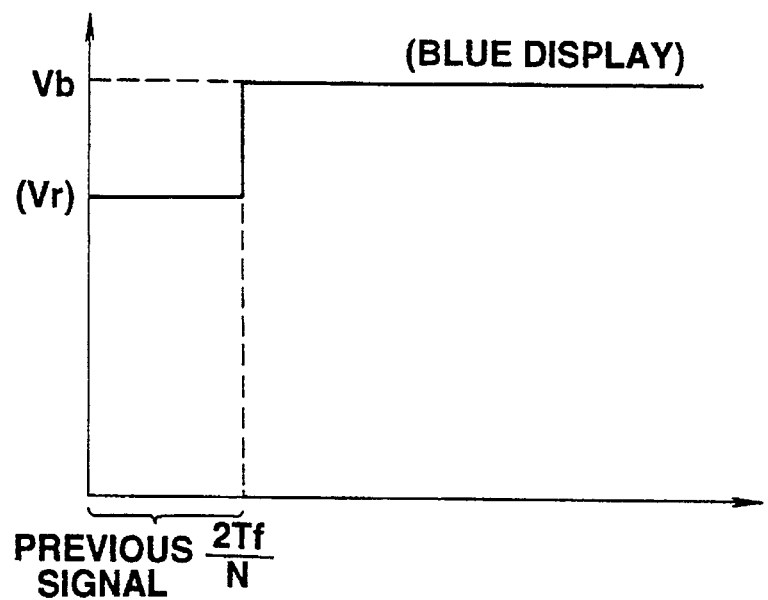

FIGS. 27A to 27C respectively show liquid crystal driving voltage waveforms indicating a state wherein a predetermined charge is held in the pixel electrode 94 and a predetermined voltage is applied to the liquid crystal.

FIG. 27A shows a driving voltage waveform for a red display. As shown in FIG. 25A, the TFTs 97 of the pixel electrodes 94 of the first line are kept on for a time interval between 0 to Tf/N by applying the scanning voltage $V_G$ to the corresponding scanning line 96. At this time, the signal voltage Vr shown in FIG. 26 is applied to a predetermined signal line 95. As a result, as shown in FIG. 27A, the voltage Vr can be stably applied to the corresponding pixel electrode 94 of the first line. With this operation, the aligned state of the liquid crystal molecules 101a of the corresponding pixel is changed to display "red".

When the second line is to be scanned, as shown in FIG. 25B, the TFTs 97 of the corresponding pixel electrodes 94 are kept on for a time interval between Tf/N to 2Tf/N by applying the scanning voltage $V_G$ to the corresponding scanning line 96. At this time, for example, the signal voltage Vg shown in FIG. 26 is applied to a predetermined signal line 95. As a result, as shown in FIG. 27B, the signal voltage Vg can be stably applied to the corresponding pixel electrode 94 after Tf/N. With this operation, the aligned state of the liquid crystal molecules 101a of the corresponding pixel is changed to display "green" in place of "blue" displayed upon application of the signal voltage Vb in the previous scanning operation.

When the third line is to be scanned, as shown in FIG. 25C, the TFTs 97 of the corresponding pixel electrodes 94 are kept on for a time interval between 2Tf/N to 3Tf/N by applying the scanning voltage $V_G$ to the corresponding scanning line 96. At this time, for example, the signal voltage Vb shown in FIG. 26 is applied to a predetermined signal line 95. As a result, as shown in FIG. 27C, the signal voltage Vb can be stably applied to the corresponding pixel electrode 94 after 2Tf/N. With this operation, the aligned state of the liquid crystal molecules 101a of the corresponding pixel is changed to display "blue".

As described above, the color liquid crystal display apparatus of this embodiment can perform a color display operation by controlling the driving voltage applied to the liquid crystal cell 90 without using any color filters. In this case, since no color filters are used, the loss of the amount of transmitted light is greatly reduced, and the brightness of a color display can be sufficiently increased.

Eighth Embodiment

Figure 28:
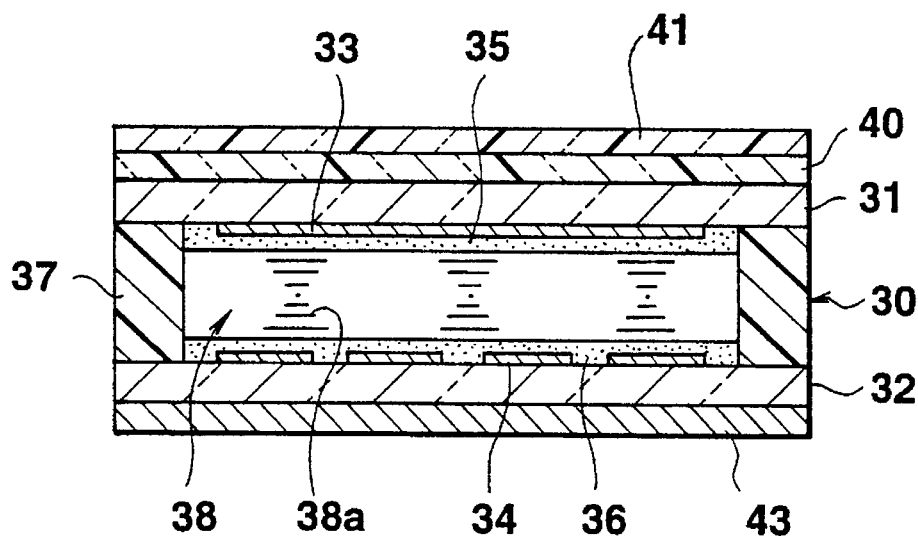
FIG. 28 is a sectional view showing a color liquid crystal display apparatus according to the eighth embodiment of the present invention.

The arrangement of a color liquid crystal display apparatus of the eighth embodiment of FIG. 28 is the same as that of the first embodiment except that the polarizing plate on the reflection plate side is omitted.

Figure 29:
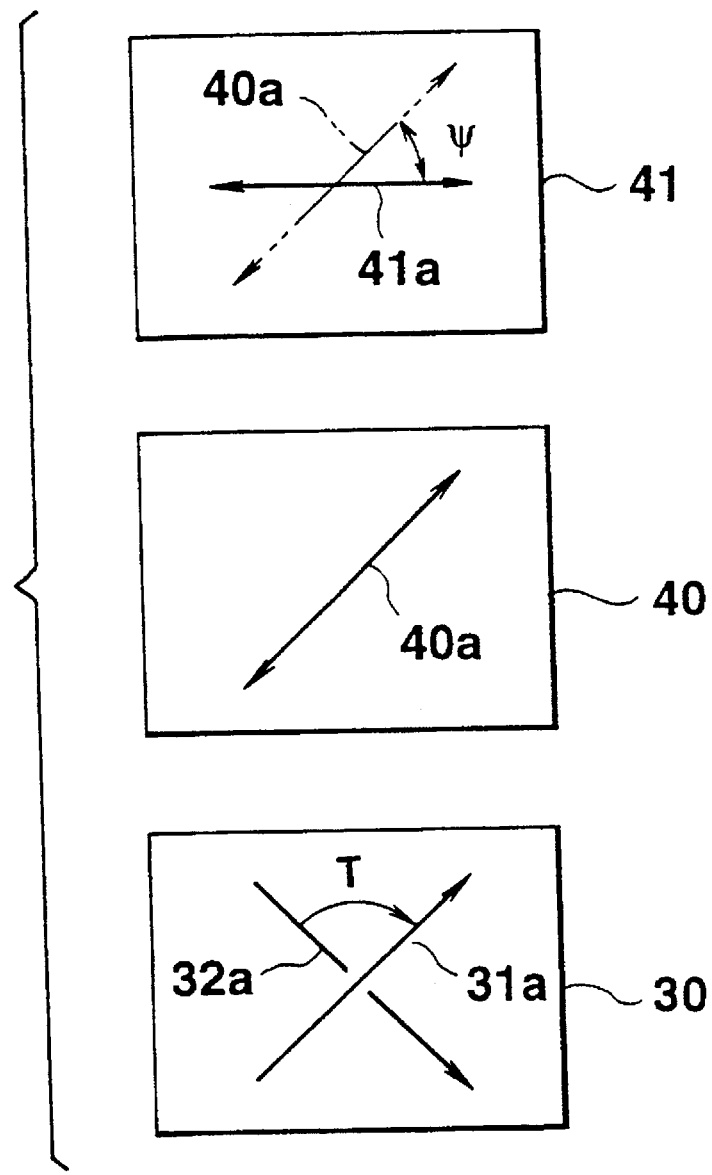
FIG. 29 is a view for explaining the positions/arrangement of the optical axes of the respective optical elements in the eighth embodiment.

FIG. 29 is a plan view showing the liquid crystal molecule aligning direction of a liquid crystal cell 30, the optical axis of a retardation plate 40, and the transmission axis of a polarizing plate 41. An optical axis 40*a* of the retardation plate 40 is almost parallel to a liquid crystal molecule aligning direction 31*a* of the liquid crystal cell 30 on the substrate 31 side adjacent to the retardation plate. Reference numeral 41*a* denotes the transmission axis of the polarizing plate 41. In this embodiment, an angular difference ψ between the transmission axis 41*a* of the polarizing plate 41 and the optical axis 40*a* of the retardation plate 40 is set to be 45°.

The above color liquid crystal display apparatus is of a reflection type, in which light (natural light or light from an illumination source) which is incident from the front surface (upper surface) side of the apparatus is reflected by a reflection plate 43 on the rear surface side, thereby performing a display operation. The incident light from the front surface side passes through the polarizing plate 41, the retardation plate 40, and the liquid crystal cell 30 and is reflected by the reflection plate 43, and the reflected light passes through the liquid crystal cell 30, the retardation plate 40, and the polarizing plate 41 again to emerge.

In this color liquid crystal display apparatus, the transmission axis 41*a* of the polarizing plate 41 is obliquely shifted from the optical axis 40*a* of the retardation plate 40 by a predetermined angle. For this reason, incident light which is linearly polarized by the polarizing plate 41 becomes elliptically polarized light owing to the polarizing effect of the retardation plate 40 in the process of passing therethrough. The polarized state of the light is further changed by the polarizing effect of the liquid crystal cell 30, in which liquid crystal molecules 38*a* are twist-aligned, in the process of passing therethrough, and is also reflected by the reflection plate 43. The polarized state of the reflected light is further changed in the process of passing through the liquid crystal cell 30 and the retardation plate 40 again, and is incident on the polarizing plate 41.

When a voltage is applied between electrodes 33 and 34 of the liquid crystal cell 30, the aligned state of the liquid crystal molecules 38*a* is changed from the twist-aligned state to a state wherein the molecules are raised with respect to the surfaces of substrates 31 and 32. As the aligned state of the liquid crystal molecules 38*a* changes in this manner, the polarizing effect of the liquid crystal cell 30 changes. For this reason, light which has received the polarizing effects of the retardation plate 40 and the liquid crystal cell 30 becomes light in a polarized state different from light in a state wherein no voltage is applied (the liquid crystal molecules are twist-aligned) and is incident on the polarizing plate 41. As the liquid crystal molecules 38*a* are raised/aligned almost vertically, the polarizing effect of the liquid crystal cell 30 is almost nullified. Consequently, the incident light which has been linearly polarized by the polarizing plate 41 receives only the polarizing effect of the retardation plate 40 and is reflected by the reflection plate 43 to be incident on the polarizing plate 41.

As described above, the polarized state of light which is incident on the polarizing plate 41, passes through the retardation plate 40 and the liquid crystal cell 30 twice, and is incident on the polarizing plate 41, with color changes depending on the aligned state of the liquid crystal molecules of the liquid crystal cell 30. In one state, reflected light which is incident on the polarizing plate 41 becomes the same linearly polarized light as that obtained in the initial incidence. In the other state, the incident light becomes elliptically polarized light.

If the reflected light which is incident on the polarizing plate 41 is the same linearly polarized light as that obtained at the initial incidence, since all wavelength components are transmitted through the polarizing plate 41, the emerging light becomes colorless light (white light). If the reflected light which is incident on the polarizing plate 41 is elliptically polarized light, only light components having wavelengths corresponding to the transmission axis of the polarizing plate 41, of the elliptically polarized light, emerge through the polarizing plate 41. As a result, the emerging light becomes colored light.

According to the above color liquid crystal display apparatus, therefore, transmitted light can be colored light without using any color filters, and the brightness of a display can be sufficiently increased by increasing the transmittance.

In the above color liquid crystal display apparatus, provided that the liquid crystal molecule twist angle of the liquid crystal cell 30 is 90°, an intensity I of emerging light can be expressed by equation (8):

$$I = \frac{1}{2} \left\{ \left[ \left( \cos^2 \frac{\pi}{2} \sqrt{1+u^2} + \frac{1-u^2}{1+u^2} \sin^2 \frac{\pi}{2} \sqrt{1+u^2} \right) \cos\Delta - \frac{2u}{\sqrt{1+u^2}} \cos \frac{\pi}{2} \sqrt{1+u^2} \sin \frac{\pi}{2} \sqrt{1+u^2} \sin\Delta \right]^2 + \left( \frac{2u}{1+u^2} \sin^2 \frac{\pi}{2} \sqrt{1+u^2} \right)^2 \right\} \quad (8)$$

$$\Delta = 2\pi \frac{Re}{\lambda}$$

$$u = \frac{2\Delta nd}{\lambda}$$

where Re is the retardation of the retardation plate, Δn is the refractive index anisotropy of the liquid crystal, d is the liquid crystal layer thickness of the liquid crystal, and λ is the wavelength.

The light intensity I obtained by equation (8) is almost ½ the intensity of all wavelength components (visible light) incident on the display apparatus when a white display is performed, i.e., the emerging light becomes colorless light. Therefore, a sufficiently bright display can be obtained.

Figure 30:
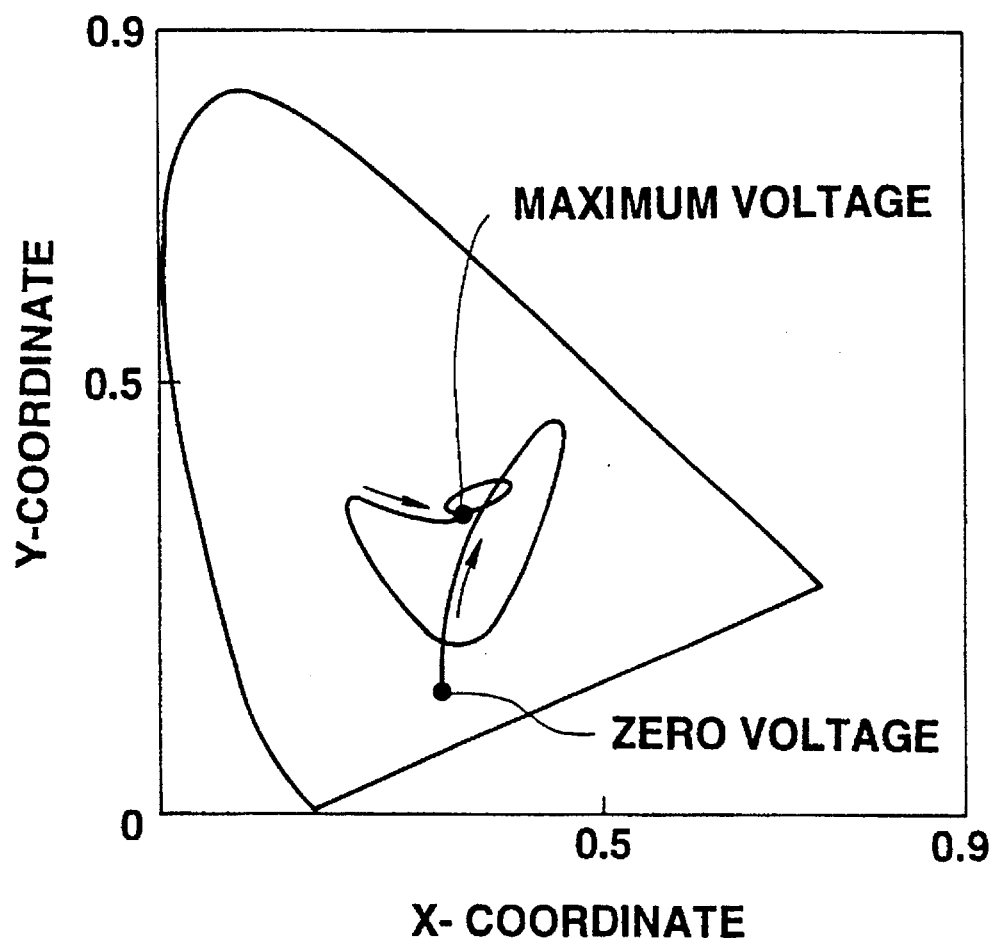
FIG. 30 is a CIE chromaticity diagram showing a change in display color in the eighth embodiment.

FIG. 30 is a CIE chromaticity diagram of the above color liquid crystal display apparatus. This diagram shows chromaticities obtained when the retardation Re of the retardation plate 40 is set to be 400 nm, and the value Δn.d of the liquid crystal cell 30 is set to be 300 nm.

As shown in this chromaticity diagram, with an increase in voltage applied to the liquid crystal cell 30, the display color of the color liquid crystal display apparatus changes from an initial display color, in a state wherein the voltage is 0, i.e., the liquid crystal molecules 38*a* are twist-aligned, to a final display color in a state wherein the maximum voltage is applied, i.e., the liquid crystal molecules 38*a* are raised/aligned vertically. In this process of changing the display color, a display color having a high light intensity I and high color purity appears.

Note that the initial display color of this color liquid crystal display apparatus, i.e., the display color in a state wherein the liquid crystal molecules 38*a* are twist-aligned, is "blue".

In addition, the retardation Re of the retardation plate 40 is 400 nm, and the angular difference ψ between the transmission axis 41a of the polarizing plate 41 and the optical axis 40a of the retardation plate 40 is 45°. For this reason, when a voltage is applied to the liquid crystal cell 30 to raise/align the liquid crystal molecules 38a vertically, i.e., when the polarizing effect of the liquid crystal cell 30 is nullified, and transmitted light receives only the polarizing effect of the retardation plate 40, light which has been elliptically polarized in the process of passing through the retardation plate 40 toward the reflection plate 43 becomes light in a linearly polarized state close to the linearly polarized light in the initial incidence in the process of passing through the retardation plate 40 toward the polarizing plate 41.

For this reason, in the color liquid crystal display apparatus, the final display color in the state wherein the maximum voltage is applied to raise/align the liquid crystal molecules 38a almost vertically is "almost white". With an increase in voltage, the display color changes in the order of "blue" (initial display color), "yellow", "blue", and "almost white" (final display color).

As described above, the color liquid crystal display apparatus can arbitrarily change its display color to the above-mentioned colors by controlling the voltage applied to the liquid crystal cell 30.

In addition, the above-described color liquid crystal display apparatus is constituted by only four components, i.e., one liquid crystal cell 30 having liquid crystal molecules twist-aligned, one retardation plate 40, one polarizing plate 41, and one reflection plate 43. Therefore, the apparatus can be realized with a simple arrangement at a low cost.

In this embodiment, the retardation plate 40 is disposed between the liquid crystal cell 30 and the polarizing plate 41. However, the retardation plate 40 may be disposed between the liquid crystal cell 30 and the reflection plate 43.

As the retardation plate 40, the retardation plate used in the fifth embodiment may be used. That is, the apparatus may use a retardation plate which satisfies $n_X > n_Z > n_Y$ where $n_X$ is the refractive index in the X-axis direction, which is assumed to be equal to the direction of the optical axis of the retardation plate, $n_Y$ is the refractive index in the Y-axis direction perpendicular to the X-axis direction within a plane parallel to the surface of the retardation plate, and $n_Z$ is the refractive index in the Z-axis direction which is the direction of thickness. With this arrangement, the visual angle dependency is reduced, and a color liquid crystal display apparatus having a larger field of angle and a simple structure can be obtained.

Furthermore, the number of retardation plates is not limited to one. For example, two retardation plates may be respectively disposed on two sides of the liquid crystal cell or may be disposed between the liquid crystal cell and the polarizing plate.

Ninth Embodiment

The arrangement of a color liquid crystal display apparatus of the ninth embodiment is the same as that of the color liquid crystal display apparatus of the fourth embodiment in FIG. 13 except that the positions of the retardation plate 40 and the liquid crystal cell 30 are exchanged, and the polarizing plate 42 adjacent to the reflection plate 43 is omitted.

Figure 31:
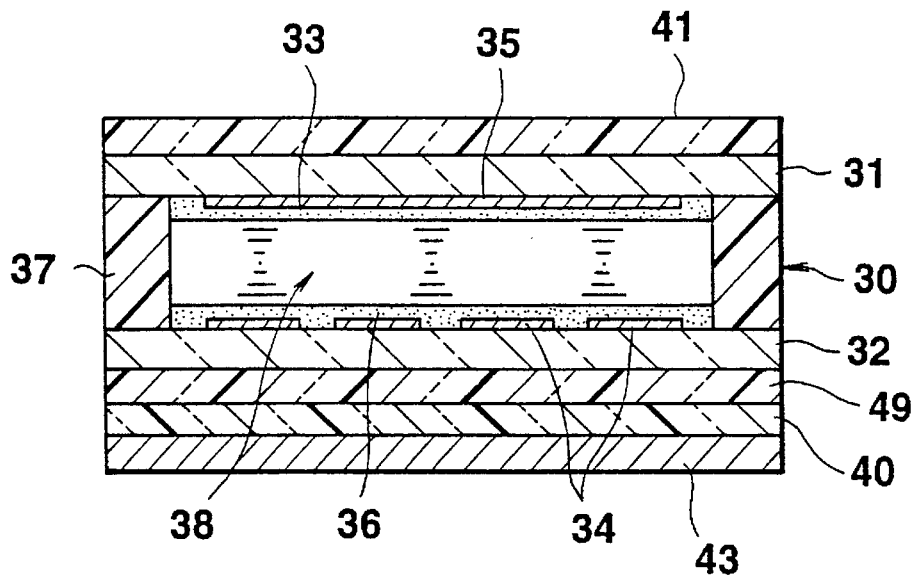
FIG. 31 is a sectional view showing a color liquid crystal display apparatus according to the ninth embodiment of the present invention.

As shown in FIG. 31, a liquid crystal cell 30 is sandwiched between a pair of polarizing plates 41 and 49, and a retardation plate 40 is disposed between one polarizing plate 49 and a reflection plate 43.

The upper and lower polarizing plates 41 and 49 are arranged such that their transmission axes are set to be almost perpendicular or parallel to each other. The retardation plate 40 is arranged such that its optical axis obliquely crosses the transmission axis of the adjacent lower polarizing plate 49 at a predetermined angle.

Figure 32:
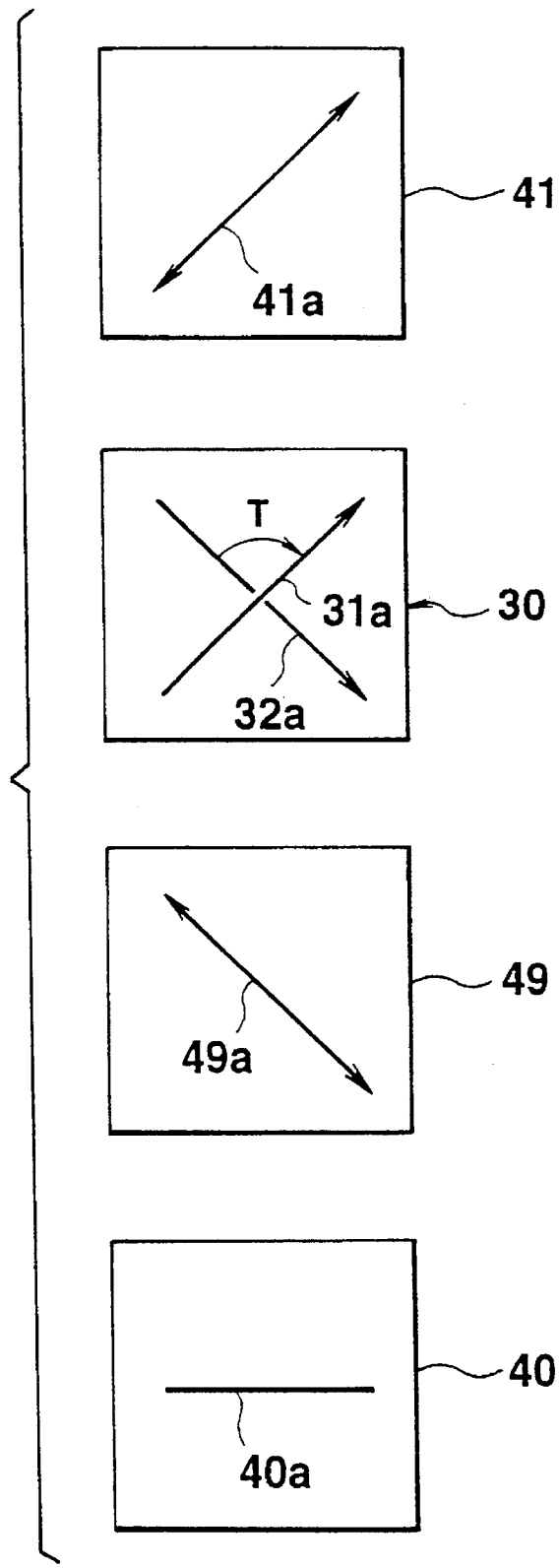
FIG. 32 is a view for explaining the positions/arrangement of the optical axes of the respective optical elements in the ninth embodiment.
Figure 34:
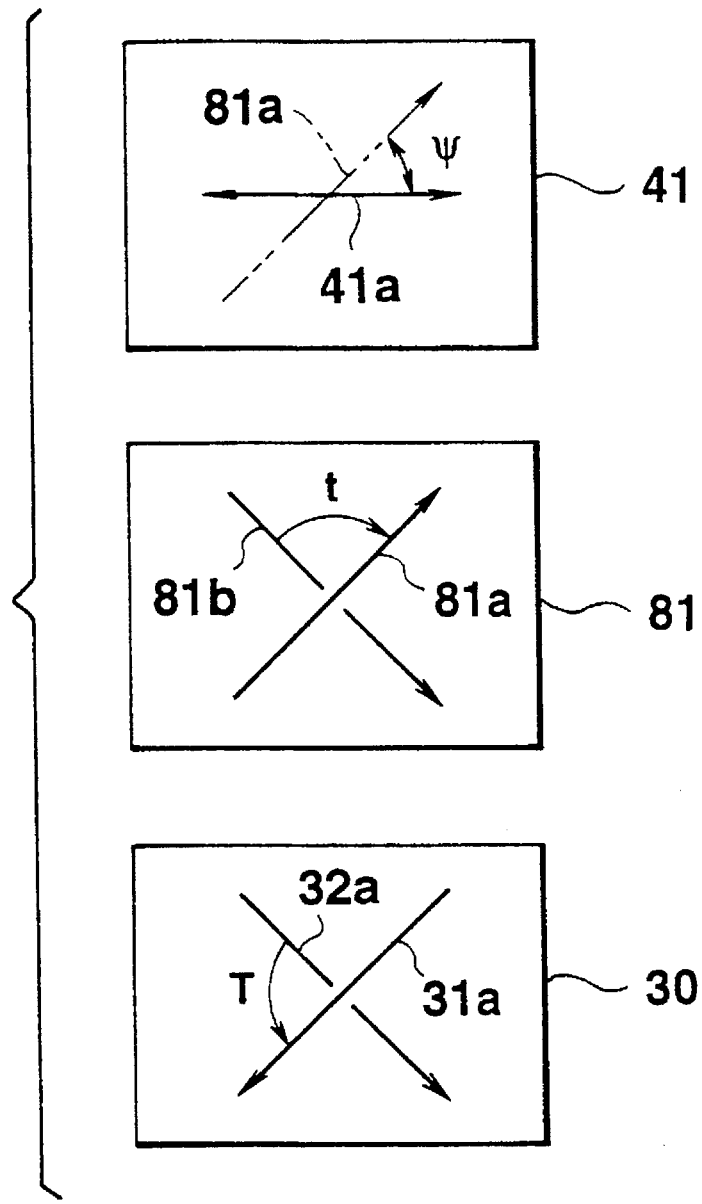
FIG. 34 is a view for explaining the positions/arrangement of the optical axes of the respective optical elements in the tenth embodiment.

As shown in FIG. 32, in this embodiment, the lower and upper polarizing plates 49 and 41 are arranged such that their transmission axes 49a and 41a are set to be perpendicular to each other.

In addition, the retardation plate 40 is arranged such that its optical axis 40a obliquely crosses the transmission axis 49a of the lower polarizing plate 49 at 45°.

In this liquid crystal display apparatus, external light is incident on the liquid crystal cell 30 through the upper polarizing plate 41 arranged on the opposite side to the reflection plate 43. The light which is incident on the lower polarizing plate 49 through the liquid crystal cell 30 is transmitted through or absorbed by the lower polarizing plate 49 in accordance with the aligned state of the liquid crystal molecules of the liquid crystal cell 30.

The light transmitted through the lower polarizing plate 49 passes through the retardation plate 40 and is reflected by the reflection plate 43. The reflected light is incident on the lower polarizing plate 49 again through the retardation plate 40. The light which is transmitted through the lower polarizing plate 49 becomes colored light.

More specifically, in this liquid crystal display apparatus, the polarized state of linearly polarized light which is incident on the retardation plate 40 through the lower polarizing plate 49 is changed by the polarizing effect of the retardation plate 40 in the process of passing through the retardation plate 40. In addition, the light is reflected by the reflection plate 43 and its polarized state is further changed in the process of passing through the retardation plate 40 again. The light is then incident on the lower polarizing plate 49. Of the incident light, only light components having wavelengths corresponding to the transmission axis of the lower polarizing plate 49 are transmitted through the lower polarizing plate 49 to become colored light. This colored light emerges from the front surface side of the liquid crystal display apparatus through the liquid crystal cell 30 and the upper polarizing plate 41. As a result, a color display operation can be performed with a bright color display and a dark "black" display.

The color of light in this color liquid crystal display apparatus is determined by a retardation Re of the retardation plate 40 and the angular difference between the transmission axis 49a of the lower polarizing plate 49 and the optical axis 40a of the retardation plate 40. Assume that the angular difference between the transmission axis 49a of the lower polarizing plate 49 and the optical axis 40a of the retardation plate 40 is 45°. In this case, when the retardation of the retardation plate 40 is 450 nm, the display color is "blue"; and when the retardation is 550 nm, the display color is "green".

The above-described color liquid crystal display apparatus is of a positive display type, in which the transmission axes 49a and 41a of the lower and upper polarizing plates 49 and 41 sandwiching the liquid crystal cell 30 are set to be perpendicular to each other. In this type, a display pattern is displayed in "black" in a "blue" or "green" background, and the contrast of the display is good. In addition, since no color filters are used, a two-color display with a bright black and a chromatic color can be obtained. Furthermore, the field of angle of this apparatus is larger than that of the eight embodiment or the like using one polarizing plate.

The liquid crystal display apparatus of the above-described embodiment is of a positive display type. However, the color liquid crystal display apparatus may be of a negative display type, in which the transmission axes 49a and 41a of the lower and upper polarizing plates 49 and 41 sandwiching the liquid crystal cell 30 are set to be almost parallel to each other.

Tenth Embodiment

A color liquid crystal display apparatus of the tenth embodiment has the same arrangement as that of the color liquid crystal display apparatus of the eighth embodiment except that the retardation plate is replaced with the twisted retardation plate used in the fifth embodiment.

Figure 33:
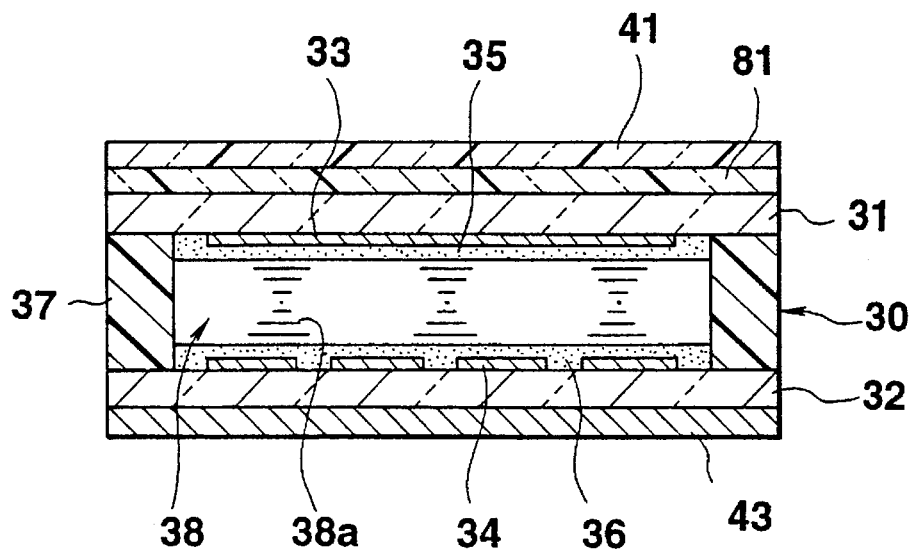
FIG. 33 is a sectional view showing a color liquid crystal display apparatus according to the tenth embodiment of the present invention.

As shown in FIG. 33, a twisted retardation plate 81 is disposed between an upper substrate 31 of a liquid crystal cell 30 and a polarizing plate 41, and a reflection plate 43 is mounted on the lower surface of a lower substrate 32. Other arrangements are the same as those of the eight embodiment.

In the color liquid crystal display apparatus of this embodiment, while no voltage is applied to the liquid crystal cell 30, linearly polarized light transmitted through the polarizing plate 41 becomes elliptically polarized light upon transmitting through the twisted retardation plate 81. The elliptically polarized light is restored to the linearly polarized light upon transmitting through the liquid crystal cell 30. Thereafter, the light is reflected by the reflection plate 43 and becomes elliptically polarized light upon transmitting through the liquid crystal cell 30 again. The elliptically polarized light is then transmitted through the twisted retardation plate 81 and returns to the polarizing plate 41 as the initial linearly polarized light. When a voltage is applied to the liquid crystal cell 30, the linearly polarized light transmitted through the polarizing plate 41 returns as elliptically polarized light.

When the light which returns to the polarizing plate 41 is the same linearly polarized light as the transmitted light in the initial incidence, all wavelength components are transmitted through the polarizing plate 41. As a result, the emerging light becomes colorless light. When the light which returns to the polarizing plate 41 is elliptically polarized light, only light components having wavelengths corresponding to the transmission axis of the polarizing plate 41 are transmitted through the polarizing plate 41 to emerge therefrom. In this case, the emerging light is colored light.

According to the above-described color liquid crystal display apparatus, therefore, transmitted light can be colored light without using any color filters, and a sufficiently bright color display can be obtained even in a reflection type by increasing the transmittance.

In the above-described color liquid crystal display apparatus, provided that the liquid crystal molecule twist angle of the liquid crystal cell 30 is 90°, an intensity I of emerging light is expressed by equation ((9):

$$I = \frac{1}{2} [\{x_1^2 - y_1^2 + z_1^2)(x_2^2 - y_2^2 + z_2^2) + \tag{9}$$

$$4y_1y_2(x_1x_2 + z_1z_2)\}^2 + 4\{(x_1^2 + y_1^2 - Z_1^2)y_2z_2 +$$

$$2x_1z_1x_2y_2 - y_1z_1(x_2^2 - y_2^2 + z_2^2)\}^2]$$

$$x_1 = \cos\frac{\pi}{2}\sqrt{1+u_1^2}$$

$$X_2 = \cos\frac{\pi}{2}\sqrt{1+u_2^2}$$

-continued $$y_1 = -\frac{u_1}{\sqrt{1+u_1^2}} \sin\frac{\pi}{2}\sqrt{1+u_1^2}$$

$$y_2 = \frac{u_2}{\sqrt{1+u_2^2}} \sin\frac{\pi}{2}\sqrt{1+u_2^2}$$

$$z_1 = \frac{1}{\sqrt{1+u_1^2}} \sin\frac{\pi}{2}\sqrt{1+u_1^2}$$

$$z_2 = \frac{1}{\sqrt{1+u_2^2}} \sin\frac{\pi}{2}\sqrt{1+u_2^2}$$

$$u_1 = \frac{2\Delta n_1 d_1}{\lambda}$$

$$u_2 = \frac{2\Delta n_2 d_2}{\lambda}$$

where $\Delta n_1$ is the refractive index anisotropy of the twisted retardation plate, $d_1$ is the thickness of the twisted retardation plate, $\Delta n_2$ is the refractive index anisotropy of the liquid crystal, and $d_2$ is the liquid crystal layer thickness.

The light intensity I obtained by equation (9) is almost ½ the intensity of all wavelength components (visible light) incident on the display apparatus when a white display is performed, i.e., the emerging light becomes colorless light. Therefore, a sufficiently bright display can be obtained.

when light is to be colored light by using a color filter, the display color is determined by the color of the color filter. In contrast to this, in the above-described color liquid crystal display apparatus, the display color can be changed by controlling the voltage applied to the liquid crystal cell 30.

Figure 35:
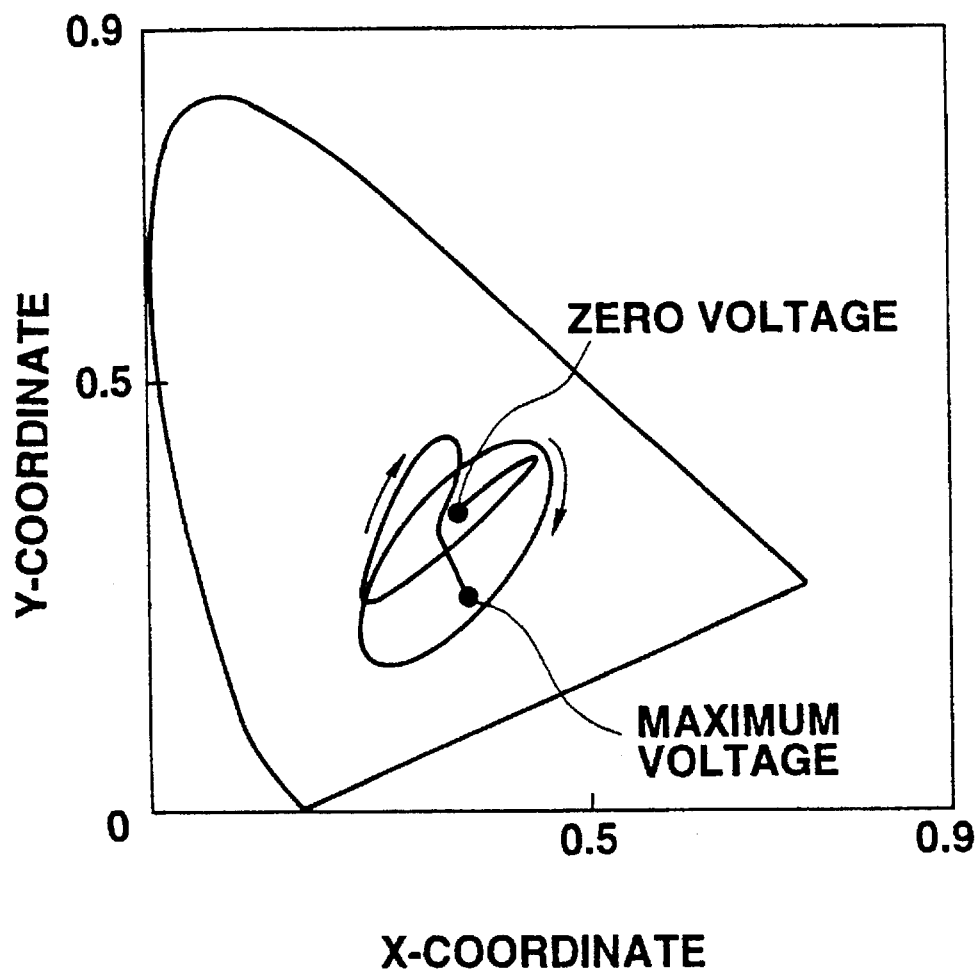
FIG. 35 is a CIE chromaticity diagram showing a change in display color in the tenth embodiment.

FIG. 35 is a CIE chromaticity diagram of the above color liquid crystal display apparatus. In this case, a value $\Delta n \cdot d$ ($\Delta n_1 d_1$ in equation (9)) of the twisted retardation plate 81 and a value $\Delta n \cdot d$ ($\Delta n_2 d_2$ in equation (9)) of the liquid crystal cell 30 are set to be 900 nm, and an angular difference $\psi$ between the transmission axis 41a of the polarizing plate 41 and a molecule aligning direction 81a of the twisted retardation plate 81 on the polarizing plate 41 side is 45°.

As shown in the chromaticity diagram of FIG. 35, the final display color obtained when a voltage is applied to the liquid crystal cell 30 to raise/align liquid crystal molecules 38a vertically, i.e., the display color obtained when the polarizing effect of the liquid crystal cell 30 is nullified, and transmitted light receives only the polarizing effect of the twisted retardation plate 81, is "green". With an increase in voltage applied to the liquid crystal cell 30, the display color changes in the order of "white" (initial display color), "yellow", "blue", "yellow", "blue", and "green" (final display color).

By controlling the voltage applied to the liquid crystal cell 30 in this manner, the display color of the above color liquid crystal display apparatus can be arbitrarily changed to the colors described above.

In addition, the above color liquid crystal display apparatus is constituted by only four components, i.e., one liquid crystal cell 30 having liquid crystal molecules twist-aligned, one twisted retardation plate 81, one polarizing plate 41, and one reflection plate 43. Therefore, the apparatus can be realized with a simple arrangement at a low cost.

In the above embodiment, the twisted retardation plate 81 is disposed between the liquid crystal cell 30 and the polarizing plate 41. However, the twisted retardation plate 81 may be disposed between the liquid crystal cell 30 and the reflection plate 43.

Eleventh Embodiment

Figure 36:
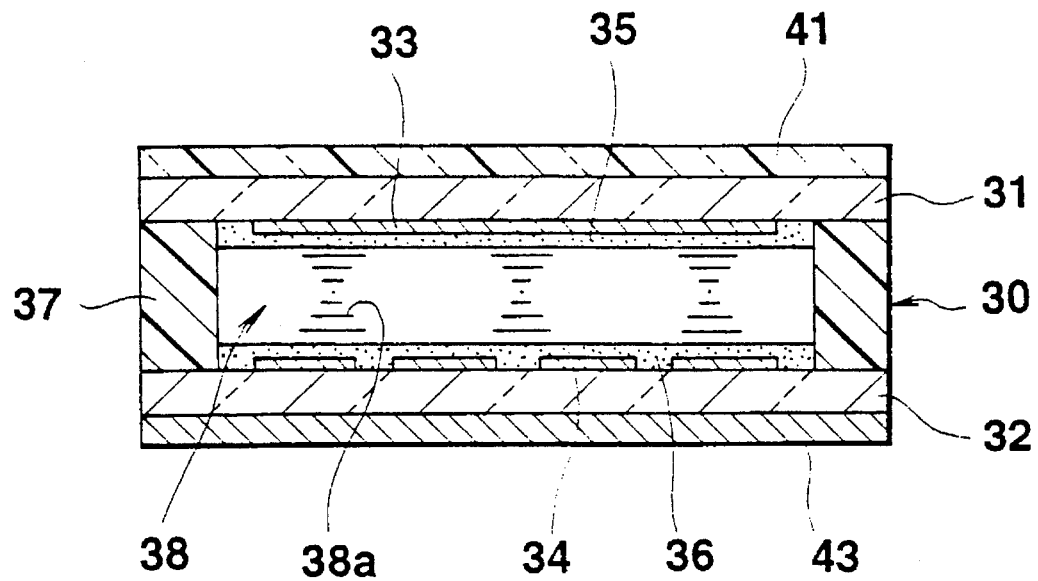
FIG. 36 is a sectional view showing a color liquid crystal display apparatus according to the eleventh embodiment of the present invention.

As shown in FIG. 36, a color liquid crystal display apparatus is constituted by one TN-type liquid crystal cell 30 in which liquid crystal molecules are twist-aligned, one polarizing plate 41, and one reflection plate 43. The polarizing plate 41 is disposed on the front surface side of the liquid crystal cell 30, and the reflection plate 43 is disposed on the rear surface side of the liquid crystal cell 30.

The polarizing plate 41 is bonded to the upper surface of a substrate (upper surface) 31 on the front surface side of the liquid crystal cell 30. The reflection plate 43 is bonded to the lower surface of a substrate (lower substrate) 32 on the rear surface side of the liquid crystal cell 30. The polarizing plate 41 is arranged such that its transmission axis obliquely crosses the liquid crystal molecule aligning direction of the liquid crystal cell 30 on the substrate (upper substrate) 31 side adjacent to the polarizing plate by a predetermined angle.

Figure 37:
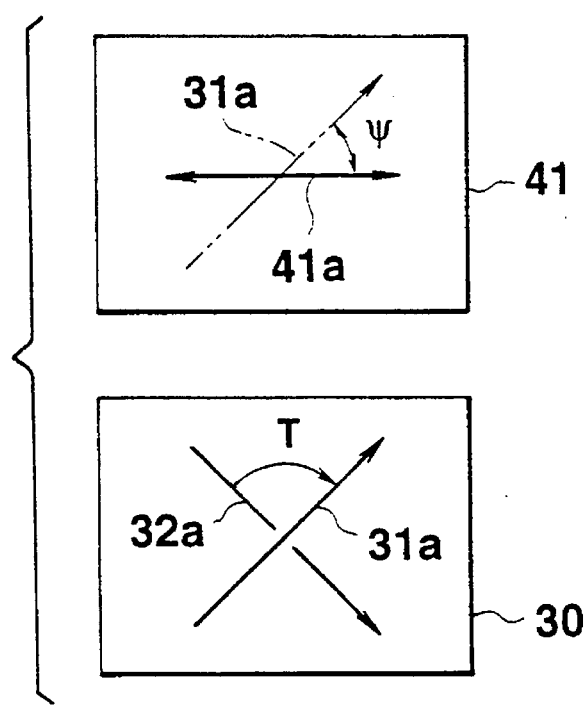
FIG. 37 is a view for explaining the positions/arrangement of the optical axes of the respective optical elements in the eleventh embodiment.

Referring to FIG. 37, reference numeral 41a denotes a transmission axis of the polarizing plate 41. In this embodiment, an angular difference $\psi$ between the transmission axis 41a of the polarizing plate 41 and a liquid crystal molecule aligning direction 31a of the liquid crystal cell 30 on the substrate 31 side adjacent to the polarizing plate is set to be 45°.

This color liquid crystal display apparatus is of a refection type, in which light (natural light or light form an illumination source) which is incident from the front surface side of the apparatus is reflected by the reflection plate 43 on the rear surface side to perform a display operation. The light which is incident from the front surface side passes through the polarizing plate 41 and the liquid crystal cell 30 and is reflected by the reflection plate 43. The reflected light passes through the liquid crystal cell 30 and the polarizing plate 41 to emerge. In addition, the color liquid crystal display apparatus is driven to perform a display operation by applying a voltage between electrodes 33 and 34 of the two substrates 31 and 32 of the liquid crystal cell 30.

In this color liquid crystal display apparatus, the transmission axis 41a of the polarizing plate 41 is obliquely shifted from the liquid crystal molecule aligning direction 31a of the liquid crystal cell 30 on the substrate 31 side adjacent to the polarizing plate by a predetermined angle. For this reason, while liquid crystal molecules 38a of the liquid crystal cell 30 are twist-aligned, linearly polarized light incident on the liquid crystal cell 30 through the polarizing plate 41 becomes elliptically polarized light owing to the polarizing effect of the liquid crystal cell 30 in the process of passing through the liquid crystal cell 30. In addition, the light is reflected by the reflection plate 43, and the polarized state of the light is further changed in the process of passing through the liquid crystal cell 30. As a result, the light which has received the polarizing effect of the liquid crystal cell 30 twice is incident on the polarizing plate 41.

When a voltage is applied between the electrodes 33 and 34 of the liquid crystal cell 30, the aligned state of the liquid crystal molecules 38a changes from the twist-aligned state to a state wherein they are raised/aligned to be perpendicular to the surfaces of the substrates 31 and 32. With this change, the polarizing effect of the liquid crystal molecules 38a changes. Therefore, the light which has received the polarizing effect of the liquid crystal cell 30 twice becomes light in a polarized state different from that set when no voltage is applied, and is incident on the polarizing plate 41.

When the liquid crystal molecules 38a are raised almost vertically, the polarizing effect of the liquid crystal cell 30 is nullified. As a result, the linearly polarized light which is incident on the liquid crystal cell 30 through the polarizing plate 41 passes through the liquid crystal cell 30, with its polarized state remaining the same, and is reflected by the reflection plate 43. The reflected light passes through the liquid crystal cell 30 again and is incident on the retardation plate 40.

If the reflected light incident on the polarizing plate 41 is the same linearly polarized light as that obtained at the time of the initial incidence, since all wavelength components are transmitted through the polarizing plate 41, the emerging light becomes colorless light. If the reflected light incident on the polarizing plate 41 is elliptically polarized light, only the wavelength components corresponding to the transmission axis of the polarizing plate 41 are transmitted through the polarizing plate 41. As a result, the emerging light becomes colored light.

As described above, according to the above color liquid crystal display apparatus, transmitted light can be colored light by the simple arrangement constituted by one polarizing plate, one TN-type liquid crystal cell, and one reflection plate without using any color filters. Therefore, the optical loss caused when light is transmitted through optical elements can be greatly reduced, and a sufficiently bright color display can be obtained even in a refection type.

In the above color liquid crystal display apparatus, an intensity I of light emerging from the apparatus is expressed by equation (10):

$$I = \frac{1}{2} [\cos^4\phi \sqrt{1+u^2} + \frac{2(1+u^2)}{1+u^2} \sin^2\phi \sqrt{1+u^2} \cos^2\phi \sqrt{1+u^2} + \sin^4\phi \sqrt{1+u^2}\ ]$$

$$= \frac{1}{2(1+u^2)} (1 + u^2\cos^2 2\phi \sqrt{1+u^2}\ )$$

$$u = \frac{\pi \Delta nd}{\phi \lambda}$$

When $\phi$ is 90°, $$u = \frac{2\Delta nd}{\lambda}$$

where $\Delta n$ is the refractive index anisotropy of the liquid crystal, d is the liquid crystal layer thickness, $\lambda$ is the wavelength, and $\phi$ is the twist angle of the liquid crystal molecules.

The light intensity I obtained by equation (10) is almost ½ the intensity of all wavelength components (visible light) incident on the display apparatus when a white display is performed, i.e., the liquid crystal molecules 38a of the liquid crystal cell 30 are raised/aligned vertically and the emerging light becomes colorless light. In addition, this light intensity I is uniform throughout all wavelength components in the visible light region. Therefore, a sufficiently bright display can be obtained.

In the conventional color liquid crystal display apparatus using color filters, the display color is determined by the color of a color filter. However, in the color liquid crystal display apparatus of the above embodiment, colored light obtained by the polarizing effect of the liquid crystal cell 30 can be changed by controlling the voltage applied to the liquid crystal cell 30.

Figure 38:
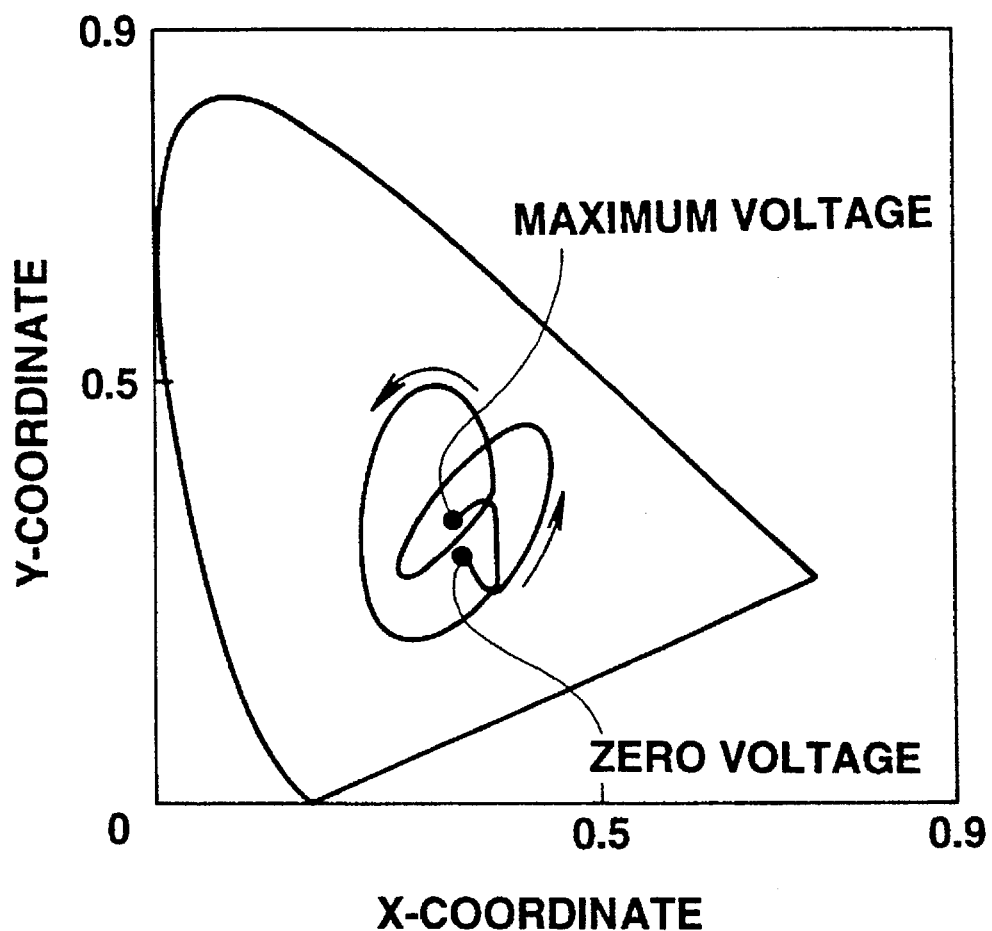
FIG. 38 is a CIE chromaticity diagram showing a change in display color in the eleventh embodiment.

FIG. 38 is a CIE chromaticity diagram of the above color liquid crystal display apparatus. This diagram shows chromaticities obtained when the value $\Delta n.d$ of the liquid crystal cell 30 is set to be 900 nm.

As shown in this chromaticity diagram, with an increase in voltage applied to the liquid crystal cell 30, the display color changes from the initial display color, obtained in a state wherein no voltage is applied, i.e., the liquid crystal molecules 38a are twist-aligned, to "white" as the final display color obtained in a state wherein the maximum voltage is applied, i.e., the liquid crystal molecules 38a are raised/aligned vertically. In this process, several display colors having high light intensities I and high color purity are obtained.

More specifically, the initial display color in a state wherein no voltage is applied and the liquid crystal molecules 38a are twist-aligned is "almost white", and the display color changes with an increase in voltage in the order of "almost white" (initial display color), "green", "blue", "yellow", and "white" (final display color).

As described above, the color liquid crystal display apparatus can arbitrarily change its display color to the above colors by controlling the voltage applied to the liquid crystal cell 30.

In addition, the above-described color liquid crystal display apparatus is constituted by only three components, i.e., one liquid crystal cell 30 having liquid crystal molecules twist-aligned, one polarizing plate 41, and one reflection plate 43. Therefore, the apparatus can be realized with a simple arrangement at a low cost.

In the above-described embodiment, the angular difference ψ between the transmission axis 41a of the polarizing plate 41 and the liquid crystal molecule aligning direction 31a of the liquid crystal cell 30 on the substrate 31 side adjacent to the polarizing plate is set to be 45°. This angular difference ψ is not limited to 45° and may be arbitrarily set. However, in order to obtain a sufficient color effect by using the liquid crystal cell 30, the angular difference ψ is preferably set to be 45°±5°.

In the first to tenth embodiments, the angle (angular difference) ψ at which the optical axis of the retardation plate three-dimensionally crosses the transmission axis of the adjacent polarizing plate is set to be 45°. However, this angular difference λ is not limited to 45° and may be arbitrarily set in accordance with a display color to be desired. However, in order to obtain a satisfactory color display effect by using the retardation plate, the angular difference ψ is preferably set to be 45°±5°.

All the apparatuses of the first to eleventh embodiments are reflection type display apparatuses. However, the present invention is not limited to a reflection type and can be applied to a transmission type color liquid crystal display apparatus using no reflection plate or a color liquid crystal display apparatus using a semi-transmission/reflection plate and serving both as a reflection type and a transmission type.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

no more than a single liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a first retardation plate disposed between said pair of polarizing plates such that an angle defined by an optical axis of said retardation plate, along which a refractive index is the maximum in a planar direction of said retardation plate, and the transmission axis of an adjacent one of said polarizing plates becomes substantially 45°; and voltage application means, connected to said electrodes, for changing a voltage applied to said liquid crystal layer in no less than three steps so as to display no less than three colors in accordance with a color selection signal and a display signal corresponding to display data in order to change a polarized state of light transmitted through said liquid crystal layer so as to change a color of light transmitted through said polarizing plate on an exit side and obtain a display with a color in accordance with the color selection signal.

2. An apparatus according to claim 1, further comprising a second retardation plate disposed between said pair of polarizing plates.

3. An apparatus according to claim 2, wherein said second retardation plate is disposed between said first retardation plate and one of said pair of polarizing plates which is adjacent thereto.

4. An apparatus according to claim 2, wherein said first retardation plate is disposed adjacent to one of said substrates, and said second retardation plate is disposed adjacent to the other of said substrates.

5. An apparatus according to claim 1, further comprising another polarizing plate, disposed between said retardation plate and one of said substrates which is adjacent thereto, for displaying at least black.

6. An apparatus according to claim 1, wherein said electrodes formed on one of the opposing surfaces are segment electrodes having a shape corresponding to a display pattern.

7. An apparatus according to claim 1, further comprising pixel electrodes regularly arranged on one of said pair of substrates, and thin-film transistors arranged in correspondence with said respective pixel electrodes, each of said thin-film transistors having a source electrode connected to a corresponding one of said pixel electrodes, a drain electrode connected to a signal line for supplying a display signal, and a gate electrode connected to a scanning line for supplying a scanning signal.

8. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

no more than a single polarizing plate disposed outside one of said pair of substrates and having a transmission axis for linearly polarizing incident light;

a reflection plate disposed on an opposite side to said polarizing plate with respect to said pair of substrates;

a first retardation plate disposed between said polarizing plate and said reflection plate and having an optical axis along which a refractive index is the maximum in a planar direction of said retardation plate, said retardation plate being arranged such that an angle defined by the optical axis and a transmission axis of said polarizing plate is substantially 45°; and voltage application means, connected to said electrodes, for changing a voltage applied to said liquid crystal layer in accordance with a color selection signal and a display signal corresponding to display data in order to change a polarized state of light which is transmitted through said liquid crystal layer before and after reflection, so as to change a color of light transmitted through said polarizing plate and obtain a display with a color in accordance with the color selection signal.

9. An apparatus according to claim 8, further comprising a second retardation plate disposed between said polarizing plate and said reflection plate.

10. An apparatus according to claim 9, wherein said second retardation plate is disposed between said first retardation plate and said polarizing plate.

11. An apparatus according to claim 9, wherein said second retardation plate is disposed on an opposite side to said first retardation plate with respect to said pair of substrates.

12. An apparatus according to claim 8, further comprising another polarizing plate, disposed between said retardation plate and one of said substrates which is adjacent thereto, for displaying at least black.

13. An apparatus according to claim 8, wherein said electrodes formed on one of the opposing surfaces are segment electrodes having a shape corresponding to a display pattern.

14. An apparatus according to claim 8, further comprising pixel electrodes regularly arranged on one of said pair of substrates, and thin-film transistors arranged in correspondence with said respective pixel electrodes, each of said thin-film transistors having a source electrode connected to a corresponding one of said pixel electrodes, a drain electrode connected to a signal line for supplying a display signal, and a gate electrode connected to a scanning line for supplying a scanning signal.

15. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

no more than a single polarizing plate arranged outside one of said pair of substrates and having a transmission axis for linearly polarizing incident light, said polarizing plate being arranged such that an angle defined by a direction of an aligning treatment performed with respect to said aligning film on said adjacent substrate and the transmission axis is substantially 45°;

a reflection plate disposed on an opposite side to said polarizing plate with respect to said pair of substrates; and voltage application means, connected to said electrodes, for changing a voltage applied to said liquid crystal layer in accordance with a color selection signal and a display signal corresponding to display data in order to change a polarized state of light which is transmitted through said liquid crystal layer before and after reflection, so as to change a color of light transmitted through said polarizing plate and obtain a display with a color in accordance with the color selection signal.

16. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a twisted retardation plate, having material molecules aligned to be twisted from one surface to the other surface, disposed between said pair of polarizing plates such that an angle defined by a molecule aligning direction of said twisted retardation plate on the surface side adjacent to the polarizing plate and the transmission axis of the adjacent polarizing plate is 45°±5°; and voltage application means, connected to said electrodes, for changing a voltage applied to said liquid crystal layer in accordance with a color selection signal and a display signal corresponding to display data in order to change a polarized state of light transmitted through said liquid crystal layer so as to change a color of light transmitted through said polarizing plate and obtain a display with a color in accordance with the color selection signal.

17. An apparatus according to claim 16, further comprising a reflection plate disposed outside one of said pair of polarizing plates.

18. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a polarizing plate disposed outside said pair of substrates to sandwich said substrates and having a transmission axis for linearly polarizing incident light;

a twisted retardation plate, having material molecules aligned to be twisted from one surface to the other surface, disposed between said pair of polarizing plates such that an angle defined by a molecule aligning direction of said twisted retardation plate on the surface side adjacent to the polarizing plate and the transmission axis of the adjacent polarizing plate is 45°±5°; and voltage application means, connected to said electrodes, for changing a voltage applied to said liquid crystal layer in accordance with a color selection signal and a display signal corresponding to display data in order to change a polarized state of light which is transmitted through said liquid crystal layer before and after reflection so as to change a color of light transmitted through said polarizing plate and obtain a display with a color in accordance with the color selection signal.

19. A color liquid crystal display apparatus comprising:

a pair of substrates having opposing surfaces, segment electrodes formed on one surface, common electrodes formed on the other surface, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a retardation plate disposed between said pair of polarizing plates such that an angle defined by an optical axis of said retardation plate, along which a refractive index is the maximum in a planar direction of said retardation plate, and the transmission axis of an adjacent one of said polarizing plates becomes 45°±5°; and voltage application means, connected to said segment electrodes and said common electrodes, for changing a voltage applied to said liquid crystal layer to change a polarized state of light transmitted through said liquid crystal layer so as to change a color of light transmitted through said polarizing plate on an exit side, said voltage application means including driving voltage generating means for generating a plurality of voltages having different magnitudes, color selection signal generating means for generating a color selection signal in accordance with display data, display signal generating means for generating a display signal corresponding to the display data, and display driving means for selecting a driving voltage in accordance with the color selection signal and forming a driving waveform by using the display signal and the selected driving voltage.

20. A color liquid crystal display apparatus comprising:

a pair of substrates having opposing surfaces, segment electrodes formed on one surface, common electrodes formed on the other surface, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a polarizing plate disposed outside one of said pair of substrates and having a transmission axis for linearly polarizing incident light;

a reflection plate disposed on an opposite side to said polarizing plate with respect to said pair of substrates;

a retardation plate disposed between said polarizing plate and said reflection plate and having an optical axis along which a refractive index is the maximum in a planar direction of said retardation plate, said retardation plate being arranged such that an angle defined by the optical axis and a transmission axis of said polarizing plate is 45°±5°; and voltage application means, connected to said segment electrodes and said common electrodes, for changing a voltage applied to said liquid crystal layer to change a polarizing state of light transmitted through said liquid crystal layer so as to change a color of light transmitted through said polarizing plate on an exit side, said voltage application means including driving voltage generating means for generating a plurality of voltages having different magnitudes, color selection signal generating means for generating a color selection signal in accordance with display data, display signal generating means for generating a display signal corresponding to the display data, and display driving means for selecting a driving voltage in accordance with the color selection signal and forming a driving waveform by using the display signal and the selected driving voltage.

21. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

no more than a single liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a first retardation plate disposed between said pair of polarizing plates such that an angle defined by an optical axis of said retardation plate, along which a refractive index is the maximum in a planar direction of said retardation plate, and the transmission axis of an adjacent one of said polarizing plates is becomes substantially 45°;

a reflection plate disposed outside one of said pair of polarizing plates; and voltage application means, connected to said electrodes, for changing a voltage applied to said liquid crystal layer in no less than three steps so as to display no less than three colors in accordance with a color selection signal and a display signal corresponding to display data in order to change a polarized state of light transmitted through said liquid crystal layer before and after reflection so as to change a color of light transmitted through said polarizing plate and obtain a display with a color in accordance with the color selection signal.

22. An apparatus according to claim 21, further comprising a second retardation plate disposed between said pair of polarizing plates.

23. An apparatus according to claim 21, further comprising pixel electrodes regularly arranged on one of said pair of substrates, and thin-film transistors arranged in correspondence with said respective pixel electrodes, each of said thin-film transistors having a source electrode connected to a corresponding one of said pixel electrodes, a drain electrode connected to a signal line for supplying a display signal, and a gate electrode connected to a scanning line for supplying a scanning signal.

24. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a retardation plate disposed between said pair of polarizing plates such that an angle defined by an optical axis of said retardation plate, along which a refractive index is the maximum in a planar direction of said retardation plate, and the transmission axis of an adjacent one of said polarizing plates is 45°±5°; and voltage application means, connected to said electrodes, for changing a voltage applied to said liquid crystal layer to change a polarized state of light transmitted through said liquid crystal layer so as to change a color of light transmitted through said polarizing plate on an exit side, said voltage application means including color selection signal generating means for generating a color selection signal in accordance with display data, display signal generating means for generating a display signal corresponding to the display data, and display driving means for forming a driving waveform by using the display signal and the color selection signal.

25. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a single polarizing plate disposed outside one of said pair of substrates and having a transmission axis for linearly polarizing incident light;

a reflection plate disposed on an opposite side to said polarizing plate with respect to said pair of substrates;

a retardation plate disposed between said polarizing plate and said reflection plate and having an optical axis along which a refractive index is the maximum in a planar direction of said retardation plate, said retardation plate being arranged such that an angle defined by the optical axis and a transmission axis of said polarizing plate is 45°±5°; and voltage application means, connected to said electrodes, for changing a voltage applied to said liquid crystal layer to change a polarized state of light transmitted through said liquid crystal layer so as to change a color of light transmitted through said polarizing plate on an exit side, said voltage application means including color selection signal generating means for generating a color selection signal in accordance with display data, display signal generating means for generating a display signal corresponding to the display data, and display driving means for forming a driving waveform by using the display signal and the color selection signal.

26. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a retardation plate disposed between said pair of polarizing plates such that an angle defined by an optical axis of said retardation plate, along which a refractive index is the maximum in a planar direction of said retardation plate, and the transmission axis of an adjacent one of said polarizing plates becomes 45°±5°, said retardation plate satisfying $n_x > n_z > n_y$ wherein $n_x$, $n_y$ and $n_z$ are refractive indexes in the optical axis direction, a direction perpendicular thereto in a planar direction of said retardation plate, and a direction of thickness, respectively; and voltage application means, connected to said electrodes, for changing a voltage applied to said liquid crystal layer in accordance with a color selection signal and a display signal corresponding to display data in order to change a polarized state of light transmitted through said liquid crystal layer so as to change a color of light transmitted through said polarizing plate on an exit side and obtain a display with a color in accordance with the color selection signal.

27. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a polarizing plate disposed outside one of said pair of substrates and having a transmission axis for linearly polarizing incident light;

a reflection plate disposed on an opposite side to said polarizing plate with respect to said pair of substrates;

a retardation plate disposed between said polarizing plate and said reflection plate and having an optical axis along which a refractive index is the maximum in a planar direction of said retardation plate, said retardation plate being arranged such that an angle defined by an optical axis and a transmission axis of said polarizing plate is 45°±5°, said retardation plate satisfying $n_x > n_z > n_y$ wherein $n_x$, $n_y$ and $n_z$ are refractive indexes in the optical axis direction, a direction perpendicular thereto in a planar direction of said retardation plate, and a direction of thickness, respectively; and voltage application means, connected to said electrodes, for changing a voltage applied to said liquid crystal layer in accordance with a color selection signal and a display signal corresponding to display data in order to change a polarized state of light which is transmitted through said liquid crystal layer before and after reflection, so as to change a color of light transmitted through said polarizing plate and obtain a display with a color in accordance with the color selection signal.

28. A color liquid crystal display apparatus comprising:

a pair of substrates having opposing surfaces, electrodes respectively formed on the opposing surfaces, and aligning films respectively formed to cover said electrodes, said aligning films having undergone aligning treatment in predetermined directions;

a liquid crystal layer formed between said pair of substrates and having liquid crystal molecules aligned to be twisted at a twist angle of 80° to 120° from one substrate to the other substrate;

a pair of polarizing plates disposed outside said pair of substrates to sandwich said substrates and respectively having transmission axes for linearly polarizing incident light;

a retardation plate disposed between said pair of polarizing plates such that an angle defined by an optical axis of said retardation plate, along which a refractive index is the maximum in a planar direction of said retardation plate, and the transmission axis of an adjacent one of said polarizing plates becomes 45°±5°, said retardation plate satisfying $n_X > n_Z > n_Y$ wherein $n_X$, $n_Y$ and $n_Z$ are refractive indexes in a direction of the optical axis, a direction perpendicular thereto in a planar direction of said retardation plate, and a direction of thickness, respectively; and a reflection plate disposed outside one of said pair of polarizing plates;

voltage application means, connected to said electrodes, for changing a voltage applied to said liquid crystal layer in accordance with a color selection signal and a display signal corresponding to display data in order to change a polarized state of light transmitted through said liquid crystal layer before and after reflection so as to change a color of light transmitted through said polarizing plate and obtain a display with a color in accordance with the color selection signal.

* * * * *